United States Patent
Togino et al.

(10) Patent No.: US 6,396,639 B1
(45) Date of Patent: May 28, 2002

(54) VIEWING OPTICAL SYSTEM AND IMAGE DISPLAY APPARATUS USING THE SAME

(75) Inventors: Takayoshi Togino, Koganei; Tetsuhide Takeyama, Hachioji, both of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/540,879

(22) Filed: Mar. 31, 2000

(30) Foreign Application Priority Data

| Feb. 4, 1999 | (JP) | 11-096291 |
| Jun. 23, 1999 | (JP) | 11-176390 |
| Jul. 2, 1999 | (JP) | 11-188875 |
| Jul. 26, 1999 | (JP) | 11-210252 |
| Oct. 1, 1999 | (JP) | 11-281031 |

(51) Int. Cl.$^7$ ............................ G02B 27/12; G02B 27/14
(52) U.S. Cl. ...................... 359/630; 359/632; 359/637; 359/640
(58) Field of Search .................. 359/630, 631, 359/632, 633, 637, 640, 13; 345/7, 8, 9

(56) References Cited

U.S. PATENT DOCUMENTS

| 4,969,724 A | 11/1990 | Ellis | |
| 5,706,136 A | 1/1998 | Okuyama et al. | |
| 5,768,024 A | * 6/1998 | Takahashi | 359/639 |
| 5,771,124 A | 6/1998 | Kintz et al. | |
| 6,005,720 A | 12/1999 | Watters et al. | |
| 6,088,165 A | * 7/2000 | Janeczko et al. | 359/629 |
| 6,219,188 B1 | * 4/2001 | Tsukamoto | 359/629 |
| 6,222,676 B1 | * 4/2001 | Togino et al. | 359/630 |
| 6,310,736 B1 | * 10/2001 | Togino | 359/834 |

FOREIGN PATENT DOCUMENTS

| EP | 583 116 A2 | 2/1994 |
| EP | 687 932 A2 | 12/1995 |
| JP | 10-268306 | 10/1998 |

* cited by examiner

Primary Examiner—Georgia Epps
Assistant Examiner—Saeed Seyrafi
(74) Attorney, Agent, or Firm—Pillsbury Winthrop LLP

(57) ABSTRACT

A compact, bright and high-performance viewing optical system and an image display apparatus using the same. The viewing optical system uses an ocular optical system, which is formed from a decentered prism, and a reflection type image display device. The image display device has a light source and an illuminating light guide prism for guiding a light beam from the light source so that the light beam is applied to the display surface from the front side thereof. The ocular optical system includes a prism having an entrance surface through which a light beam reflected from the display surface enters the prism after passing through the illuminating light guide prism. The prism further has a reflecting surface and an exit surface through which the light beam exits from the prism. The reflecting surface is decentered with respect to the optical axis and has a rotationally asymmetric curved surface configuration that corrects decentration aberrations due to the decentration of the reflecting surface and gives a power to the light beam. The spacing between the entrance surface of the prism and the display surface satisfies a predetermined condition to lead the image to the pupil position.

53 Claims, 43 Drawing Sheets

Outside world image

Lower visual field

Lower visual field

VIEWING OPTICAL SYSTEM AND IMAGE DISPLAY APPARATUS USING THE SAME

BACKGROUND OF THE INVENTION

The present invention relates to a viewing optical system and an image display apparatus using the same. More particularly, the present invention relates to a viewing optical system devised so that a bright image of a display device of the type in which an image is displayed by reflected light, e.g. a reflection type liquid crystal display device, can be observed through an ocular optical system arranged to be compact in size and to minimize the loss of light quality. The present invention also relates to an image display apparatus, e.g. a head-up display, using the viewing optical system.

The present invention also relates to a see-through viewing optical system that allows see-through observation of the outside world or the like in an optical system of an image display apparatus, e.g. a head-up display.

In recent years, with the development of head-up displays and glasses-type displays, compact ocular optical systems have been actively developed. As a result, ocular optical systems using a thin and compact decentered prism have been proposed as disclosed, for example in Japanese Patent Application Unexamined Publication Numbers (hereinafter referred to as "JP(A)") 7-333551, 8-50256 and 8-234137. These are compact ocular optical systems in which reflecting surfaces have a power and the optical path is folded, and in which rotationally asymmetric decentration aberrations produced by decentered reflecting surfaces with a power are corrected by using an anamorphic reflecting surface or a rotationally asymmetric reflecting surface having one plane of symmetry.

Regarding liquid crystal display devices for displaying an image for observation, reflection type liquid crystal display devices have been developed to form images that are brighter and easier to observe. As a reflection type liquid crystal display device including an illumination structure therefor, JP(A) 10-268306 has been laid open to public.

As an ocular optical system using a reflection type image display device that is brighter than the transmission type, e.g. a reflection type liquid crystal display device, U.S. Pat. No. 5,771,124 is known.

However, the ocular optical system disclosed in U.S. Pat. No. 5,771,124 needs to form all the optical members from glass and is therefore heavy in weight. Regarding the arrangement of the ocular optical system, the number of parts is large, and the structure is large in size. In addition, because illuminating light incident on the reflection type image display device is tilted from the direction perpendicular to the image display surface to a considerable extent, brightness is sacrificed undesirably.

Accordingly, it is conceivable to apply illuminating light from a direction approximately perpendicular to the display surface of the reflection type image display device of the viewing optical system according to JP(A) 10-268306. This is, however, unfavorable for U.S. Pat. No. 5,771,124 because the ocular optical system disclosed therein lacks compactness.

Under these circumstances, it is conceivable to construct a bright and compact viewing optical system by combining together an ocular optical system superior in compactness as proposed, for example, in JP(A) 7-333551, 8-50256 and 8-234137 and the reflection type image display device according to JP(A) 10-268306, in which illuminating light is applied to the display surface approximately perpendicularly.

However, the above-described conventional ocular optical system using a decentered prism is based on the assumption that a transmission type image display device is used. Therefore, the distance between the image display device and the entrance surface of the decentered prism is short. For this reason, it is impossible to ensure a space for placing an optical member for illuminating the display surface of the reflection type image display device between the image display device and the decentered prism. Consequently, it is unavoidably necessary to tilt the reflection type image display device with respect to the optical axis to a considerable extent and to dispose a light source so that illuminating light is applied to the display surface from an oblique direction as in the case of U.S. Pat. No. 5,771,124.

When a reflection type image display device is tilted with respect to the optical axis to a considerable extent, particularly when a reflection type liquid crystal display device is used as the reflection type image display device, the brightness of the reflection type image display device cannot be exhibited satisfactorily owing to the viewing angle dependence. Moreover, because the object plane is tilted with respect to the optical axis, an excessively heavy load is imposed on the ocular optical system to allow the image to be observed perpendicularly to the optical axis without curvature and distortion.

To construct a see-through optical system for see-through observation of the outside world or the like by using a thick prism optical system constituting a conventional ocular optical system as stated above, the common practice is to use surfaces of the same configuration as the eye-side surface and the outside world-side surface and to set the power of the see-through optical path to zero.

However, when the eye-side surface of the prism optical system is not a plane surface, even if the power of the see-through optical path is zero, the angular magnification is not 1. Accordingly, in the case of a head-mounted image display apparatus designed for a single eye, in which the user performs observation with one eye through the prism optical system and the other eye being naked, two images seen with the left and right eyes cannot properly be fused into a single image.

SUMMARY OF THE INVENTION

In view of the above-described problems with the prior art, an object of the present invention is to provide a compact, bright and high-performance viewing optical system using an ocular optical system, which is formed from a decentered prism, and a reflection type image display device, and also provide an image display apparatus using the viewing optical system.

Another object of the present invention is to provide a viewing optical system in which when the outside world or the like is viewed in a see-through manner through an ocular optical system, e.g. a prism optical system, which forms a displayed image of an image display device, the outside world or the like can be seen in the same way as in the case of viewing with the naked eye.

A first viewing optical system according to the present invention provided to attain the first object includes a reflection type image display device for displaying an image by reflecting an illuminating light beam incident from the front side of a display surface for forming an image for observation. The viewing optical system further includes an ocular optical system for leading the image to a pupil position where an observer's eyeball is to be placed.

The image display device has an illuminating device and an illuminating light guide optical device for guiding a light beam emitted from the illuminating device so that the light beam can be applied to the display surface from the front side thereof.

The ocular optical system includes a prism member having an entrance surface through which a display light beam reflected from the reflection type image display device enters the prism member after passing through the illuminating light guide optical device. The prism member further has at least one reflecting surface reflecting the light beam in the prism member, and an exit surface through which the light beam exits from the prism member.

The at least one reflecting surface of the prism member is decentered with respect to an optical axis and has a rotationally asymmetric curved surface configuration that corrects decentration aberrations due to the decentration of the reflecting surface and gives a power to the light beam.

The spacing between the entrance surface of the prism member and the display surface of the reflection type image display device satisfies the following condition to lead the image to the pupil position:

$$0.6 < L/H < 3.1$$

where L is the distance between an image center position where the display surface of the reflection type image display device intersects the optical axis and a position where the entrance surface of the prism member intersects the optical axis, and H is the image height of the reflection type image display device (the diagonal length in a case where the display surface is quadrangular).

A second viewing optical system according to the present invention provided to attain the second object includes an image forming member for forming a first image to be viewed by an observer, and an ocular optical system arranged to lead the image formed by the image forming member to an observer's eyeball. The viewing optical system further includes a see-through optical element placed closer to a second image, which is different from the first image, than the ocular optical system so as to lead the second image to the observer's eyeball.

The ocular optical system has at least a reflecting surface with a curved surface configuration arranged to reflect a light beam from the first image and to lead it toward the observer's eyeball. The reflecting surface has a transmitting action to allow a light beam from the second image to enter the ocular optical system after passing through the see-through optical element.

The see-through optical element is placed closer to the second image than the reflecting surface at a distance from the reflecting surface.

The viewing optical system is arranged so that when the light beam from the second image passes through the see-through optical element and the ocular optical system, the combined optical power P of the see-through optical element and the ocular optical system is approximately zero, and the combined angular magnification β is approximately 1.

A third viewing optical system according to the present invention provided to attain the second object includes an image forming member for forming a first image to be viewed by an observer, and an ocular optical system arranged to lead the image formed by the image forming member to an observer's eyeball. The viewing optical system further includes a see-through optical element disposed closer to a second image, which is different from the first image, than the ocular optical system so as to lead the second image to the observer's eyeball.

The ocular optical system has at least a reflecting surface with a curved surface configuration arranged to reflect a light beam from the first image and to lead it toward the observer's eyeball. The reflecting surface has a transmitting action to allow a light beam from the second image to enter the ocular optical system after passing through the see-through optical element.

The see-through optical element is placed closer to the second image than the reflecting surface in such a manner as to be in close contact with the reflecting surface.

The viewing optical system is arranged so that when the light beam from the second image passes through the see-through optical element and the ocular optical system, the combined optical power P of the see-through optical element and the ocular optical system is approximately zero.

A fourth viewing optical system according to the present invention provided to attain the second object includes an image forming member for forming a first image to be viewed by an observer, and an ocular optical system arranged to lead the image formed by the image forming member to an observer's eyeball. The viewing optical system further includes a see-through optical element disposed closer to a second image, which is different from the first image, than the ocular optical system so as to lead the second image to the observer's eyeball.

The ocular optical system has at least a reflecting surface with a curved surface configuration arranged to reflect a light beam from the first image and to lead it toward the observer's eyeball. The reflecting surface has a transmitting action to allow a light beam from the second image to enter the ocular optical system after passing through the see-through optical element.

The see-through optical element is placed closer to the second image than the reflecting surface in such a manner as to be in close contact with the reflecting surface.

The viewing optical system is arranged so that when the light beam from the second image passes through the see-through optical element and the ocular optical system, the combined angular magnification β of the see-through optical element and the ocular optical system is approximately 1.

The reasons for adopting the above-described arrangements in the present invention, together with the functions thereof, will be described below in order.

The first viewing optical system according to the present invention includes a reflection type image display device for displaying an image by reflecting an illuminating light beam incident from the front side of a display surface for forming an image for observation. The viewing optical system further includes an ocular optical system for leading the image to a pupil position where an observer's eyeball is to be placed. The image display device has an illuminating device and an illuminating light guide optical device for guiding a light beam emitted from the illuminating device so that the light beam can be applied to the display surface from the front side thereof.

Thus, the first viewing optical system according to the present invention has an illuminating light guide optical device for guiding a light beam emitted from the illuminating device so that the light beam can be applied to the display surface of the reflection type image display device from the front side thereof. Accordingly, illuminating light can be applied to the display surface from the front side thereof at approximately right angles to the display surface. Thus, it is possible to construct a bright viewing optical system.

The ocular optical system is formed from a prism member having an entrance surface through which a display light beam reflected from the image display device enters the prism member. The prism member further has at least one reflecting surface reflecting the light beam in the prism member, and an exit surface through which the light beam exits from the prism member. Therefore, it is possible to construct a thin and compact viewing optical system.

The at least one reflecting surface of the prism member is decentered with respect to an optical axis and has a rotationally asymmetric curved surface configuration that corrects decentration aberrations due to the decentration of the reflecting surface and gives a power to the light beam. Therefore, it is possible to construct a high-performance viewing optical system that is compact and lightweight and yet capable of exhibiting high optical performance.

A refracting optical element such as a lens is provided with a power by giving a curvature to an interface surface thereof. Accordingly, when rays are refracted at the interface surface of the lens, chromatic aberration unavoidably occurs according to chromatic dispersion characteristics of the refracting optical element. Consequently, the common practice is to add another refracting optical element for the purpose of correcting the chromatic aberration.

Meanwhile, a reflecting optical element such as a mirror or a prism produces no chromatic aberration in theory even when a reflecting surface thereof is provided with a power, and need not add another optical element only for the purpose of correcting chromatic aberration. Accordingly, an optical system using a reflecting optical element allows the number of constituent optical elements to be reduced from the viewpoint of chromatic aberration correction in comparison to an optical system using a refracting optical element.

At the same time, a reflecting optical system using a reflecting optical element allows the optical system itself to be compact in size in comparison to a refracting optical system because the optical path is folded in the reflecting optical system.

Reflecting surfaces require a high degree of accuracy for assembly and adjustment because they have high sensitivity to decentration errors in comparison to refracting surfaces. However, among reflecting optical elements, prisms, in which the positional relationship between surfaces is fixed, only need to control decentration as a single unit of prism and do not need high assembly accuracy and a large number of man-hours for adjustment as are needed for other reflecting optical elements.

Furthermore, a prism has an entrance surface and an exit surface, which are refracting surfaces, and a reflecting surface. Therefore, the degree of freedom for aberration correction is high in comparison to a mirror, which has only a reflecting surface. In particular, if the prism reflecting surface is assigned the greater part of the desired power to thereby reduce the powers of the entrance and exit surfaces, which are refracting surfaces, it is possible to reduce chromatic aberration to a very small quantity in comparison to refracting optical elements such as lenses while maintaining the degree of freedom for aberration correction at a high level in comparison to mirrors. Furthermore, the inside of a prism is filled with a transparent medium having a refractive index higher than that of air. Therefore, it is possible to obtain a longer optical path length than in the case of air. Accordingly, the use of a prism makes it possible to obtain an optical system that is thinner and more compact than those formed from lenses, mirrors and so forth, which are placed in the air.

In addition, an ocular optical system is required to exhibit favorable image-forming performance as far as the peripheral portions of the image field, not to mention the performance required for the center of the image field. In the case of a general coaxial optical system, the sign of the ray height of extra-axial rays is inverted at a stop. Accordingly, if optical elements are not in symmetry with respect to the stop, off-axis aberrations are aggravated. For this reason, the common practice is to place refracting surfaces at respective positions facing each other across the stop, thereby obtaining a satisfactory symmetry with respect to the stop, and thus correcting off-axis aberrations.

In the first viewing optical system according to the present invention, as stated above, the ocular optical system is formed from a prism member having an entrance surface, at least one reflecting surface, and an exit surface. The at least one reflecting surface is decentered with respect to the optical axis and has a rotationally asymmetric curved surface configuration that corrects decentration aberrations due to the decentration of the reflecting surface and gives a power to the light beam, thereby enabling not only axial aberrations but also off-axis aberrations to be favorably corrected.

With the above-described basic arrangement of the first viewing optical system according to the present invention, it is possible to obtain a compact ocular optical system that has a smaller number of constituent optical elements than in the case of an optical system using a refracting optical system or a rotationally symmetric reflecting optical system and exhibits favorable performance throughout the image field, from the center to the periphery thereof.

When a light ray that passes through the center of the pupil and reaches the center of the display surface of the reflection type image display device in backward ray tracing is defined as an axial principal ray, if at least one reflecting surface of the prism member is not decentered with respect to the axial principal ray, the axial principal ray travels along the same optical path when incident on and reflected from the reflecting surface, and thus the axial principal ray is intercepted in the optical system undesirably. As a result, an image is formed from only a light beam whose central portion is shaded. Consequently, the center of the image is unfavorably dark, or no image is formed in the center of the image field.

It is also possible to decenter a reflecting surface with a power with respect to the axial principal ray.

When a reflecting surface with a power is decentered with respect to the axial principal ray, it is desirable that at least one reflecting surface of the surfaces constituting the prism member should be a rotationally asymmetric surface.

The reason for this will be described below in detail. First of all, a coordinate system used in the following description and rotationally asymmetric surfaces will be described. An optical axis defined by a straight line along which the axial principal ray travels until it intersects the first surface of the optical system is defined as a Z-axis. An axis perpendicularly intersecting the Z-axis in the decentration plane of each surface constituting the ocular optical system is defined as a Y-axis. An axis perpendicularly intersecting the optical axis and also perpendicularly intersecting the Y-axis is defined as an X-axis. Ray tracing will be described by backward ray tracing in which rays are traced from the pupil toward the reflection type image display device, as stated above.

In general, a spherical lens system comprising only a spherical lens is arranged such that aberrations produced by spherical surfaces, such as spherical aberration, coma and curvature of field, are corrected with some surfaces by canceling the aberrations with each other, thereby reducing aberrations as a whole.

On the other hand, rotationally symmetric aspherical surfaces and the like are used to correct aberrations favorably with a minimal number of surfaces. The reason for this is to reduce various aberrations that would be produced by spherical surfaces.

However, in a decentered optical system, rotationally asymmetric aberrations due to decentration cannot be corrected by a rotationally symmetric optical system. Rotationally asymmetric aberrations due to decentration include distortion, curvature of field, and astigmatic and comatic aberrations, which occur even on the axis.

First, rotationally asymmetric curvature of field will be described. For example, when rays from an infinitely distant object point are incident on a decentered concave mirror, the rays are reflected by the concave mirror to form an image. In this case, the back focal length from that portion of the concave mirror on which the rays strike to the image surface is a half the radius of curvature of the portion on which the rays strike in a case where the medium on the image side is air. Consequently, as shown in FIG. 23, an image surface tilted with respect to the axial principal ray is formed. It is impossible to correct such rotationally asymmetric curvature of field by a rotationally symmetric optical system.

To correct the tilted curvature of field by the concave mirror M itself, which is the source of the curvature of field, the concave mirror M is formed from a rotationally asymmetric surface, and, in this example, the concave mirror M is arranged such that the curvature is made strong (refracting power is increased) in the positive direction of the Y-axis, whereas the curvature is made weak (refracting power is reduced) in the negative direction of the Y-axis. By doing so, the tilted curvature of field can be corrected. It is also possible to obtain a flat image surface with a minimal number of constituent surfaces by placing a rotationally asymmetric surface having the same effect as that of the above-described arrangement in the optical system separately from the concave mirror M.

It is preferable that the rotationally asymmetric surface should be a rotationally asymmetric surface having no axis of rotational symmetry in the surface nor out of the surface. Such a rotationally asymmetric surface allows the degree of freedom to increase, and this is favorable for aberration correction.

Next, rotationally asymmetric astigmatism will be described. A decentered concave mirror M produces astigmatism even for axial rays, as shown in FIG. 24, as in the case of the above. The astigmatism can be corrected by appropriately changing the curvatures in the X- and Y-axis directions of the rotationally asymmetric surface as in the case of the above.

Rotationally asymmetric coma will be described below. A decentered concave mirror M produces coma even for axial rays, as shown in FIG. 25, as in the case of the above. The coma can be corrected by changing the tilt of the rotationally asymmetric surface according as the distance from the origin of the X-axis increases, and further appropriately changing the tilt of the surface according to the sign (positive or negative) of the Y-axis.

The ocular optical system according to the present invention may also be arranged such that the above-described at least one surface having a reflecting action is decentered with respect to the axial principal ray and has a rotationally asymmetric surface configuration and further has a power. By adopting such an arrangement, decentration aberrations produced as the result of giving a power to the reflecting surface can be corrected by the surface itself. In addition, the power of the refracting surfaces of the prism is reduced, and thus chromatic aberration produced in the prism can be minimized.

The rotationally asymmetric surface used in the present invention should preferably be a plane-symmetry free-form surface having only one plane of symmetry. Free-form surfaces used in the present invention are defined by the following equation (a). It should be noted that the Z-axis of the defining equation is the axis of a free-form surface.

$$Z = cr^2 / \left[1 + \sqrt{\{1 - (1+k)c^2 r^2\}}\right] + \sum_{j=2}^{66} C_j X^m Y^n \quad (a)$$

$$\sum_{j=2}^{66} C_j X^m Y^n = C_2 X + C_3 Y + C_4 X^2 + C_5 XY + C_6 Y^2 + C_7 X^3 +$$
$$C_8 X^2 Y + C_9 XY^2 + C_{10} Y^3 + C_{11} X^4 + C_{12} X^3 Y +$$
$$C_{13} X^2 Y^2 + C_{14} XY^3 + C_{15} Y^4 + C_{16} X^5 + C_{17} X^4 Y +$$
$$C_{18} X^3 Y^2 + C_{19} X^2 Y^3 + C_{20} XY^4 + C_{21} Y^5 +$$
$$C_{22} X^6 + C_{23} X^5 Y + C_{24} X^4 Y^2 + C_{25} X^3 Y^3 +$$
$$C_{26} X^2 Y^4 + C_{27} XY^5 + C_{28} Y^6 + C_{29} X^7 + C_{30} X^6 Y +$$
$$C_{31} X^5 Y^2 + C_{32} X^4 Y^3 + C_{33} X^3 Y^4 + C_{34} X^2 Y^5 +$$
$$C_{35} XY^6 + C_{36} Y^7 \ldots$$

where $C_j$ (j is an integer of 2 or higher) are coefficients.

In general, the above-described free-form surface does not have planes of symmetry in both the XZ- and YZ-planes. In the present invention, however, a free-form surface having only one plane of symmetry parallel to the YZ-plane is obtained by making all terms of odd-numbered degrees with respect to X zero. For example, in the above defining equation (a), the coefficients of the terms $C_2$, $C_5$, $C_7$, $C_9$, $C_{12}$, $C_{14}$, $C_{16}$, $C_{18}$, $C_{20}$, $C_{23}$, $C_{25}$, $C_{27}$, $C_{29}$, $C_{31}$, $C_{33}$, $C_{35}$, ... are set equal to zero. By doing so, it is possible to obtain a free-form surface having only one plane of symmetry parallel to the YZ-plane.

A free-form surface having only one plane of symmetry parallel to the XZ-plane is obtained by making all terms of odd-numbered degrees with respect to Y zero. For example, in the above defining equation (a), the coefficients of the terms $C_3$, $C_5$, $C_8$, $C_{10}$, $C_{12}$, $C_{14}$, $C_{17}$, $C_{19}$, $C_{21}$, $C_{23}$, $C_{25}$, $C_{27}$, $C_{30}$, $C_{32}$, $C_{34}$, $C_{36}$, ... are set equal to zero. By doing so, it is possible to obtain a free-form surface having only one plane of symmetry parallel to the XZ-plane.

Furthermore, the direction of decentration is determined in correspondence to either of the directions of the above-described planes of symmetry. For example, with respect to the plane of symmetry parallel to the YZ-plane, the direction of decentration of the optical system is determined to be the Y-axis direction. With respect to the plane of symmetry parallel to the XZ-plane, the direction of decentration of the optical system is determined to be the X-axis direction. By doing so, rotationally asymmetric aberrations due to decentration can be corrected effectively, and at the same time, productivity can be improved.

It should be noted that the above defining equation (a) is shown as merely an example as stated above, and that the feature of the present invention resides in that rotationally asymmetric aberrations due to decentration are corrected and, at the same time, productivity is improved by using a rotationally asymmetric surface having only one plane of symmetry. Therefore, the same advantageous effect can be obtained for any other defining equation that expresses such a rotationally asymmetric surface.

Incidentally, it is important in the present invention that the spacing between the entrance surface of the prism member and the display surface of the reflection type image display device should satisfy the following condition to lead the image to the pupil position:

$$0.6 < L/H < 3.1 \qquad (1)$$

where L is the distance between an image center position where the display surface of the reflection type image display device intersects the optical axis and a position where the entrance surface of the prism member intersects the optical axis, and H is the image height of the reflection type image display device (the diagonal length in a case where the display surface is quadrangular).

The condition (1) needs to be satisfied in order to place the illuminating light guide optical device between the entrance surface of the prism member and the display surface of the reflection type image display device. If L/H is not smaller than the upper limit, i.e. 3.1, the spacing between the entrance surface of the prism member and the display surface of the reflection type image display device becomes excessively wide, and it becomes difficult to attain the above-described ocular optical system. In addition, the viewing optical system itself becomes large in size. This goes against the object of the present invention. If L/H is not larger than the lower limit, i.e. 0.6, the spacing becomes excessively narrow, and the tilt of the beam splitter surface of the illuminating light guide optical device with respect to the optical axis becomes excessively small. Consequently, if illuminating light is made incident on the display surface of the reflection type image display device at approximately right angles thereto, it is difficult to illuminate the whole display surface owing to eclipse.

It is more desirable to satisfy the following condition:

$$0.7 < L/H < 2.0 \qquad (1\text{-}1)$$

The meaning of the upper limit of this condition is the same as the above.

It is even more desirable to satisfy the following condition:

$$0.8 < L/H < 1.5 \qquad (1\text{-}2)$$

The meaning of the upper limit of this condition is the same as the above.

As the reflection type image display device in the present invention, for example, a reflection type liquid crystal display device can be used, although the present invention is not necessarily limitative thereto.

Incidentally, chromatic aberration is relatively likely to occur in the viewing optical system according to the present invention because the illuminating light guide optical device is placed in a relatively wide spacing provided between the entrance surface of the prism member and the display surface of the reflection type image display device. Therefore, it is desirable to place a diffractive optical element on the entrance surface side of the prism member to correct the chromatic aberration.

In the viewing optical system according to the present invention, the prism member used as an ocular optical system can be any of various known decentered prisms. However, it is desirable to use a decentered prism of the type which has at least one surface serving as both a refracting surface and a reflecting surface in order to fold the optical path to achieve a reduction in size.

A typical prism of the type described above has an entrance surface through which the display light beam reflected from the reflection type image display device enters the prism after passing through the illuminating light guide optical device, and a first reflecting surface that reflects the light beam entering through the entrance surface. The prism further has a second reflecting surface that reflects the light beam reflected from the first reflecting surface, and an exit surface through which the light beam reflected from the second reflecting surface exits from the prism. The first reflecting surface and the exit surface are formed from a single surface serving as both a refracting surface and a reflecting surface.

Another prism of the type described above has an entrance surface through which the display light beam reflected from the reflection type image display device enters the prism after passing through the illuminating light guide optical device, and a first reflecting surface that reflects the light beam entering through the entrance surface. The prism further has a second reflecting surface that reflects the light beam reflected from the first reflecting surface, and a third reflecting surface that reflects the light beam reflected from the second reflecting surface, and further an exit surface through which the light beam reflected from the third reflecting surface exits from the prism. The second reflecting surface and the exit surface are formed from a single surface serving as both a refracting surface and a reflecting surface.

In the viewing optical system according to the present invention, the illuminating light guide optical device may be a transparent member having a first surface through which the light beam emitted from the illuminating device enters the transparent member, and a second surface that totally reflects the light beam entering through the first surface, and further a third surface that reflects the light beam totally reflected by the second surface. The second surface transmits the light beam reflected from the third surface to illuminate the display surface of the reflection type image display device from the front side thereof and also transmits the display light beam reflected from the display surface of the reflection type image display device. The third surface forms a beam splitter surface that transmits the display light beam passing through the second surface.

In this case, it is desirable that a deviation angle compensating member should be placed on the third surface side of the transparent member to compensate for an angle of deviation caused by the transparent member.

It is not always necessary to place a deviation angle compensating member besides the illuminating light guide optical device. When no deviation angle compensating member is provided, it is desirable to satisfy the condition described below.

Let us define parameters first. FIG. 19 is a ray path diagram showing the axial principal ray passing through the illuminating light guide optical device. The angle a formed between a tangential plane passing through the intersection between the second surface (in general, a curved surface or a plane surface) of the illuminating light guide optical device and the axial principal ray and a tangential plane passing through the intersection between the third surface (in general, a curved surface or a plane surface) of the illuminating light guide optical device and the axial principal ray is defined as an apex angle. The angle θ formed between the axial principal ray entering the second surface and the axial principal ray exiting from the third surface is defined as an angle of deviation.

In general, the minimum angle of deviation $\theta_{min}$ of a triangular prism (refractive index of which is denoted by n) having an apex angle α is determined by $$\theta_{min}=2\sin^{-1}[n\cdot\sin(\alpha/2)]-\alpha \quad (2)$$

Here, let us define $\theta-\theta_{min}$ as $\Delta\theta$, where $\theta$ is the angle of deviation of the axial principal ray passing through the second and third surfaces of the illuminating light guide optical device, and $\theta_{min}$ is the minimum angle of deviation of the triangular prism having an apex angle defined by the angle $\alpha$ formed between a tangential plane passing through the intersection between the second surface and the axial principal ray and a tangential plane passing through the intersection between the third surface and the axial principal ray. In this case, it is important to satisfy the following condition:

$$\Delta\theta<20° \quad (3)$$

If $\Delta\theta$ is not smaller than the upper limit of this condition, i.e. 20°, a light beam at each field angle is refracted at a large angle by the illuminating light guide optical device. Therefore, comatic aberration due to decentration and chromatic aberration occur in excessively large amounts, and it becomes difficult to correct these aberrations by canceling them with the prism member of the ocular optical system.

It is more desirable to satisfy the following condition:

$$\Delta\theta<10° \quad (3\text{-}1)$$

The meaning of the upper limit of this condition is the same as the above.

It is even more desirable to satisfy the following condition:

$$\Delta\theta<3° \quad (3\text{-}2)$$

The meaning of the upper limit of this condition is the same as the above.

The present invention includes an image display apparatus having the above-described viewing optical system for a right eye or left eye of an observer.

The present invention also includes an image display apparatus having a pair of viewing optical systems arranged as stated above for both right and left eyes of an observer.

Further, the present invention includes an image display apparatus having a support member for supporting the image display apparatus on the observer's head so that the image display apparatus is positioned in front of the observer's face.

Next, the second viewing optical system according to the present invention will be described.

FIG. 26 is a ray path diagram of a viewing optical system according to Example 5 (described later). The second viewing optical system will be described below with reference to FIG. 26. The ocular optical system of the viewing optical system includes a prism optical system 210. The prism optical system 210 has a first surface 211, a second surface 212, and a third surface 213 as counted from the exit pupil 201 side in backward ray tracing. The first surface 211 serves as both a transmitting surface and a totally reflecting surface. The second surface 212 is a semitransparent reflecting surface. The third surface 213 is a transmitting surface. Display light from an image display device placed in an image plane 203 enters the prism optical system 210 through the third surface 213. The incident light is reflected by the first surface 211 and further reflected by the second surface 212 to exit from the prism optical system 210 through the first surface 211. Then, the light enters an observer's eyeball placed so that the pupil is located at the position of the exit pupil 201. Thus, the image displayed at the image plane 203 is observable as an enlarged image.

A see-through optical element 220 is placed in front of the second surface 212 of the prism optical system 210 at a distance therefrom (the on-axis distance between the see-through optical element 220 and the second surface 212 may be zero). The see-through optical element 220 is formed from another transmission prism member having a first surface 221 and a second surface 222 as counted from the exit pupil 201 side in backward ray tracing. The first surface 221 and the second surface 222 are transmitting surfaces. Light from the outside world passes successively through the second surface 222 and first surface 221 of the see-through optical element 220 and further through the second surface 212 and first surface 211 of the prism optical system 210 and enters the observer's eyeball, in which the pupil is placed at the position of the exit pupil 201, to form an outside world image. It is possible to selectively observe either of the outside world image and the displayed image of the image display device placed in the image plane 203. It is also possible to observe both the images superimposed on one another. In FIG. 26, reference numeral 202 denotes an axial principal ray.

Thus, the viewing optical system according to the present invention includes an image forming member (the image display device placed in the image plane 203) for forming a first image to be viewed by an observer, and an ocular optical system (including the prism optical system 210 and a diffractive optical element 204 in this case) arranged to lead the image formed by the image forming member to an observer's eyeball. The viewing optical system further includes the see-through optical element 220 placed closer to a second image (the outside world image in this case), which is different from the first image, than the ocular optical system so as to lead the second image to the observer's eyeball. The ocular optical system has at least a reflecting surface 212 with a curved surface configuration arranged to reflect a light beam from the first image and to lead it toward the observer's eyeball. The reflecting surface 212 has a transmitting action to allow a light beam from the second image to enter the ocular optical system after passing through the see-through optical element 220. The see-through optical element 220 is placed closer to the second image than the reflecting surface 212 at a distance from the reflecting surface 212.

In the present invention, the viewing optical system is arranged so that when the light beam from the outside world passes through the see-through optical element 220 and the prism optical system 210, the combined optical power P of the see-through optical element 220 and the prism optical system 210 is approximately zero, and the combined angular magnification $\beta$ is approximately 1. The optical power and the angular magnification are those at a position where the axial principal ray 202 passes.

If the optical power P of the see-through optical system is approximately zero and the angular magnification $\beta$ is approximately 1 as stated above, the image viewed through the see-through optical system appears to be the same as the image seen with the naked eye. Therefore, the image seen with the naked eye and the image viewed through the see-through optical system are readily fused into a single image. Accordingly, when a head-mounted image display apparatus designed for a single eye is used, for example, it is easy to view the outside world image with both eyes.

The phrase "the optical power P is approximately zero" means that the optical power P is within the range defined by the following condition:

$$-0.002<P<0.002(/\text{mm}) \quad (4)$$

If the optical power P is not within the range defined by this condition, the image-formation position of the image viewed through the see-through optical system and that of the image seen with the naked eye become excessively different from each other. Accordingly, it becomes difficult to see the outside world image with both eyes.

The phrase "the angular magnification β is approximately 1" means that the angular magnification β is within the range defined by the following condition:

$$0.95<\beta<1.05 \tag{5}$$

If the angular magnification β is not within the range defined by this condition, the image viewed through the see-through optical system and the image seen with the naked eye are not formed with the same size. Accordingly, it is difficult to fuse the two images seen with the left and right eyes into a single image.

The above-described arrangement in which the see-through optical element is placed at a distance from the ocular optical system means a structure in which an optical power (e.g. an air lens) produced between the ocular optical system and the see-through optical element also contributes to the optical performance of the see-through optical system, but not a structure in which the ocular optical system and the see-through optical element are cemented together with an adhesive having a refractive index approximately equal to those of the optical members, so that an optical power produced at the cemented surface can be ignored. The present invention is not necessarily limited to the structure in which the ocular optical system and the see-through optical element are separated by air, but includes a structure in which the ocular optical system and the see-through optical element are cemented together with an adhesive having a refractive index different from those of the optical members, and a structure in which the gap between the ocular optical system and the see-through optical element is filled with a fluid, e.g. a liquid or a gas. It should be noted that a liquid crystal shutter may be disposed between the ocular optical system and the see-through optical element.

It is preferable from the viewpoint of aberration correction that the reflecting surfaces of the ocular optical system should have a rotationally asymmetric curved surface configuration that corrects decentration aberrations.

The reason for this is the same as stated above with reference to FIGS. 23 to 25.

The ocular optical system according to the present invention may also be arranged such that the above-described at least one surface having a reflecting action is decentered with respect to the axial principal ray and has a rotationally asymmetric surface configuration and further has a power. By adopting such an arrangement, decentration aberrations produced as the result of giving a power to the reflecting surface can be corrected by the surface itself. In addition, the power of the refracting surfaces of the prism is reduced, and thus chromatic aberration produced in the prism can be minimized.

The rotationally asymmetric surface used in the present invention should preferably be an anamorphic surface or a plane-symmetry free-form surface having only one plane of symmetry. Free-form surfaces used in the present invention are defined by the above equation (a). It should be noted that the Z-axis of the defining equation is the axis of a free-form surface.

It should be noted that the above defining equation (a) is shown as merely an example, and that the feature of the present invention resides in that rotationally asymmetric aberrations due to decentration are corrected and, at the same time, productivity is improved by using a rotationally asymmetric surface having only one plane of symmetry. Therefore, the same advantageous effect can be obtained for any other defining equation that expresses such a rotationally asymmetric surface.

It is desirable that the see-through optical system should be arranged to cancel the optical power and angular magnification produced by the ocular optical system so that the combined optical power and angular magnification given to the light beam from the second image when it passes through the see-through optical element and the ocular optical system satisfy the following conditions:

$$-0.002<Px<0.002(1/mm) \tag{6}$$

$$-0.002<Py<0.002(1/mm) \tag{7}$$

$$0.97<\beta x<1.03 \tag{8}$$

$$0.95<\beta y<1.05 \tag{9}$$

where when the decentration direction of the entire optical system is a Y-axis direction, and a plane parallel to the axial principal ray is defined as a YZ-plane, and further a direction perpendicularly intersecting the YZ-plane is defined as an X-axis direction, Px and Py are powers in the X- and Y-axis directions, respectively, of the entire optical system, and βx and βy are angular magnifications in the X- and Y-axis directions, respectively, of the entire optical system.

It should be noted, however, that the above conditions apply in a case where the vertical direction of a man is the Y-axis direction. When the vertical direction of a man is the X-axis direction, the conditions (8) and (9) are as follows:

$$0.95<\beta x<1.05 \tag{8}$$

$$0.97<\beta y<1.03 \tag{9}$$

The reason why there is a difference in angular magnification between the vertical and horizontal directions is as follows. The human eye can see more finely in the horizontal (X-axis) direction than in the vertical (Y-axis) direction. Therefore, the tolerances on βY in the Y-axis direction can be somewhat relaxed, and thus there is a difference between the conditions (8) and (9).

The meaning of the upper and lower limits of the conditions (6) to (9) is the same as that of the upper and lower limits of the conditions (4) and (5).

Regarding the powers Px and Py in the X- and Y-axis directions of the entire optical system, it is more desirable to satisfy the following conditions:

$$-0.001<Px<0.001(1/mm) \tag{6-1}$$

$$-0.001<Py<0.001(1/mm) \tag{7-1}$$

It is also desirable to satisfy at least either one of the following conditions:

$$-0.0005<Px<0.0005(1/mm) \tag{6-2}$$

$$-0.0005<Py<0.0005(1/mm) \tag{7-2}$$

Regarding the angular magnifications βx and βy in the X- and Y-axis directions, respectively, of the entire optical system, it is more desirable to satisfy the following conditions:

$$0.99<\beta x<1.01 \tag{8-1}$$

$$0.99<\beta y<1.01 \tag{9-1}$$

It is even more desirable to satisfy the following conditions:

$$0.995 < \beta x < 1.005 \qquad (8\text{-}2)$$

$$0.995 < \beta y < 1.005 \qquad (9\text{-}2)$$

Let us denote the curvatures of the surfaces as follows. The curvatures in the X- and Y-axis directions of the entrance surface of the eye-side, first prism (the prism optical system 210 in FIG. 26) in backward ray tracing at the intersection between the entrance surface and the visual axis (axial principal ray) are denoted by Cx1 and Cy1, and the curvatures in the X- and Y-axis directions of the exit surface of the first prism at the intersection between the exit surface and the visual axis are denoted by Cx2 and Cy2. Further, the curvatures in the X- and Y-axis directions of the entrance surface of the see-through optical element, which is placed on the object side, at the intersection between the entrance surface and the visual axis are denoted by Cx3 and Cy3, and the curvatures in the X- and Y-axis directions of the exit surface of the see-through optical element are denoted by Cx4 and Cy4. When the first prism and the second prism are placed in close proximity to each other, it is desirable that Cx3/Cx2 and Cy3/Cy2 should satisfy the following conditions:

$$0.3 < Cx3/Cx2 < 1.2 \qquad (10)$$

$$0.3 < Cy3/Cy2 < 1.2 \qquad (11)$$

If Cx3/Cx2 or Cy3/Cy2 is not larger than the lower limit of the above conditions, i.e. 0.3, this portion has an excessively strong positive power because of the presence of the air layer sandwiched between the above-described two surfaces. To make the optical power of the entire optical system zero, the exit surface of the second prism unavoidably needs to have a strong negative optical power in order to cancel the power of this portion. Consequently, the angular magnification becomes far less than 1. In order to make the angular magnification approximately 1, the exit surface of the second prism also unavoidably needs to have a strong negative optical power. Consequently, the optical power of the entire optical system undesirably becomes a strong positive power. Accordingly, it becomes impossible to observe a far place.

If Cx3/Cx2 or Cy3/Cy2 is not smaller than the upper limit of the above conditions, i.e. 1.2, this portion has an excessively strong negative power because of the presence of the air layer sandwiched between the above-described two surfaces. To make the optical power of the entire optical system zero, the exit surface of the second prism unavoidably needs to have a strong positive optical power in order to cancel the power of this portion. Consequently, the angular magnification exceeds 1 to a considerable extent. In order to make the angular magnification approximately 1, the exit surface of the second prism also unavoidably needs to have a strong positive optical power. Consequently, the optical power of the entire optical system undesirably becomes a strong negative power. Accordingly, it becomes impossible to observe a near point.

It is more desirable to satisfy the following conditions:

$$0.4 < Cx3/Cx2 < 1 \qquad (10\text{-}1)$$

$$0.4 < Cy3/Cy2 < 1 \qquad (11\text{-}1)$$

Incidentally, the ocular optical system should preferably have at least a prism member filled with a medium having a refractive index larger than 1, as illustrated in FIG. 26. The prism member includes at least three optical surfaces having at least either one of a transmitting optical action and a reflecting optical action. The three surfaces are a first surface, a second surface, and a third surface. The third surface is an entrance surface through which a light beam from the first image enters the prism member. The second surface is disposed to face the see-through optical element at a distance. The second surface has a transmitting action to allow a light beam from the second image to enter the prism member after passing through the see-through optical element. The second surface further has a reflecting action to reflect the light beam from the first image in the prism member. The second surface has at least a curved reflecting surface. The first surface is an exit surface through which the light beam from the first image exits from the prism member.

In this case, it is desirable that at least either the first surface or the third surface should have a rotationally asymmetric curved surface configuration that corrects decentration aberrations, and that the curved surface configuration should be either an anamorphic surface or a plane-symmetry free-form surface having only one plane of symmetry.

It is desirable for the first surface to be arranged to serve as both a reflecting surface and a transmitting surface for the light beam in the prism member.

In this case, the first surface serving as both a reflecting surface and a transmitting surface should preferably be a totally reflecting surface arranged so that the reflected light beam is incident on the first surface at an angle exceeding the total reflection critical angle, and thereafter, the light beam reflected back from the reflecting surface is incident on the first surface at an angle not exceeding the total reflection critical angle to exit from the prism member.

In the viewing optical system according to the present invention, the ocular optical system and the see-through optical element may be arranged so that a first image viewing field range determined by the light beam from the first image as it exits from the ocular optical system is formed within a second image viewing field range determined by the light beam from the second image as it passes through the see-through optical element and a part of the ocular optical system.

Furthermore, the ocular optical system and the see-through optical element may be arranged as follows. The optical diameter of the see-through optical element is set smaller than the reflecting surface of the ocular optical system, which is placed to face the see-through optical element, and the see-through optical element is placed to face a region of the reflecting surface closer to the image forming member so that the light beam transmitting region of the reflecting surface that transmits the light beam entering through the see-through optical element shifts toward the image forming member with respect to the light beam reflecting region of the reflecting surface. In addition, a portion of the reflecting surface that does not directly face the see-through optical element is provided with a light-blocking coating to prevent entrance of flare rays from the outside world.

It is possible to place a light-blocking member capable of switching between transmission and cutoff of the light beam from the outside world image or switching between transmission and dimming of the light beam at at least either one of positions in front of and behind the see-through optical element so that the second image is the outside world image.

In addition, another display device that forms an image different from the first image may be placed on the side of the see-through optical element remote from the ocular optical system so that the second image is formed by the display device.

The viewing optical system may be arranged such that a light-blocking member capable of switching between transmission and cutoff of the light beam from the outside world image or switching between transmission and dimming of the light beam is placed at at least either one of positions in front of and behind the see-through optical element so that the second image is the outside world image, and a display device for displaying a third image is provided between the outside world image and the see-through optical element.

The viewing optical system according to the present invention may have a line-of-sight detecting device for detecting the observer's line of sight. The line-of-sight detecting device includes a light source for pupil illumination and a light-receiving element for receiving the image of the pupil, which are disposed at respective positions out of the optical path in the ocular optical system for leading the light beam from the first image and the optical path in the see-through optical element for leading the light beam from the second image.

In this case, the line-of-sight detecting device may be arranged such that at least the image of the pupil is passed through the optical path of the ocular optical system and separated from the optical path between the ocular optical system and the first image so as to be led to the light-receiving element. Thus, the optical path of the line-of-sight detecting device is formed by using the viewing optical path. Consequently, it is possible to eliminate the influence of outside world light that may enter through the optical path of the line-of-sight detecting device and also the influence of stray light from the pupil-illuminating light source. It is also possible to eliminate the greater part of the line-of-sight detecting optical system. Accordingly, it is possible to achieve a cost reduction and a size reduction.

It is desirable that the ocular optical system, the see-through optical element and the exit pupil should be positioned so as to satisfy the following condition:

$$\theta \leq 60°$$

where when the optical axis of the light beam from the first image that exits from the ocular optical system is defined as a visual axis, $\theta$ is the angle defined at the exit pupil by the ocular optical system in a direction away from the image forming member with respect to the visual axis.

If the above-described condition is satisfied, it is possible not only to perform observation through the see-through optical path but also to see a keyboard, for example, placed below the viewing optical system directly without looking through the viewing optical system.

It should be noted that the present invention includes a head-mounted viewing optical apparatus having an apparatus body unit including any one of the foregoing viewing optical systems, in which the ocular optical system, the see-through optical element and the image forming member for forming the first image are retained with the required spacings therebetween by a retaining device. The head-mounted viewing optical apparatus further includes a support device for supporting the apparatus body unit on the observer's head.

Next, the third and fourth viewing optical systems according to the present invention will be described.

FIG. 44 is a ray path diagram of a viewing optical system according to Example 7 (described later). The third and fourth viewing optical systems will be described below with reference to FIG. 44. The ocular optical system of the viewing optical system includes a prism optical system 410. The prism optical system 410 has a first surface 411, a second surface 412, and a third surface 413 as counted from the exit pupil 401 side in backward ray tracing. The first surface 411 serves as both a transmitting surface and a totally reflecting surface. The second surface 412 is a semitransparent reflecting surface. The third surface 413 is a transmitting surface. Display light from an image display device placed in an image plane 403 enters the prism optical system 410 through the third surface 413. The incident light is reflected by the first surface 411 and further reflected by the second surface 412 to exit from the prism optical system 410 through the first surface 411. Then, the light enters an observer's eyeball placed so that the pupil is located at the position of the exit pupil 401. Thus, the image displayed at the image plane 403 is observable as an enlarged image.

A see-through optical element 420 is placed in front of the second surface 412 of the prism optical system 410 so as to be in close contact with the second surface 412 (the see-through optical element 420 may be cemented to the second surface 412). The see-through optical element 420 is formed from another transmission prism member having a first surface 421 (with the same configuration as that of the second surface 412 of the prism optical system 410) and a second surface 422 as counted from the exit pupil 401 side in backward ray tracing. The first surface 421 and the second surface 422 are transmitting surfaces. Light from the outside world passes successively through the second surface 422 of the see-through optical element 420 and the first surface 421 thereof (=the second surface 412 of the prism optical system 410) and further through the first surface 411 of the prism optical system 410 and enters the observer's eyeball, in which the pupil is placed at the position of the exit pupil 401, to form an outside world image. It is possible to selectively observe either of the outside world image and the displayed image of the image display device placed in the image plane 403. It is also possible to observe both the images superimposed on one another. In FIG. 44, reference numeral 402 denotes an axial principal ray.

Thus, the third and fourth viewing optical systems according to the present invention each include an image forming member (the image display device placed in the image plane 403) for forming a first image to be viewed by an observer, and an ocular optical system (including the prism optical system 410 and a diffractive optical element 404 in this case) arranged to lead the image formed by the image forming member to an observer's eyeball. The viewing optical system further includes the see-through optical element 420 placed closer to a second image (the outside world image in this case), which is different from the first image, than the ocular optical system so as to lead the second image to the observer's eyeball. The ocular optical system has at least a reflecting surface 412 with a curved surface configuration arranged to reflect a light beam from the first image and to lead it toward the observer's eyeball. The reflecting surface 412 has a transmitting action to allow a light beam from the second image to enter the ocular optical system after passing through the see-through optical element 420. The see-through optical element 420 is placed closer to the second image than the reflecting surface 412 so as to be in close contact with the reflecting surface 412.

The third viewing optical system according to the present invention is arranged so that when the light beam from the outside world passes through the see-through optical element 420 and the prism optical system 410, the combined optical power P of the see-through optical element 420 and the prism optical system 410 is approximately zero. It should be noted that optical power P is the optical power at a position where the axial principal ray 402 passes.

If the optical power P of the see-through optical system is approximately zero as stated above, the outside world image viewed through the see-through optical system and the outside world image viewed with the naked eye are seen at the same position. Therefore, it becomes easy to see the see-through image. Consequently, when a head-mounted image display apparatus designed for a single eye is used, for example, it is easy to view the outside world image, particularly the axial portion of the outside world image, with both eyes. In this case, however, the optical system becomes a two-unit telephoto optical system, which comprises a combination of a positive optical unit and a negative optical unit or a combination of a negative optical unit and a positive optical unit, from the viewpoint of paraxial optical theory. Therefore, it is difficult to arrange the optical system so that the combined angular magnification β of the see-through optical element 420 and the prism optical system 410 is 1 at the same time as the optical power P of the see-through optical system is made approximately zero. Accordingly, it is difficult to make the magnification of the outside world image viewed through the see-through optical system and the magnification of the outside world image seen with the naked eye equal to each other. For this reason, binocular rivalry occurs between the left and right eyes with respect to the peripheral portion of the image field. Consequently, the image seen with the dominant eye is observed.

The fourth viewing optical system according to the present invention is arranged so that when the light beam from the outside world passes through the see-through optical element 420 and the prism optical system 410, the combined angular magnification β of the see-through optical element 420 and the prism optical system 410 is approximately 1. It should be noted that the angular magnification β is the angular magnification at a position where the axial principal ray 402 passes.

If the angular magnification β of the see-through optical system is approximately 1 as stated above, the outside world image viewed through the see-through optical system and the outside world image seen with the naked eye are of the same magnification. Therefore, when a head-mounted image display apparatus designed for a single eye is used, for example, it is easy to fuse two images seen with the right and left eyes. In this case, however, it is difficult to arrange the optical system so that the combined optical power P of the see-through optical element 420 and the prism optical system 410 is zero at the same time as the angular magnification β of the see-through optical system is made approximately 1. Accordingly the image-formation position of the outside world image viewed through the see-through optical system and the image-formation position of the outside world image seen with the naked eye are not coincident with each other. Consequently, it is somewhat difficult to observe a far object. However, there is no problem in the case of observing a near object.

The phrase "the optical power P is approximately zero" means that the optical power P is within the range defined by the following condition:

$$-0.002 < P < 0.002 (1/mm) \tag{12}$$

If the optical power P is not within the range defined by this condition, the image-formation position of the image viewed through the see-through optical system and that of the image seen with the naked eye become excessively different from each other. Accordingly, it becomes difficult to see the outside world image with both eyes.

The phrase "the angular magnification β is approximately 1" means that the angular magnification β is within the range defined by the following condition:

$$0.95 < \beta < 1.06 \tag{13}$$

If the angular magnification β is not within the range defined by this condition, the image viewed through the see-through optical system and the image seen with the naked eye are not formed with the same size. Accordingly, it is difficult to fuse the two images seen with the left and right eyes into a single image.

The above-described arrangement in which the see-through optical element 420 is placed in close contact with the reflecting surface 412 of the prism optical system 410 means a structure in which the first surface 421 of the see-through optical element 420 and the second surface 412 of the prism optical system 410 are formed with the same surface configuration and the first surface 421 and the second surface 412 are brought into close contact with or close proximity to each other or cemented together with an adhesive approximately equal in refractive index to these optical members. A structure in which an optical power produced by these surfaces can be ignored is included in the arrangement according to the present invention.

It is preferable from the viewpoint of aberration correction that the reflecting surfaces of the ocular optical system should have a rotationally asymmetric curved surface configuration that corrects decentration aberrations.

The reason for this is the same as stated above with reference to FIGS. 23 to 25.

The ocular optical system according to the present invention may also be arranged such that the above-described at least one surface having a reflecting action is decentered with respect to the axial principal ray and has a rotationally asymmetric surface configuration and further has a power. By adopting such an arrangement, decentration aberrations produced as the result of giving a power to the reflecting surface can be corrected by the surface itself. In addition, the power of the refracting surfaces of the prism is reduced, and thus chromatic aberration produced in the prism can be minimized.

The rotationally asymmetric surface used in the present invention should preferably be an anamorphic surface or a plane-symmetry free-form surface having only one plane of symmetry. Free-form surfaces used in the present invention are defined by the above equation (a). It should be noted that the Z-axis of the defining equation is the axis of a free-form surface.

It should be noted that the above defining equation (a) is shown as merely an example, and that the feature of the present invention resides in that rotationally asymmetric aberrations due to decentration are corrected and, at the same time, productivity is improved by using a rotationally asymmetric surface having only one plane of symmetry. Therefore, the same advantageous effect can be obtained for any other defining equation that expresses such a rotationally asymmetric surface.

In the third viewing optical system according to the present invention, it is desirable that the see-through optical system should be arranged to cancel the optical power produced by the ocular optical system so that the combined optical power given to the light beam from the second image when it passes through the see-through optical element and the ocular optical system satisfies the following conditions:

$$-0.002 < Px < 0.002 (1/mm) \tag{14}$$

$$-0.002 < Py < 0.002 (1/mm) \tag{15}$$

where when the decentration direction of the entire optical system is a Y-axis direction, and a plane parallel to the axial principal ray is defined as a YZ-plane, and further a direction perpendicularly intersecting the YZ-plane is defined as an X-axis direction, Px and Py are powers in the X- and Y-axis directions, respectively, of the entire optical system.

The meaning of the upper and lower limits of the conditions (14) to (15) is the same as that of the upper and lower limits of the condition (12).

Regarding the powers Px and Py in the X- and Y-axis directions of the entire optical system, it is more desirable to satisfy the following conditions:

$$-0.001<Px<0.001(1/mm) \quad (14\text{-}1)$$

$$-0.001<Py<0.001(1/mm) \quad (15\text{-}1)$$

It is also desirable to satisfy at least either one of the following conditions:

$$-0.0005<Px<0.0005(1/mm) \quad (14\text{-}2)$$

$$-0.0005<Py<0.0005(1/mm) \quad (15\text{-}2)$$

In the fourth viewing optical system according to he present invention, it is desirable that the see-through optical system should be arranged to cancel the angular magnification produced by the ocular optical system so that the combined optical magnification given to the light beam from the second image when it passes through the see-through optical element and the ocular optical system satisfies the following conditions:

$$0.97<\beta x<1.03 \quad (16)$$

$$0.95<\beta y<1.06 \quad (17)$$

where when the decentration direction of the entire optical system is a Y-axis direction, and a plane parallel to the axial principal ray is defined as a YZ-plane, and further a direction perpendicularly intersecting the YZ-plane is defined as an X-axis direction, $\beta x$ and $\beta y$ are angular magnifications in the X- and Y-axis directions, respectively, of the entire optical system.

It should be noted, however, that the above conditions (16) and (17) apply in a case where the vertical direction of a man is the Y-axis direction. When the vertical direction of a man is the X-axis direction, the conditions (16) and (17) are as follows:

$$0.95<\beta x<1.06 \quad (16)'$$

$$0.97<\beta y<1.03 \quad (17)'$$

The reason why there is a difference in angular magnification between the vertical and horizontal directions is as follows. The human eye can see more finely in the horizontal (X-axis) direction than in the vertical (Y-axis) direction. Therefore, the tolerances on βY in the Y-axis direction can be somewhat relaxed, and thus there is a difference between the conditions (16) and (17).

The meaning of the upper and lower limits of the conditions (16) and (17) is the same as that of the upper and lower limits of the condition (13).

Regarding the angular magnifications $\beta x$ and $\beta y$ in the X- and Y-axis directions, respectively, of the entire optical system, it is more desirable to satisfy the following conditions:

$$0.99<\beta x<1.01 \quad (16\text{-}1)$$

$$0.99<\beta y<1.01 \quad (17\text{-}1)$$

It is even more desirable to satisfy the following conditions:

$$0.995<\beta x<1.005 \quad (16\text{-}2)$$

$$0.995<\beta y<1.005 \quad (17\text{-}2)$$

Incidentally, the ocular optical system should preferably have at least a prism member filled with a medium having a refractive index larger than 1, as illustrated in FIG. 44. The prism member includes at least three optical surface having at least either one of a transmitting optical action and a reflecting optical action. The three surfaces are a first surface, a second surface, and a third surface. The third surface is an entrance surface through which a light beam from the first image enters the prism member. The second surface is placed in close contact with the see-through optical element. The second surface has a transmitting action to allow a light beam from the second image to enter the prism member after passing through the see-through optical element. The second surface further has a reflecting action to reflect the light beam from the first image in the prism member. The second surface has at least a curved reflecting surface. The first surface is an exit surface through which the light beam from the first image exits from the prism member.

In this case, it is desirable that at least either the first surface or the third surface should have a rotationally asymmetric curved surface configuration that corrects decentration aberrations, and that the curved surface configuration should be either an anamorphic surface or a plane-symmetry free-form surface having only one plane of symmetry.

It is desirable for the first surface to be arranged to serve as both a reflecting surface and a transmitting surface for the light beam in the prism member.

In this case, the first surface serving as both a reflecting surface and a transmitting surface should preferably be a totally reflecting surface arranged so that the reflected light beam is incident on the first surface at an angle exceeding the total reflection critical angle, and thereafter, the light beam reflected back from the reflecting surface is incident on the first surface at an angle not exceeding the total reflection critical angle to exit from the prism member.

In the third and fourth viewing optical systems according to the present invention, the ocular optical system and the see-through optical element may be arranged so that a first image viewing field range determined by the light beam from the first image as it exits from the ocular optical system is formed within a second image viewing field range determined by the light beam from the second image as it passes through the see-through optical element and a part of the ocular optical system.

Furthermore, the ocular optical system and the see-through optical element may be arranged as follows. The optical diameter of the see-through optical element is set smaller than the reflecting surface of the ocular optical system, which is placed to face the see-through optical element, and the see-through optical element is placed to face a region of the reflecting surface closer to the image forming member so that the light beam transmitting region of the reflecting surface that transmits the light beam entering through the see-through optical element shifts toward the image forming member with respect to the light beam reflecting region of the reflecting surface. In addition, a portion of the reflecting surface that does not directly face the see-through optical element is provided with a light-blocking coating to prevent entrance of flare rays from the outside world.

It is possible to place a light-blocking member capable of switching between transmission and cutoff of the light beam from the outside world image or switching between transmission and dimming of the light beam in front of the see-through optical element so that the second image is the outside world image.

In addition, another display device that forms an image different from the first image may be placed on the side of the see-through optical element remote from the ocular optical system so that the second image is formed by the display device.

The viewing optical system may be arranged such that a light-blocking member capable of switching between transmission and cutoff of the light beam from the outside world image or switching between transmission and dimming of the light beam is placed in front of the see-through optical element so that the second image is the outside world image, and a display device for displaying a third image is provided between the outside world image and the see-through optical element.

The third and fourth viewing optical systems according to the present invention may have a line-of-sight detecting device for detecting the observer's line of sight. The line-of-sight detecting device includes a light source for pupil illumination and a light-receiving element for receiving the image of the pupil, which are disposed at respective positions out of the optical path in the ocular optical system for leading the light beam from the first image and the optical path in the see-through optical element for leading the light beam from the second image.

In this case, the line-of-sight detecting device may be arranged such that at least the image of the pupil is passed through the optical path of the ocular optical system and separated from the optical path between the ocular optical system and the first image so as to be led to the light-receiving element. Thus, the optical path of the line-of-sight detecting device is formed by using the viewing optical path. Consequently, it is possible to eliminate the influence of outside world light that may enter through the optical path of the line-of-sight detecting device and also the influence of stray light from the pupil-illuminating light source. It is also possible to eliminate the greater part of the line-of-sight detecting optical system. Accordingly, it is possible to achieve a cost reduction and a size reduction.

It is desirable that the ocular optical system, the see-through optical element and the exit pupil should be positioned so as to satisfy the following condition:

$$\theta \leq 60°$$

where when the optical axis of the light beam from the first image that exits from the ocular optical system is defined as a visual axis, $\theta$ is the angle defined at the exit pupil by the ocular optical system in a direction away from the image forming member with respect to the visual axis.

If the above-described condition is satisfied, it is possible not only to perform observation through the see-through optical path but also to see a keyboard, for example, placed below the viewing optical system directly without looking through the viewing optical system.

It should be noted that the present invention includes a head-mounted viewing optical apparatus having an apparatus body unit including any one of the foregoing viewing optical systems, in which the ocular optical system, the see-through optical element and the image forming member for forming the first image are retained with the required spacings therebetween by a retaining device. The head-mounted viewing optical apparatus further includes a support device for supporting the apparatus body unit on the observer's head.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Examples 1 to 4 of the viewing optical system according to the present invention will be described below. These examples will be described on the basis of backward ray tracing. It should be noted that the optical system according to each example can be used as a viewing optical system by disposing a reflection type image display device in the image plane and placing the pupil of an observer's eyeball at the pupil position. It should be noted that constituent parameters of the examples will be shown later.

Figure 1:
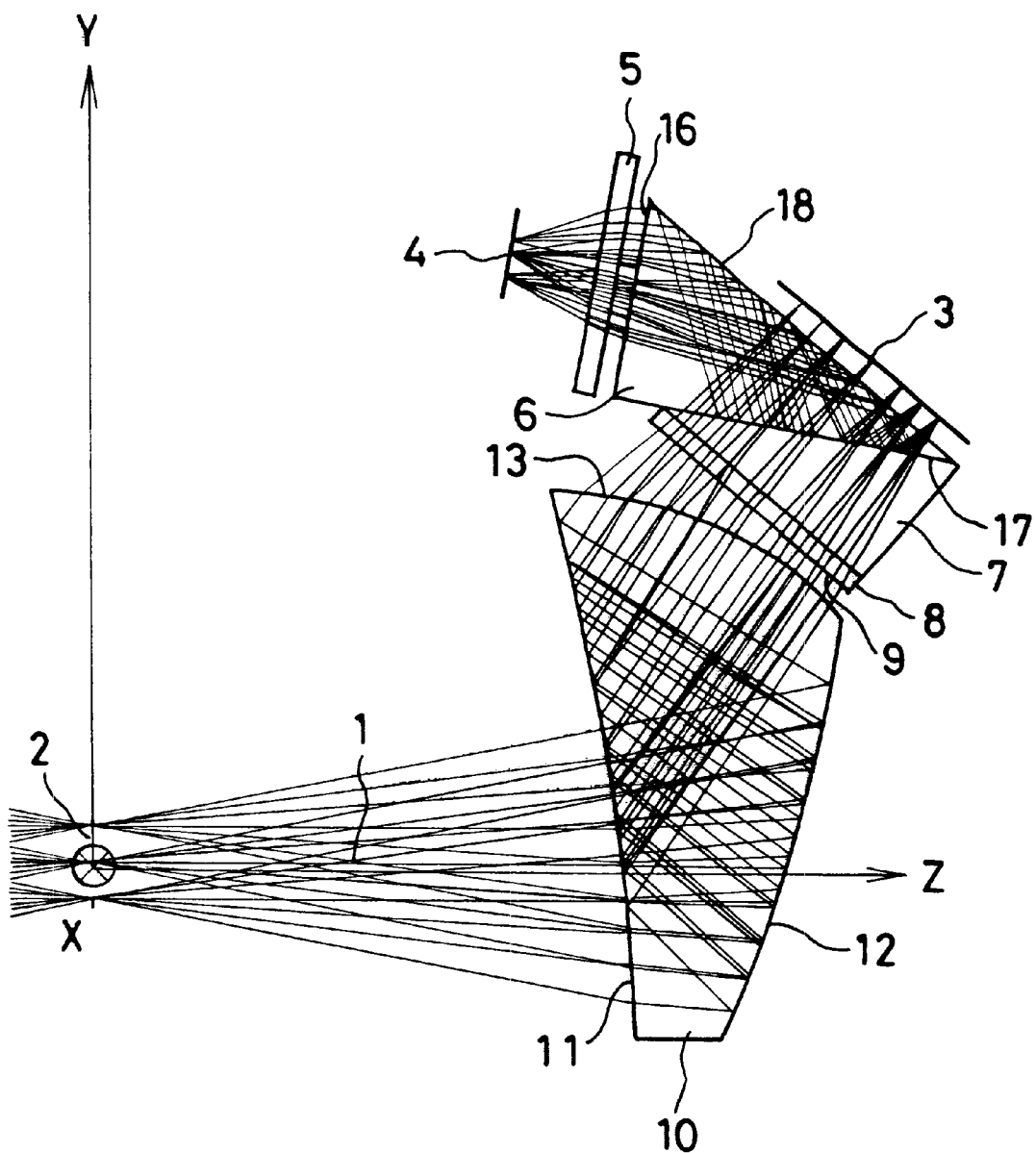
FIG. 1 is a sectional view of a viewing optical system according to Example 1 of the present invention.

In Examples 1 to 4, as shown in FIG. 1, the axial principal ray 1 is defined by a light ray from the object center that passes through the center of the pupil 2 and reaches the center of the image plane 3. The position at which the axial principal ray 1 is incident on the plane of the pupil 2 is defined as the origin of each optical surface constituting the viewing optical system. The direction in which the axial principal ray 1 is incident on the plane of the pupil 2 is defined as a positive direction of a Z-axis. A plane containing both the Z-axis and the center of the image plane 3 is defined as a YZ-plane. An axis passing through the origin and perpendicularly intersecting the YZ-plane is defined as an X-axis. The direction in which the X-axis extends from the obverse side to the reverse side of the plane of the figure is defined as a positive direction of the X-axis. An axis that constitutes a right-handed orthogonal coordinate system in combination with the X- and Z-axes is defined as a Y-axis. In FIG. 1, a coordinate system determined with respect to the origin is shown. It should be noted that, in Example 2, a hypothetic plane is taken in a plane perpendicular to the axial principal ray 1 immediately after it exits from the third surface 13 of the prism 10. The direction in which the axial principal ray 1 exits from the hypothetic plane is defined as a new Z-axis direction. The direction of travel of the axial principal ray 1 is defined as a positive direction of the Z-axis. A plane containing both the Z-axis and the center of the image plane 3 is defined as a YZ-plane. An axis passing through the origin and perpendicularly intersecting the YZ-plane is defined as an X-axis. The direction in which the X-axis extends from the obverse side to the reverse side of the plane of the figure is defined as a positive direction of the X-axis. An axis that constitutes a right-handed orthogonal coordinate system in combination with the X- and Z-axes is defined as a Y-axis.

In Examples 1 to 4, the decentration of each surface of the prism 10 is made in the YZ-plane of the coordinate system determined with respect to the center of the pupil 2.

Regarding decentered surfaces of the prism 10, each surface is given displacements in the X-, Y- and Z-axis directions (X, Y and Z, respectively) of the vertex position of the surface from the origin of the coordinate system determined with respect to the center of the pupil 2, and tilt angles (degrees) of the center axis of the surface [the Z-axis of the above equation (a) in regard to free-form surfaces; the Z-axis of the following equation (b) in the case of aspherical surfaces] with respect to the X-, Y- and Z-axes ($\alpha$, $\beta$ and $\gamma$, respectively). In this case, the positive $\alpha$ and $\beta$ mean counterclockwise rotation relative to the positive directions of the corresponding axes, and the positive $\gamma$ means clockwise rotation relative to the positive direction of the Z-axis.

In Example 2, the surface (surface No. 11) of the deviation angle compensating prism 7 on the side thereof closer to the illuminating light guide prism 6 and the surface (surface Nos. 12 and 20) of the illuminating light guide prism 6 on the side thereof closer to the deviation angle compensating prism 7 are each given tilt angles (degrees) of the center axis of the surface with respect to the X-, Y- and Z-axes ($\alpha$, $\beta$ and $\gamma$, respectively) of the coordinate system determined with respect to the hypothetic plane. The lens surface (surface No. 22) of the illuminating light guide prism 6 is given displacements in the X-, Y- and Z-axis directions (X, Y and Z, respectively) of the vertex position of the surface from the origin of the coordinate system determined with respect to the hypothetic plane, and tilt angles (degrees) of the center axis of the surface with respect to the X-, Y- and Z-axes ($\alpha$, $\beta$ and $\gamma$, respectively).

Among optical surfaces constituting the optical system in each example, a specific surface and a surface subsequent thereto are given a surface separation when these surfaces form a coaxial optical system. In addition, the refractive index and Abbe's number of each medium are given according to the conventional method.

Figure 26:
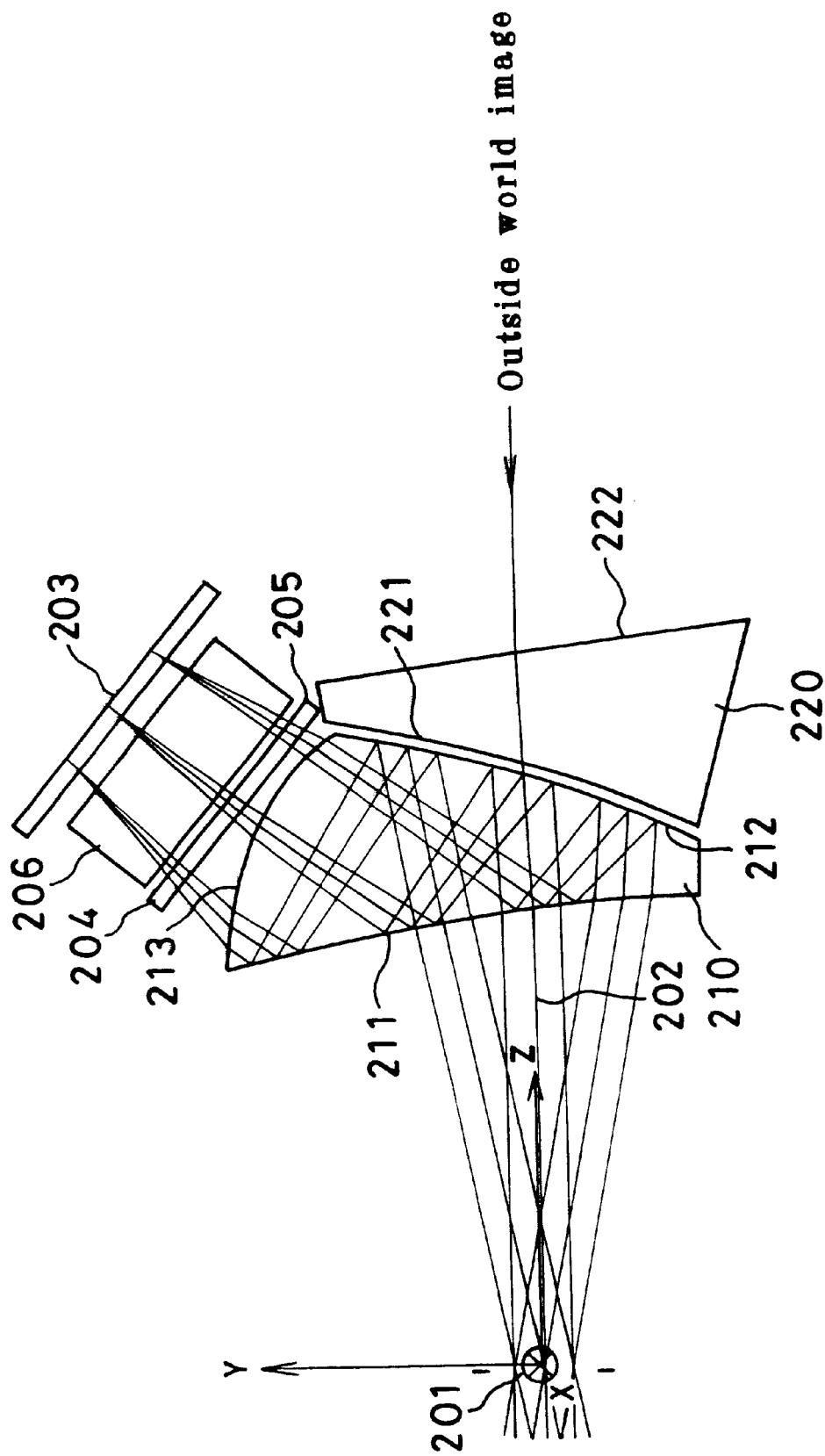
FIG. 26 is a ray path diagram showing a viewing optical system according to Example 5 of the present invention.

Examples 5 and 6 of the second viewing optical system according to the present invention will also be described on the basis of backward ray tracing. As shown in FIG. 26, the optical system is arranged to function as a viewing optical apparatus for viewing a displayed image by disposing an image display device in the image plane 203 of the ocular optical system and placing the pupil of an observer's eyeball at the position of the exit pupil 201. It is possible to perform see-through observation of the outside world by viewing the outside world from the exit pupil 201 through the prism optical system 210, which constitutes the ocular optical system, and the see-through optical element 220. It should be noted that the constituent parameters of these examples will also be shown later.

In Examples 5 and 6, as shown in FIG. 26, the axial principal ray 202 is defined by a light ray from the object center that passes through the center of the exit pupil 201 and reaches the center of the image plane 203 or the center of the outside world image. The center of the pupil 201 is defined as the origin of each optical surface constituting the viewing optical system. The direction in which the axial principal ray 202 is incident on the first surface 211 of the viewing optical system is defined as a positive direction of a Z-axis. A plane containing both the Z-axis and the center of the image plane 203 is defined as a YZ-plane. An axis passing through the origin and perpendicularly intersecting the YZ-plane is defined as an X-axis. The direction in which the X-axis extends from the obverse side to the reverse side of the plane of the figure is defined as a positive direction of the X-axis. An axis that constitutes a right-handed orthogonal coordinate system in combination with the X- and Z-axes is defined as a Y-axis. In FIG. 26, a coordinate system determined with respect to the origin is shown.

In Examples 5 and 6, the decentration of each surface of the prism members 210 and 220 is made in the YZ-plane of the coordinate system determined with respect to the center of the pupil 201, and the one and only plane of symmetry of each rotationally asymmetric free-form surface is the YZ-plane.

Regarding decentered surfaces of the prism members 210 and 220, each surface is given displacements in the X-, Y- and Z-axis directions (X, Y and Z, respectively) of the vertex position of the surface from the origin of the coordinate system determined with respect to the center of the pupil 201, and tilt angles (degrees) of the center axis of the surface [the Z-axis of the above equation (a) in regard to free-form surfaces; the Z-axis of the following equation (b) in the case of aspherical surfaces] with respect to the X-, Y- and Z-axes ($\alpha$, $\beta$ and $\gamma$, respectively). In this case, the positive $\alpha$ and $\beta$ mean counterclockwise rotation relative to the positive directions of the corresponding axes, and the positive $\gamma$ means clockwise rotation relative to the positive direction of the Z-axis.

Among optical surfaces constituting the optical systems of Examples 5 and 6, a specific surface and a surface subsequent thereto are given a surface separation when these surfaces form a coaxial optical system. In addition, the refractive index and Abbe's number of each medium are given according to the conventional method.

Figure 44:
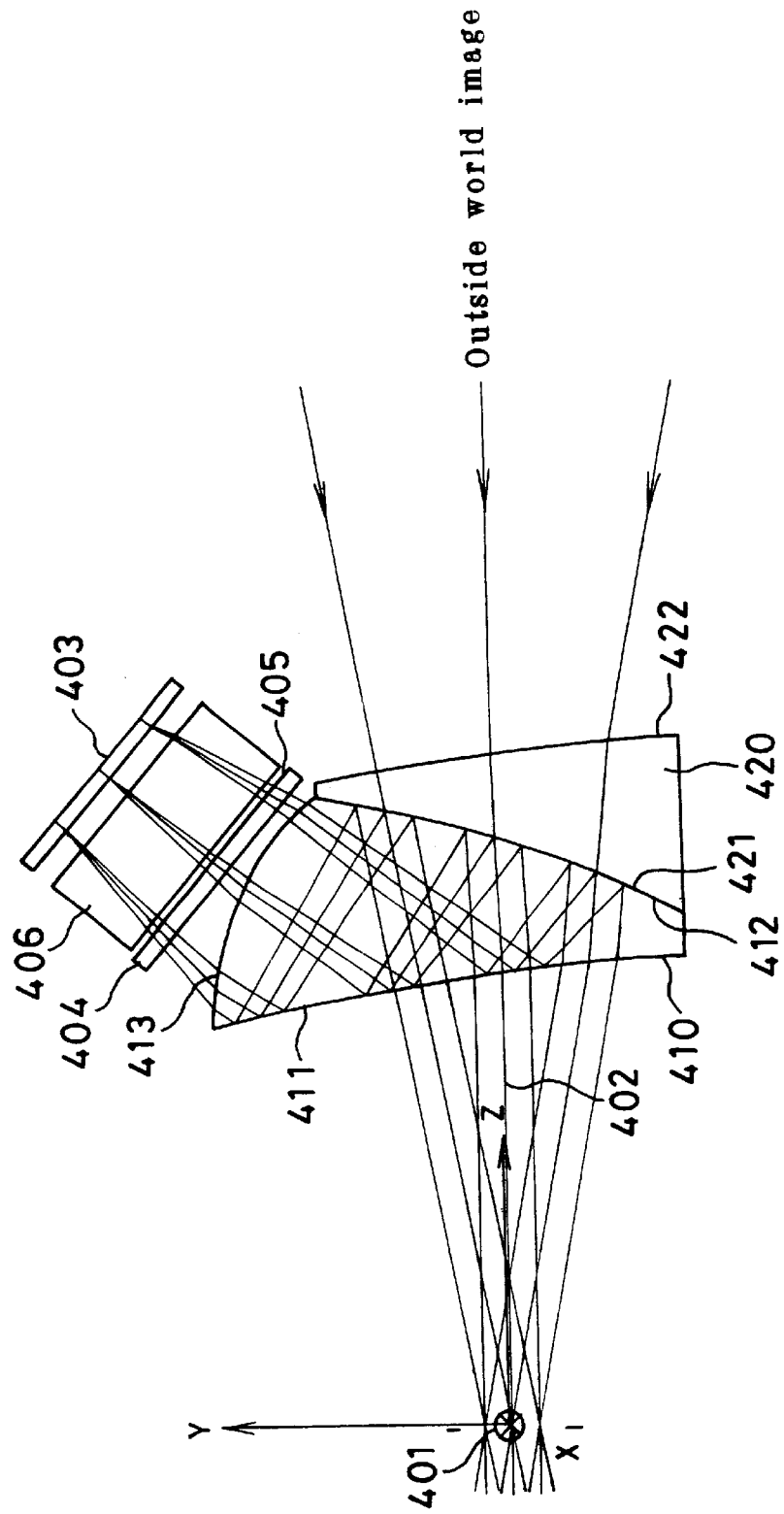
FIG. 44 is a ray path diagram of a viewing optical system according to Example 7 of the present invention.

Examples 7 and 8 of the third and fourth viewing optical systems according to the present invention will also be described on the basis of backward ray tracing. As shown in FIG. 44, the optical system is arranged to function as a viewing optical apparatus for viewing a displayed image by disposing an image display device in the image plane 403 of the ocular optical system and placing the pupil of an observer's eyeball at the position of the exit pupil 401. It is possible to perform see-through observation of the outside world by viewing the outside world from the exit pupil 401 through the prism optical system 410, which constitutes the ocular optical system, and the see-through optical element 420. It should be noted that the constituent parameters of these examples will also be shown later.

In Examples 7 and 8, as shown in FIG. 44, the axial principal ray 402 is defined by a light ray from the object center that passes through the center of the exit pupil 401 and reaches the center of the image plane 403 or the center of the outside world image. The center of the pupil 401 is defined as the origin of each optical surface constituting the viewing optical system. The direction in which the axial principal ray 402 is incident on the first surface 411 of the viewing optical system is defined as a positive direction of a Z-axis. A plane containing both the Z-axis and the center of the image plane 403 is defined as a YZ-plane. An axis passing through the origin and perpendicularly intersecting the YZ-plane is defined as an X-axis. The direction in which the X-axis extends from the obverse side to the reverse side of the plane of the figure is defined as a positive direction of the X-axis. An axis that constitutes a right-handed orthogonal coordinate system in combination with the X- and Z-axes is defined as a Y-axis. In FIG. 44, a coordinate system determined with respect to the origin is shown.

In Examples 7 and 8, the decentration of each surface of the prism members 410 and 420 is made in the YZ-plane of the coordinate system determined with respect to the center of the pupil 401, and the one and only plane of symmetry of each rotationally asymmetric free-form surface is the YZ-plane.

Regarding decentered surfaces of the prism members 410 and 420, each surface is given displacements in the X-, Y- and Z-axis directions (X, Y and Z, respectively) of the vertex position of the surface from the origin of the coordinate system determined with respect to the center of the pupil 401, and tilt angles (degrees) of the center axis of the surface [the Z-axis of the above equation (a) in regard to free-form surfaces; the Z-axis of the following equation (b) in the case of aspherical surfaces] with respect to the X-, Y- and Z-axes ($\alpha$, $\beta$ and $\gamma$, respectively). In this case, the positive $\alpha$ and $\beta$ mean counterclockwise rotation relative to the positive directions of the corresponding axes, and the positive $\gamma$ means clockwise rotation relative to the positive direction of the Z-axis.

Among optical surfaces constituting the optical systems of Examples 7 and 8, a specific surface and a surface subsequent thereto are given a surface separation when these surfaces form a coaxial optical system. In addition, the refractive index and Abbe's number of each medium are given according to the conventional method.

The configuration of each free-form surface used in the present invention is defined by the above equation (a). The Z-axis of the defining equation is the axis of the free-form surface.

Aspherical surfaces used in the present invention are rotationally symmetric aspherical surfaces given by the following equation:

$$Z=(Y^2/R)/[1+\{1-(1+K)Y^2/R^2\}^{1/2}]+AY^4+BY^6+CY^8+DY^{10}+\ldots \quad (b)$$

In the above equation, Z is an optical axis (axial principal ray) for which the direction of travel of light is defined as a positive direction, and Y is taken in a direction perpendicular to the optical axis. R is a paraxial curvature radius, K is a conic constant, and A, B, C, D . . . are 4th-, 6th-, 8th- and 10th-order aspherical coefficients, respectively. The Z-axis of this defining equation is the axis of the rotationally symmetric aspherical surface.

In the constituent parameters (shown later), those terms concerning free-form surfaces and aspherical surfaces for which no data is shown are zero. The refractive index is expressed by the refractive index for the spectral d-line (wavelength: 587.56 nanometers). Lengths are given in millimeters.

Free-form surfaces may also be defined by Zernike polynomials. That is, the configuration of a free-form surface may be defined by the following equation (c). The Z-axis of the defining equation (c) is the axis of Zernike polynomial. A rotationally asymmetric surface is defined by polar coordinates of the height of the Z-axis with respect to the XY-plane. In the equation (c), A is the distance from the Z-axis in the XY-plane, and R is the azimuth angle about the Z-axis, which is expressed by the angle of rotation measured from the Z-axis.

$x=R\times\cos(A)$ $y=R\times\sin(A)$ $Z=D_2+D_3R\cos(A)+D_4R\sin(A)+D_5R^2\cos(2A)+D_6(R^2-1)+D_7R^2\sin(2A)+$ $D_8R^3\cos(3A)+D_9(3R^3-2R)\cos(A)+D_{10}(3R^3-2R)\sin(A)+D_{11}R^3\sin(3A)+D_{12}R^4\cos(4A)+D_{13}(4R^4-3R^2)\cos(2A)+$ $D_{14}(6R^4-6R^2+1)+D_{15}(4R^4-3R^2)\sin(2A)+D_{16}R^4\sin(4A)+D_{17}R^5\cos(5A)+D_{18}(5R^5-4R^3)\cos(3A)+$ $D_{19}(10R^5-12R^3+3R)\cos(A)+D_{20}(10R^5-12R^3+3R)\sin(A)+$ $D_{21}(5R^5-4R^3)\sin(3A)+D_{22}R^5\sin(5A)+D_{23}R^6\cos(6A)+D_{24}(6R^6-5R^4)\cos(4A)+$ $D_{25}(15R^6-20R^4+6R^2)\cos(2A)+D_{26}(20R^6-30R^4+12R^2-1)+$ $D_{27}(15R^6-20R^4+6R^2)\sin(2A)+D_{28}(6R^6-5R^4)\sin(4A)+D_{29}R^6\sin(6A)$
$\ldots \quad$ (c)

In the above equation, to design an optical system symmetric with respect to the X-axis direction, $D_4$, $D_5$, $D_6$, $D_{10}$, $D_{11}$, $D_{12}$, $D_{13}$, $D_{14}$, $D_{20}$, $D_{21}$, $D_{22}$ should be used.

Other examples of surfaces usable in the present invention are expressed by the following defining equation (d):

$$Z = \Sigma\Sigma C_{nm} XY$$

Assuming that k=7 (polynomial of degree 7), for example, a free-form surface is expressed by an expanded form of the above equation as follows:

$$\begin{aligned}Z = &\, C_2 + C_3Y + C_4|X| + C_5Y^2 + C_6Y|X| + C_7X^2 + C_8Y^3 + \\&C_9Y^2|X| + C_{10}YX^2 + C_{11}|X^3| + C_{12}Y^4 + C_{13}Y^3|X| + \\&C_{14}Y^2X^2 + C_{15}Y|X^3| + C_{16}X^4 + C_{17}Y^5 + C_{18}Y^4|X| + \\&C_{19}Y^3X^2 + C_{20}Y^2|X^3| + C_{21}YX^4 + C_{22}|X^5| + C_{23}Y^6 + \\&C_{24}Y^5|X| + C_{25}Y^4X^2 + C_{26}Y^3|X^3| + C_{27}Y^2X^4 + \\&C_{28}Y|X^5| + C_{29}X^6 + C_{30}Y^7 + C_{31}Y^6|X| + C_{32}Y^5X^2 + \\&C_{33}Y^4|X^3| + C_{34}Y^3X^4 + C_{35}Y^2|X^5| + C_{36}YX^6 + C_{37}|X^7|\end{aligned} \quad (d)$$

Although in the examples of the present invention the surface configuration is expressed by a free-form surface using the above equation (a), it should be noted that the same advantageous effect can be obtained by using the above equation (c) or (d), as a matter of course.

It should be noted that diffractive optical elements are described, for example, in Chapters VI and VII of "Small-Sized Optical Elements for Optical Designers" (Optronics) and "SPIE", Vol. 126, p.46–53 (1977). It is possible to obtain a diffractive optical element in which the Abbe's number ν in the visible region is −3.453 and the partial dispersion ratio $\theta_{g,F}$ is 0.03. In addition, the diffraction grating interval can be changed freely. Therefore, the diffractive optical element can be treated as equivalent to any aspherical lens surface. In the following, "ultra-high index method" described in "SPIE", Vol. 126, p.46–53 (1977) is used.

FIG. 1 is a sectional view of Example 1 of the present invention taken along the YZ-plane containing the optical axis. In the viewing optical system according to this example, the horizontal field angle is 22°. The size of the image display device is 9.6×7.2 millimeters, and the diagonal length H thereof is 12 millimeters. The distance L between the intersection between the display surface 3 of the image display devise and the optical axis and the intersection between the entrance surface 13 of the prism 10 and the optical axis is 12.632 millimeters. Hence, L/H=1.053 [the value of the condition (1)]. The pupil diameter is 4 millimeters, and the distance (eye relief) from the exit surface 11 of the prism 10 to the exit pupil is 30.0 millimeters.

This example has, in order in which light passes from the object side in backward ray tracing, an exit pupil 2, a prism 10, a diffractive optical element 8, a deviation angle compensating prism 7, an illuminating light guide prism 6, and an image plane (i.e. the display surface of a reflection type image display device) 3. A light source 4 and a Fresnel lens 5 are disposed on the illuminating light entrance side of the illuminating light guide prism 6.

The prism 10 has a first surface 11, a second surface 12, and a third surface 13. The first surface 11 allows a light beam from the object side to enter the prism 10 and reflects the light beam reflected from the second surface 12 in the prism 10. The second surface 12 reflects the light beam entering through the first surface 11 in the prism 10. The third surface 13 allows the light beam reflected from the first surface 11 to exit from the prism 10. Thus, the first surface 11 is an optical surface having both a transmitting optical action and a reflecting optical action.

The diffractive optical element 8 has a diffraction surface 9 on the side thereof closer to the prism 10. The surface on the other side of the diffractive optical element 8 is cemented to the deviation angle compensating prism 7.

The illuminating light guide prism 6 is a triangular prism having a first surface 16, a second surface 17, and a third surface 18. The first surface 16 is a surface through which a divergent light beam from the light source 4 is introduced into the prism 6 after the beam has been formed into an approximately parallel light beam through the Fresnel lens 5. The first surface 16 is disposed at right angles to the axis of the illuminating light. The introduced illuminating light is totally reflected by the third surface 18 and further reflected by the second surface 17, which is a cemented surface between the illuminating light guide prism 6 and the deviation angle compensating prism 7 and forms a polarization beam splitter surface. Then, the reflected light passes through the third surface 18 to illuminate the display surface of a reflection type image display device, e.g. a reflection type liquid crystal display device, placed in the image plane 3. The illuminating light is incident on the display surface approximately at right angles thereto.

Display light from the display surface of the reflection type liquid crystal display device placed in the image plane 3 enters the illuminating light guide prism 6 through the third surface 18 and passes through the polarization beam splitter surface as the second surface 17 to enter the deviation angle compensating prism 7. Then, the light passes through the diffractive optical element 8, which is placed on the exit-side surface of the deviation angle compensating prism 7. The light is diffracted by the diffraction surface 9 to enter the prism 10 through the third surface 13. The light is totally reflected by the first surface 11 and further reflected by the second surface 12 to exit from the prism 10 while being refracted through the first surface 11. Then, the light enters the observer's eyeball placed at the position of the exit pupil 2 to form an enlarged image of the displayed image of the reflection type liquid crystal display device.

In the constituent parameters (shown later), the surfaces Nos. 2 to 5 form the prism 10. The surface No. 6 is the diffraction surface 9. The surface No. 7 is the substrate surface of the diffractive optical element 8 having the diffraction surface 9. The space between surface Nos. 8 and 9 forms the deviation angle compensating prism 7. The surface Nos. 9 and 13 are the polarization beam splitter surface 17. The space between surface Nos. 9 and 10 and the space between surface Nos. 12 and 13 and further the space between the surface Nos. 13 to 15 form the illuminating light guide prism 6. The space between the surface Nos. 16 and 17 forms the Fresnel lens 5. The surface No. 16 is the Fresnel lens surface. The surface No. 18 is the light source 4. The displacements of each of the surface Nos. 2 to 18 are expressed by the amounts of displacement from the center of the exit pupil 2 of surface No. 1.

Figure 2:
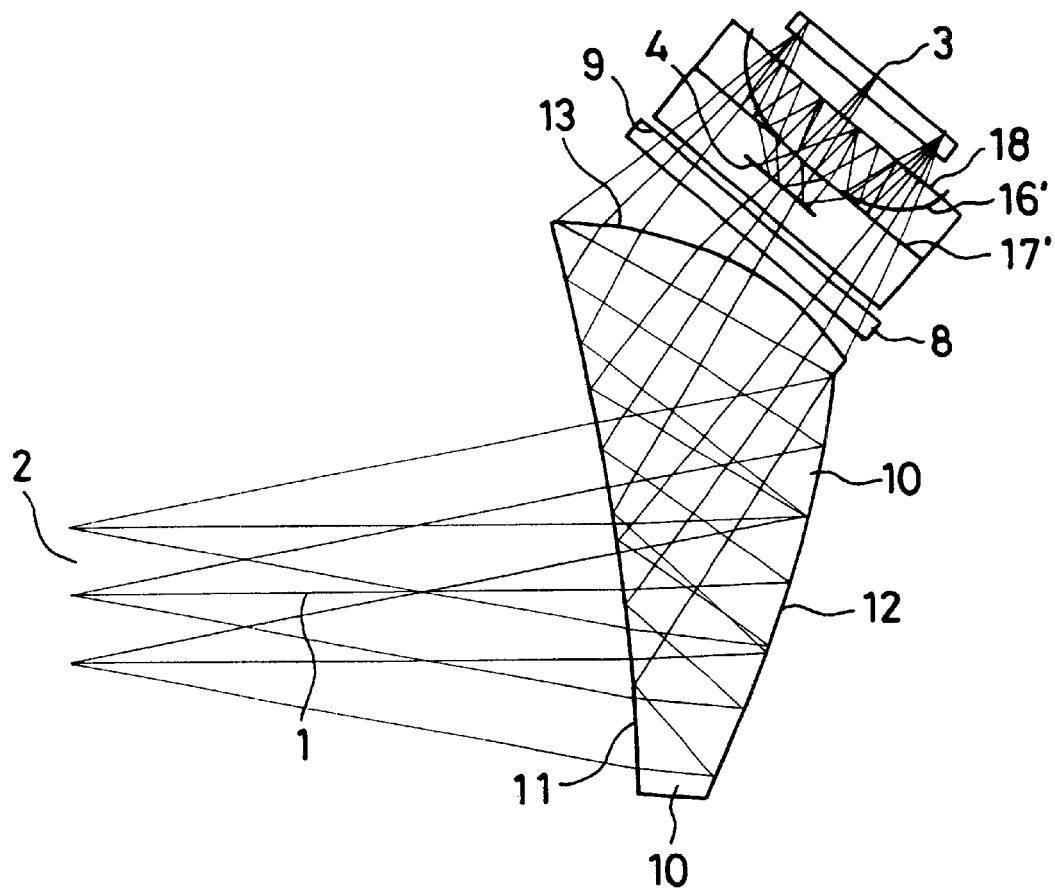
FIG. 2 is a sectional view taken along the YZ-plane, showing a viewing optical system according to Example 2 of the present invention.
Figure 3:
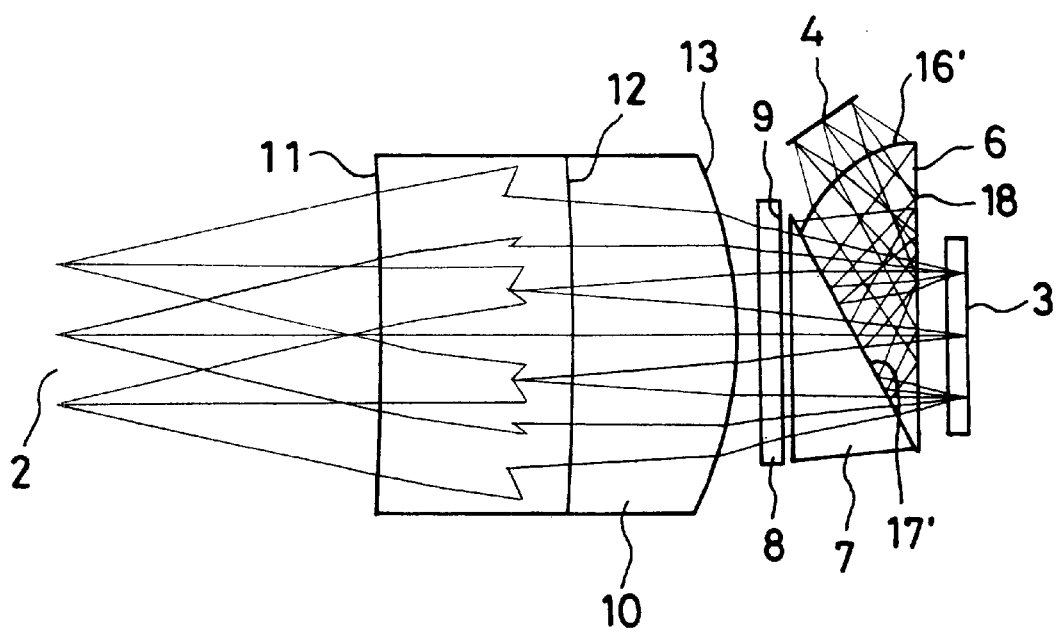
FIG. 3 is a ray path diagram of the viewing optical system according to Example 2 of the present invention in the XZ-plane.

FIG. 2 is a sectional view of Example 2 of the present invention taken along the YZ-plane containing the optical axis. FIG. 3 is a ray path diagram of the viewing optical system in the XZ-plane. In the viewing optical system according to this example, the horizontal field angle is 22°. The size of the image display device is 9.6×7.2 millimeters, and the diagonal length H thereof is 11.81 millimeters. The distance L between the intersection between the display surface 3 of the image display device and the optical axis and the intersection between the entrance surface 13 of the prism 10 and the optical axis is 13.35 millimeters. Hence, L/H=1.13084 [the value of the condition (1)]. The pupil diameter is 4 millimeters, and the distance (eye relief) from the exit surface 11 of the prism 10 to the exit pupil is 32 millimeters.

This example has, in order in which light passes from the object side in backward ray tracing, an exit pupil 2, a prism 10, a diffractive optical element 8, a deviation angle compensating prism 7, an illuminating light guide prism 6, and an image plane (i.e. the display surface of a reflection type image display device) 3. A lens surface 16' is disposed on the illuminating light entrance side of the illuminating light guide prism 6. A light source 4 is disposed in front of the lens surface 16'. As will be clear from FIG. 3, the feature of this example resides in that the light source 4 is decentered in the X-axis direction with respect to the illuminating light guide prism 6, and that the polarization beam splitter surface 17' of the illuminating light guide prism 6 is tilted about the Y-axis (the surfaces 11 to 13 of the prism 10 are tilted about the X-axis), and further that the polarization beam splitter surface 17' is not a plane surface but a free-form surface having a power.

The prism 10 is arranged in the same way as in Example 1. That is, the prism 10 has a first surface 11, a second surface 12, and a third surface 13. The first surface 11 allows a light beam from the object side to enter the prism 10 and reflects the light beam reflected from the second surface 12 in the prism 10. The second surface 12 reflects the light beam entering through the first surface 11 in the prism 10. The third surface 13 allows the light beam reflected from the first surface 11 to exit from the prism 10. Thus, the first surface 11 is an optical surface having both a transmitting optical action and a reflecting optical action.

The diffractive optical element 8 has a diffraction surface 9 on the side thereof remote from the prism 10 (i.e. on the side closer to the deviation angle compensating prism 7).

The illuminating light guide prism 6 is a triangular prism having a first surface 16', a second surface 17', and a third surface 18. The first surface 16' is a convex spherical lens surface. The second surface 17' is a non-plane free-form surface. The lens surface of the first surface 16' introduces a divergent light beam from the light source 4 into the prism 6 after converting it into a divergent light beam close to a parallel light beam. The first surface 16' is disposed at right angles to the axis of the illuminating light. The introduced illuminating light is totally reflected by the plane surface as the third surface 18 and incident on the free-form surface as the second surface 17', which is a cemented surface between the illuminating light guide prism 6 and the deviation angle compensating prism 7 and forms a polarization beam splitter surface. The light incident on the second surface 17' is reflected in the form of an approximately parallel light beam while being corrected for decentration aberrations to a certain extent. Then, the reflected light passes through the third surface 18 to illuminate the display surface of a reflection type image display device, e.g. a reflection type liquid crystal display device, placed in the image plane 3. The illuminating light is incident on the display surface approximately at right angles thereto.

Display light from the display surface of the reflection type liquid crystal display device placed in the image plane 3 enters the illuminating light guide prism 6 through the third surface 18 and passes through the polarization beam splitter surface as the second surface 17' to enter the deviation angle compensating prism 7. Then, the light is diffracted by the diffraction surface 9 of the diffractive optical element 8, which is placed at the exit side of the deviation angle compensating prism 7. The light enters the prism 10 through the third surface 13 and is totally reflected by the first surface 11 and further reflected by the second surface 12 to exit from the prism 10 while being refracted through the first surface 11. Then, the light enters the observer's eyeball placed at the position of the exit pupil 2 to form an enlarged image of the displayed image of the reflection type liquid crystal display device.

In the constituent parameters (shown later), the surfaces Nos. 2 to 5 form the prism 10. The surface No. 6 is a hypothetic plane. The surface No. 8 is the substrate surface of the diffractive optical element 8 having the diffraction surface 9. The surface No. 9 is the diffraction surface 9. The space between the surface Nos. 10 and 11 forms the deviation angle compensating prism 7. The surface Nos. 12 and 20 are the polarization beam splitter surface 17'. The space between the surface. Nos. 12 and 13 and the space between the surface Nos. 19 and 20 and further the space between the surface Nos. 20 to 22 form the illuminating light guide prism 6. The surface No. 22 is a condenser lens surface. The space between the surface Nos. 14 and 15 and the space between the surface Nos. 17 and 18 form the polarizer of the LCD. The space between the surface Nos. 15 and 16 (image plane) and the space between the surface Nos. 16 (image plane) and 17 form the substrate glass of the LCD. The surface No. 23 is the light source 4. The displacements of each of the surface Nos. 2 to 6 (hypothetic plane) are expressed by the amounts of displacement from the center of the exit pupil 2 of surface No. 1. Regarding the surface Nos. 6 to 21, the position of each surface is specified in terms of the axial spacing along the axial principal ray 1. Regarding the surface Nos. 11, 12 and 20 (=12) of these surfaces, only tilt angles $\beta$ of the center axes thereof with respect to the optical axis are given as displacement data. The lens surface of surface No. 22 is given displacements of the vertex position of the surface in the coordinate system determined with respect to the hypothetic plane of surface No. 6. The position of the light source 4 is given by the axial distance from the surface No. 22 along the axial principal ray 1.

It should be noted that because the optical system according to Example 2 is arranged as stated above, the illuminating light source 4 can be positioned in a direction different from the direction of the display surface 3 of the reflection type image display device with respect to the prism 10 (for example, when the display surface 3 is disposed at the upper side of the prism 10, the illuminating light source 4 can be positioned at the right or left side of the prism 10). Accordingly, an image display apparatus, e.g. a head-up display, can be constructed in a compact form. Because it needs no Fresnel lens, the optical system can be made correspondingly compact in comparison to the optical system of Example 1. Further, because a part of the power required to form the illuminating light from the light source 4 into an approximately parallel light beam can be assigned to the polarization beam splitter surface 17', which is away from the light source 4 and close to the image plane 3, it is possible to attain uniform illumination and to use a relatively large light source 4.

Figure 4:
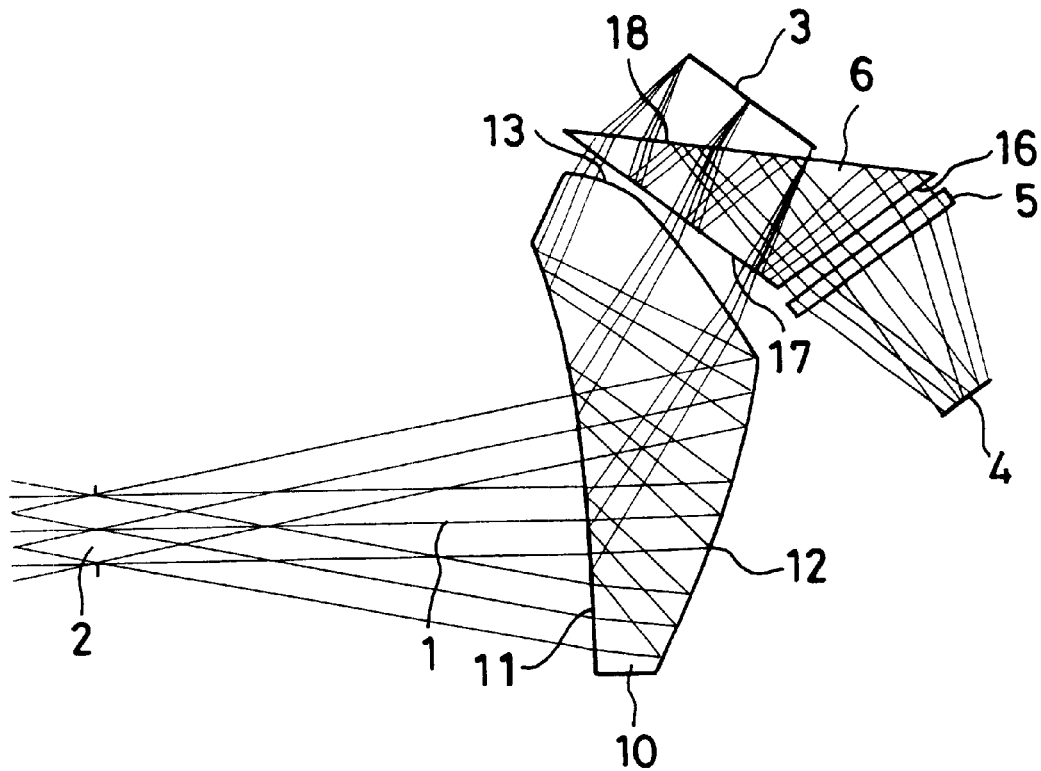
FIG. 4 is a sectional view of a viewing optical system according to Example 3 of the present invention.

FIG. 4 is a sectional view of Example 3 of the present invention taken along the YZ-plane containing the optical axis. In the viewing optical system according to this example, the horizontal field angle is 22°. The size of the image display device is 9.6×7.2 millimeters, and the diagonal length H thereof is 12 millimeters. The distance L between the intersection between the display surface 3 of the image display device and the optical axis and the intersection between the entrance surface 13 of the prism 10 and the optical axis is 11.52 millimeters. Hence, L/H=0.96 [the value of the condition (1)]. $\Delta\theta$=0.50° [the value of the condition (3)]. The pupil diameter is 4 millimeters, and the distance (eye relief) from the exit surface 11 of the prism 10 to the exit pupil is 29.9 millimeters.

This example has, in order in which light passes from the object side in backward ray tracing, an exit pupil 2, a prism 10, an illuminating light guide prism 6, and an image plane (i.e. the display surface of a reflection type image display device) 3. A light source 4 and a Fresnel lens 5 are disposed on the illuminating light entrance side of the illuminating light guide prism 6.

The prism 10 has a first surface 11, a second surface 12, and a third surface 13. The first surface 11 allows a light beam from the object side to enter the prism 10 and reflects the light beam reflected from the second surface 12 in the prism 10. The second surface 12 reflects the light beam entering through the first surface 11 in the prism 10. The third surface 13 allows the light beam reflected from the first surface 11 to exit from the prism 10. Thus, the first surface 11 is an optical surface having both a transmitting optical action and a reflecting optical action.

The illuminating light guide prism 6 is a triangular prism having a first surface 16, a second surface 17, and a third surface 18, which are all plane surfaces. The first surface 16 is a surface through which a divergent light beam from the light source 4 is introduced into the prism 6 after the beam has been formed into an approximately parallel light beam through the Fresnel lens 5. The first surface 16 is disposed at right angles to the axis of the illuminating light. The introduced illuminating light is totally reflected by the third surface 18 and further reflected by the second surface 17, which forms a polarization beam splitter surface of the illuminating light guide prism 6. Then, the reflected light passes through the third surface 18 to illuminate the display surface of a reflection type image display device, e.g. a reflection type liquid crystal display device, placed in the image plane 3. The illuminating light is incident on the display surface approximately at right angles thereto.

Display light from the display surface of the reflection type liquid crystal display device placed in the image plane 3 enters the illuminating light guide prism 6 through the third surface 18 and passes through the polarization beam splitter surface as the second surface 17 to enter the prism 10 through the third surface 13. The light is totally reflected by the first surface 11 and further reflected by the second surface 12 to exit from the prism 10 while being refracted through the first surface 11. Then, the light enters the observer's eyeball placed at the position of the exit pupil 2 to form an enlarged image of the displayed image of the reflection type liquid crystal display device.

In the constituent parameters (shown later), the surfaces Nos. 2 to 5 form the prism 10. The space between the surface Nos. 6 and 7 and the space between the surface Nos. 9 and 10 and further the space between the surface Nos. 10 to 12 form the illuminating light guide prism 6. The space between the surface Nos. 13 and 14 forms the Fresnel lens 5. The surface Nos. 13 and 14 are the Fresnel lens surfaces. The surface No. 15 is the light source 4. The displacements of each of the surface Nos. 2 to 15 are expressed by the amounts of displacement from the center of the exit pupil 2 of surface No. 1.

Figure 5:
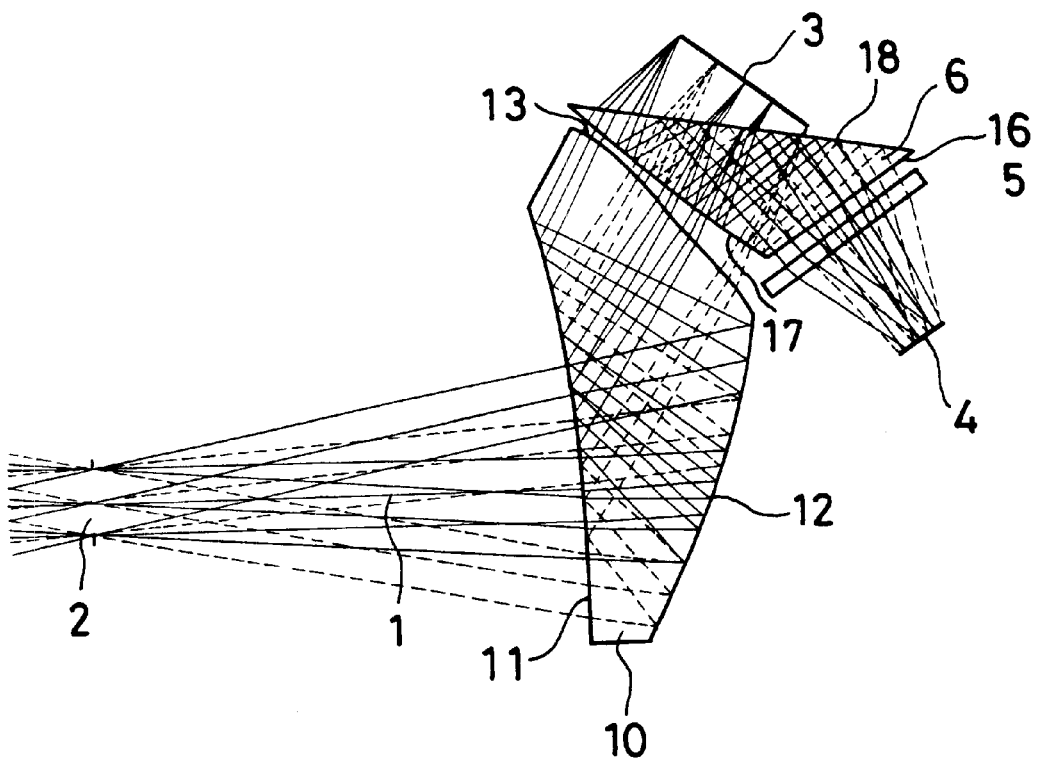
FIG. 5 is a sectional view of a viewing optical system according to Example 4 of the present invention.
Figure 6:
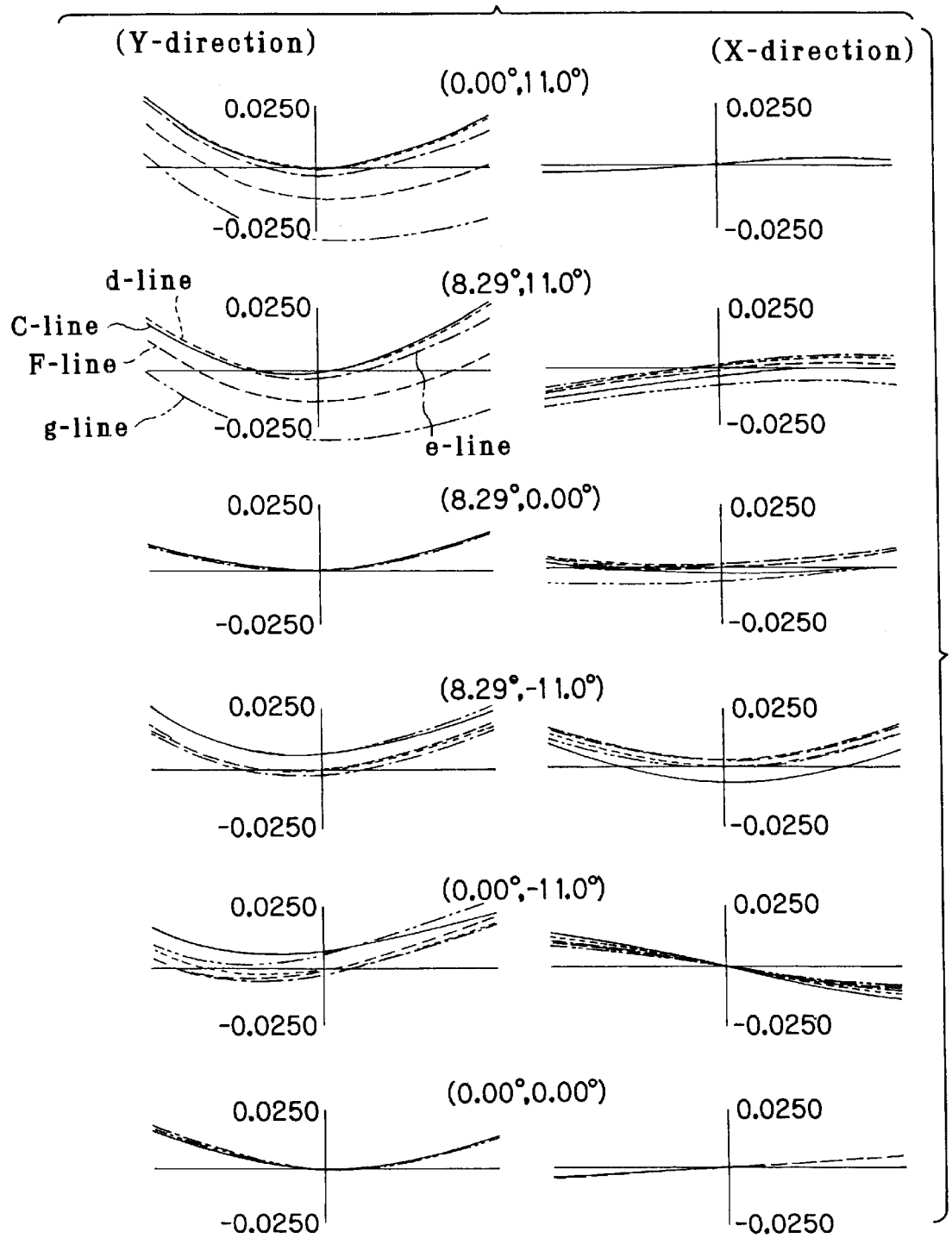
FIG. 6 is an aberrational diagram showing lateral aberrations in the viewing optical system according to Example 1 of the present invention.
Figure 7:
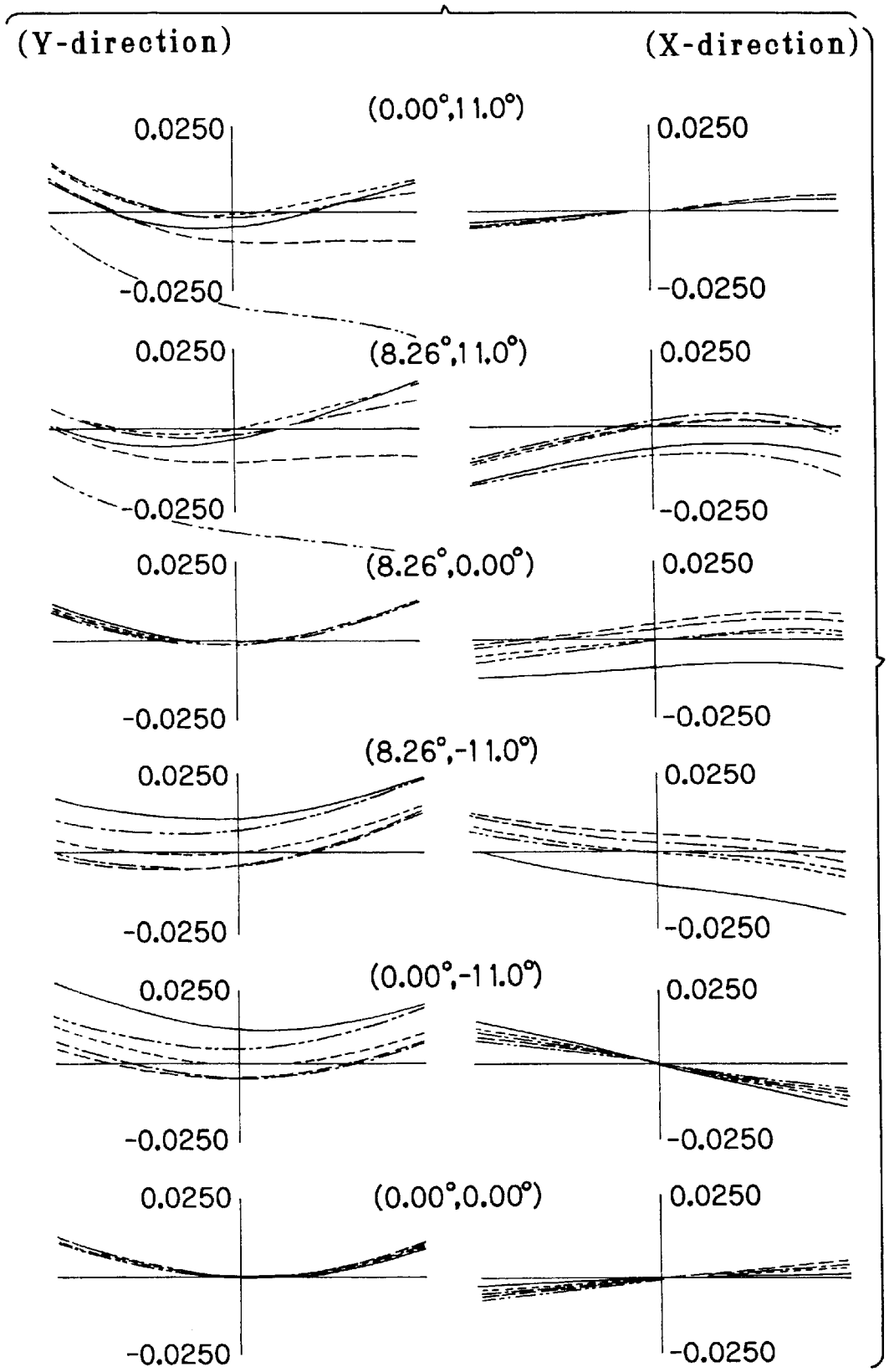
FIG. 7 is an aberrational diagram showing lateral aberrations in the viewing optical system according to Example 2 of the present invention.
Figure 8:
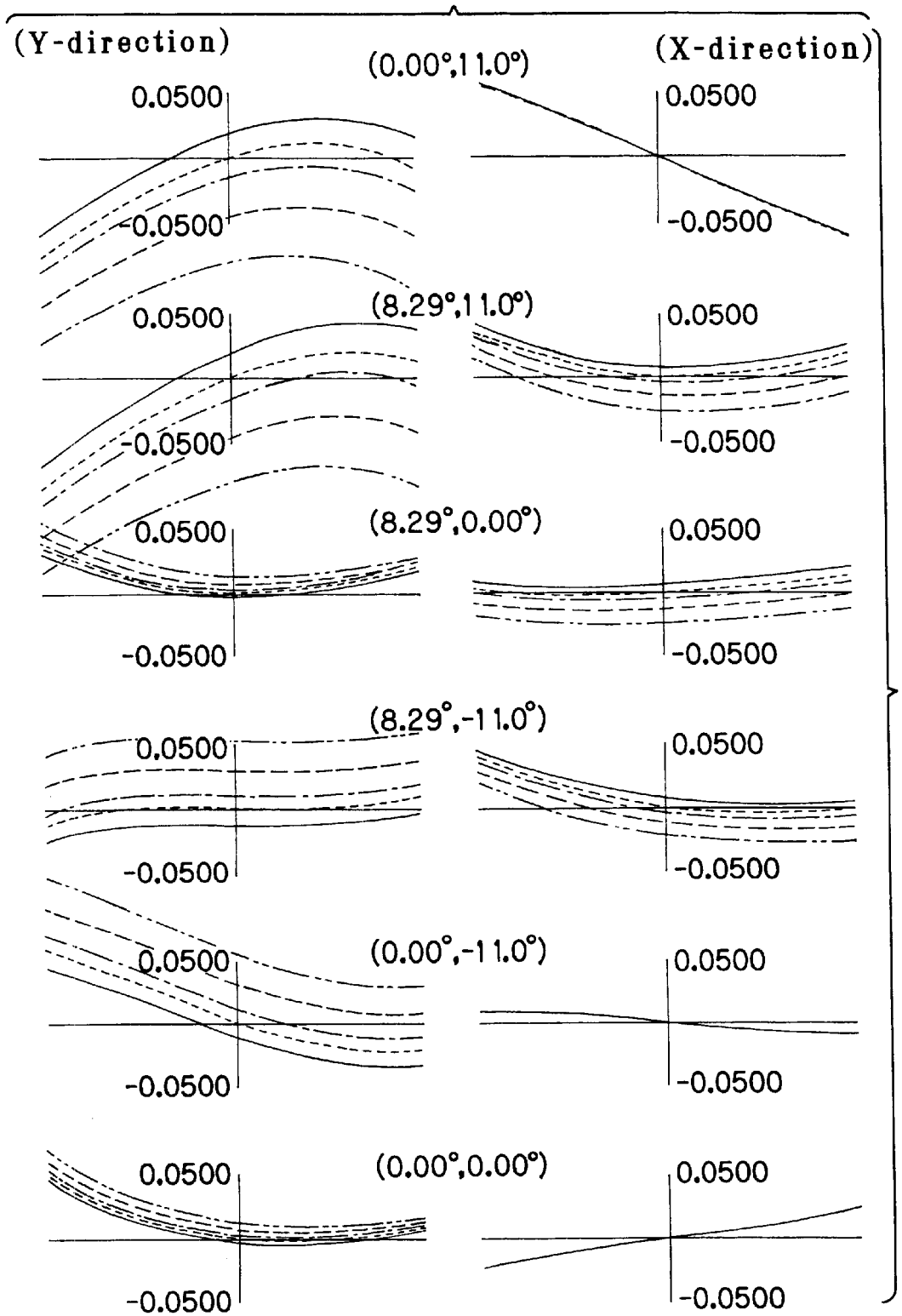
FIG. 8 is an aberrational diagram showing lateral aberrations in the viewing optical system according to Example 3 of the present invention.
Figure 9:
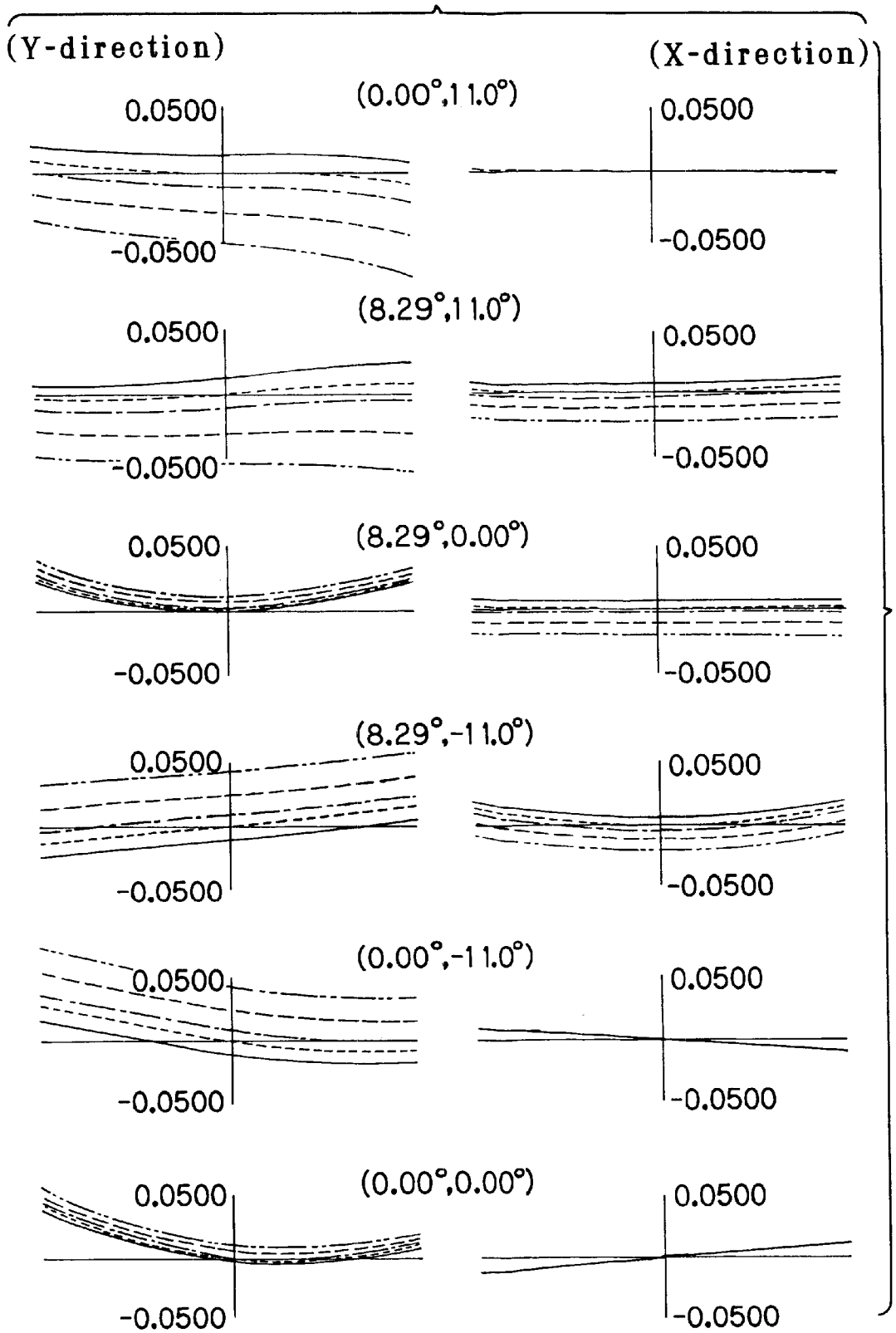
FIG. 9 is an aberrational diagram showing lateral aberrations in the viewing optical system according to Example 4 of the present invention.

FIG. 5 is a sectional view of Example 4 of the present invention taken along the YZ-plane containing the optical axis. In the viewing optical system according to this example, the horizontal field angle is 22°. The size of the image display device is 9.6×7.2 millimeters, and the diagonal length H thereof is 12 millimeters. The distance L between the intersection between the display surface 3 of the image display device and the optical axis and the intersection between the entrance surface 13 of the prism 10 and the optical axis is 11.75 millimeters. Hence, L/H=0.98 [the value of the condition (1)]. $\Delta\theta=0.41°$ [the value of the condition (3)]. The pupil diameter is 4 millimeters, and the distance (eye relief) from the exit surface 11 of the prism 10 to the exit pupil is 29.9 millimeters.

This example has, in order in which light passes from the object side in backward ray tracing, an exit pupil 2, a prism 10, an illuminating light guide prism 6, and an image plane (i.e. the display surface of a reflection type image display device) 3. A light source 4 and a Fresnel lens 5 are disposed on the illuminating light entrance side of the illuminating light guide prism 6.

The prism 10 has a first surface 11, a second surface 12, and a third surface 13. The first surface 11 allows a light beam from the object side to enter the prism 10 and reflects the light beam reflected from the second surface 12 in the prism 10. The second surface 12 reflects the light beam entering through the first surface 11 in the prism 10. The third surface 13 allows the light beam reflected from the first surface 11 to exit from the prism 10. Thus, the first surface 11 is an optical surface having both a transmitting optical action and a reflecting optical action.

The illuminating light guide prism 6 is a triangular prism having a first surface 16, a second surface 17, and a third surface 18. The first surface 16 and the third surface 18 are plane surfaces, and the second surface 17 is a convex spherical surface. The first surface 16 is a surface through which a divergent light beam from the light source 4 is introduced into the prism 6 after the beam has been formed into an approximately parallel light beam through the Fresnel lens 5. The first surface 16 is disposed at right angles to the axis of the illuminating light. The introduced illuminating light is totally reflected by the third surface 18 and further reflected by the second surface 17, which forms a polarization beam splitter surface of the illuminating light guide prism 6. Then, the reflected light passes through the third surface 18 to illuminate the display surface of a reflection type image display device, e.g. a reflection type liquid crystal display device, placed in the image plane 3. The illuminating light is incident on the display surface approximately at right angles thereto.

Display light from the display surface of the reflection type liquid crystal display device placed in the image plane 3 enters the illuminating light guide prism 6 through the third surface 18 and passes through the polarization beam splitter surface as the second surface 17 to enter the prism 10 through the third surface 13. The light is totally reflected by the first surface 11 and further reflected by the second surface 12 to exit from the prism 10 while being refracted through the first surface 11. Then, the light enters the observer's eyeball placed at the position of the exit pupil 2 to form an enlarged image of the displayed image of the reflection type liquid crystal display device.

In the constituent parameters (shown later), the surfaces Nos. 2 to 5 form the prism 10. The space between the surface Nos. 6 and 7 and the space between the surface Nos. 9 and 10 and further the space between the surface Nos. 10 to 12 form the illuminating light guide prism 6. The space between the surface Nos. 13 and 14 forms the Fresnel lens 5. Both the surface Nos. 13 and 14 are the Fresnel lens surfaces. The surface No. 15 is the light source 4. The displacements of each of the surface Nos. 2 to 15 are expressed by the amounts of displacement from the center of the exit pupil 2 of surface No. 1.

FIG. 26 is a sectional view of a viewing optical apparatus having a see-through optical system according to Example 5 of the present invention taken along the YZ-plane containing the optical axis. A viewing optical apparatus having a see-through optical system according to Example 6 is also constructed as in the case of Example 5. The horizontal field angle in the case of observing a displayed image in the image plane of the viewing optical apparatus according to Examples 5 and 6 is 22°. The size of the image display device is 9.6×7.2 millimeters, and the pupil diameter is 4 millimeters.

To view the displayed image of the image display device, the viewing optical apparatus comprises, in order in which light passes from the object side in backward ray tracing, an exit pupil 201, a prism optical system 210, a diffractive optical element 204, a plane-parallel plate 206, and an image plane 203. To view the outside world in a see-through manner, the viewing optical apparatus comprises, in order in which light passes from the object side in backward ray tracing, the exit pupil 201, the prism optical system 210, and a see-through optical element 220.

The prism optical system 210 has, in backward ray tracing, a first surface 211, a second surface 212, and a third surface 213. The first surface 211 serves as both a transmitting surface through which a light beam from the object side enters the prism 210 and a totally reflecting surface that totally reflects the light beam reflected from the second surface 212 in the prism 210. The second surface 212 is a semitransparent reflecting surface that reflects the light beam entering through the first surface 211 in the prism 210 and transmits a part of the light beam toward the see-through optical element 220. The third surface 213 is a transmitting surface through which the light beam reflected from the first surface 211 exits from the prism 210.

The diffractive optical element 204 has a diffraction surface 205 on the side thereof closer to the image plane 203. The plane-parallel plate 206 constitutes an optical system for illuminating the image plane 203 or forms a filter.

Display light from the display surface of the image display device placed in the image plane 203 passes through the plane-parallel plate 206 and is diffracted by the diffraction surface 205 of the diffractive optical element 204 to enter the prism optical system 210 through the third surface 213. The light is totally reflected by the first surface 211 and further reflected by the second surface 212 to exit from the prism 210 while being refracted through the first surface 211. Then, the light enters an observer's eyeball placed so that the pupil is located at the position of the exit pupil 201 to form an enlarged image of the displayed image of the image display device.

The see-through optical element 220 is placed in front of the second surface 212 of the prism optical system 210 at a distance therefrom. The see-through optical element 220 is formed from a transmission prism member having a first surface 221 and a second surface 222 in backward ray tracing. Light from the outside world passes successively through the second surface 222 and first surface 221 of the see-through optical element 220 and further through the second surface 212 and first surface 211 of the prism optical system 210 and enters the observer's eyeball, in which the pupil is placed at the position of the exit pupil 201, to form an outside world image. It should be noted that the outside world image and the displayed image of the image display device placed in the image plane 203 can be viewed selectively or superimposed on one another.

Figure 27:
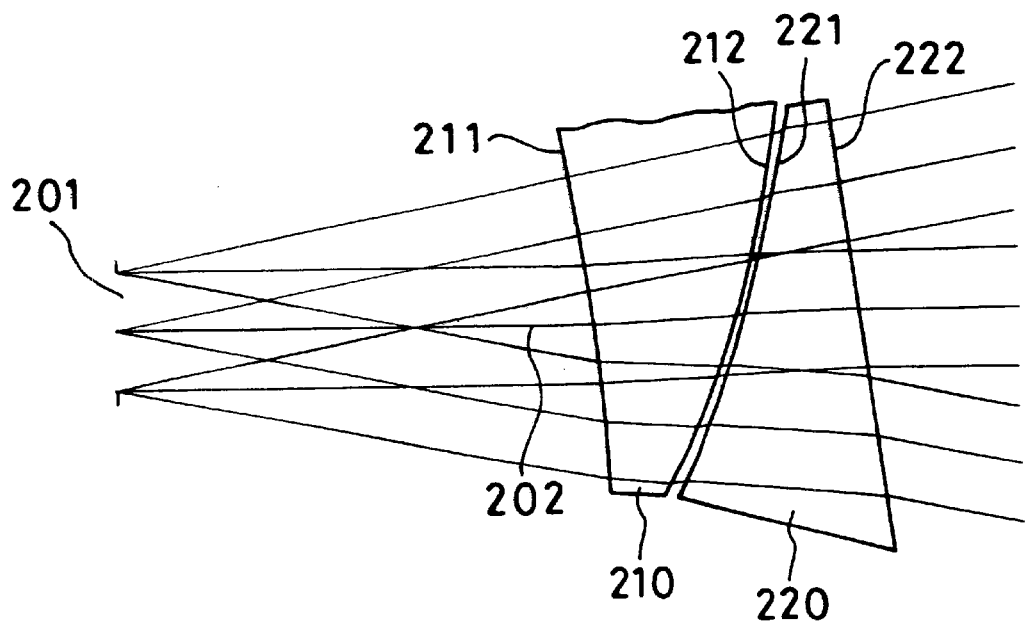
FIG. 27 is a sectional view of a see-through optical system portion of the viewing optical system according to Example 5 of the present invention.
Figure 28:
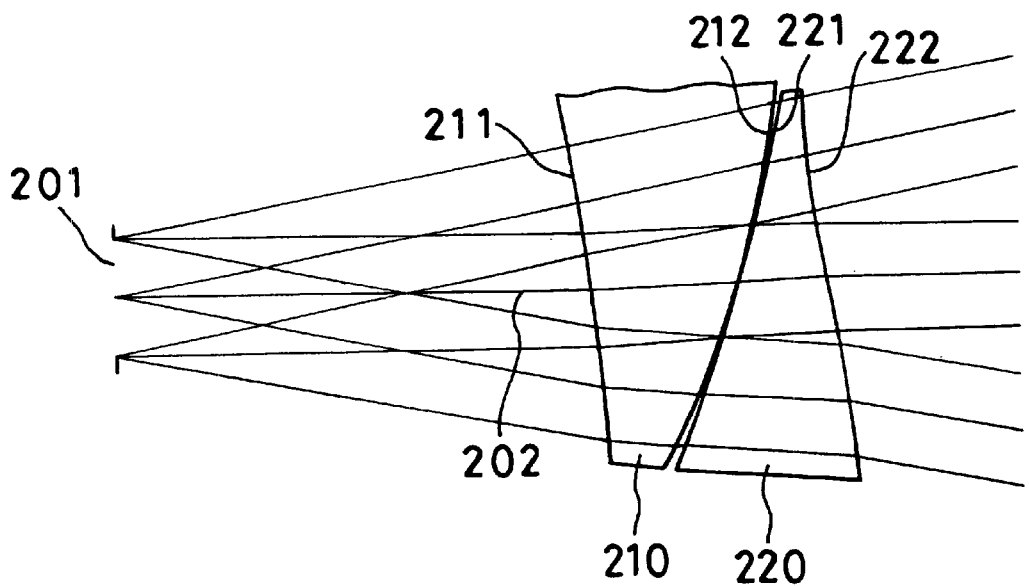
FIG. 28 is a sectional view of a see-through optical system portion of a viewing optical system according to Example 6 of the present invention.

FIG. 27 is a sectional view of a see-through optical system in Example 5 taken along the YZ-plane containing the optical axis. FIG. 28 is a sectional view of a see-through optical system in Example 6 taken along the YZ-plane containing the optical axis. In Examples 5 and 6, the prism optical systems 210 are identical to each other, but the see-through optical elements 220 are different in surface configuration from each other. Both the see-through optical elements 220 are disposed in front of the respective second surfaces 212 of the prism optical systems 210 and formed from transmission prism members each having a first surface 221 and a second surface 222 in backward ray tracing.

FIG. 44 is a sectional view of a viewing optical apparatus having a see-through optical system according to Example 7 of the present invention taken along the YZ-plane containing the optical axis. A viewing optical apparatus having a see-through optical system according to Example 8 is also constructed as in the case of Example 7. The horizontal field angle in the case of observing a displayed image in the image plane of the viewing optical apparatus according to Examples 7 and 8 is 22°. The size of the image display device is 9.6×7.2 millimeters, and the pupil diameter is 4 millimeters.

To view the displayed image of the image display device, the viewing optical apparatus comprises, in order in which light passes from the object side in backward ray tracing, an exit pupil 401, a prism optical system 410, a diffractive optical element 404, a plane-parallel plate 406, and an image plane 403. To view the outside world in a see-through manner, the viewing optical apparatus comprises, in order in which light passes from the object side in backward ray tracing, the exit pupil 401, the prism optical system 410, and a see-through optical element 420.

The prism optical system 410 has, in backward ray tracing, a first surface 411, a second surface 412, and a third surface 413. The first surface 411 serves as both a transmitting surface through which a light beam from the object side enters the prism 410 and a totally reflecting surface that totally reflects the light beam reflected from the second surface 412 in the prism 410. The second surface 412 is a semitransparent reflecting surface that reflects the light beam entering through the first surface 411 in the prism 410 and transmits a part of the light beam toward the see-through optical element 420. The third surface 413 is a transmitting surface through which the light beam reflected from the first surface 411 exits from the prism 410.

The diffractive optical element 404 has a diffraction surface 405 on the side thereof closer to the image plane 403. The plane-parallel plate 406 constitutes an optical system for illuminating the image plane 403 or forms a filter.

Display light from the display surface of the image display device placed in the image plane 403 passes through the plane-parallel plate 406 and is diffracted by the diffraction surface 405 of the diffractive optical element 404 to enter the prism optical system 410 through the third surface 413. The light is totally reflected by the first surface 411 and further reflected by the second surface 412 to exit from the prism 410 while being refracted through the first surface 411. Then, the light enters an observer's eyeball placed so that the pupil is located at the position of the exit pupil 401 to form an enlarged image of the displayed image of the image display device.

The see-through optical element 420 is placed in close contact with the second surface 412 of the prism optical system 410. The see-through optical element 420 is formed from a transmission prism member having a first surface 421 and a second surface 422 in backward ray tracing. Light from the outside world passes successively through the second surface 422 of the see-through optical element 420 and the first surface 421 thereof (=the second surface 412 of the prism optical system 410) and further through the first surface 411 of the prism optical system 410 and enters the observer's eyeball, in which the pupil is placed at the position of the exit pupil 401, to form an outside world image. It should be noted that the outside world image and the displayed image of the image display device placed in the image plane 403 can be viewed selectively or superimposed on one another.

Figure 45:
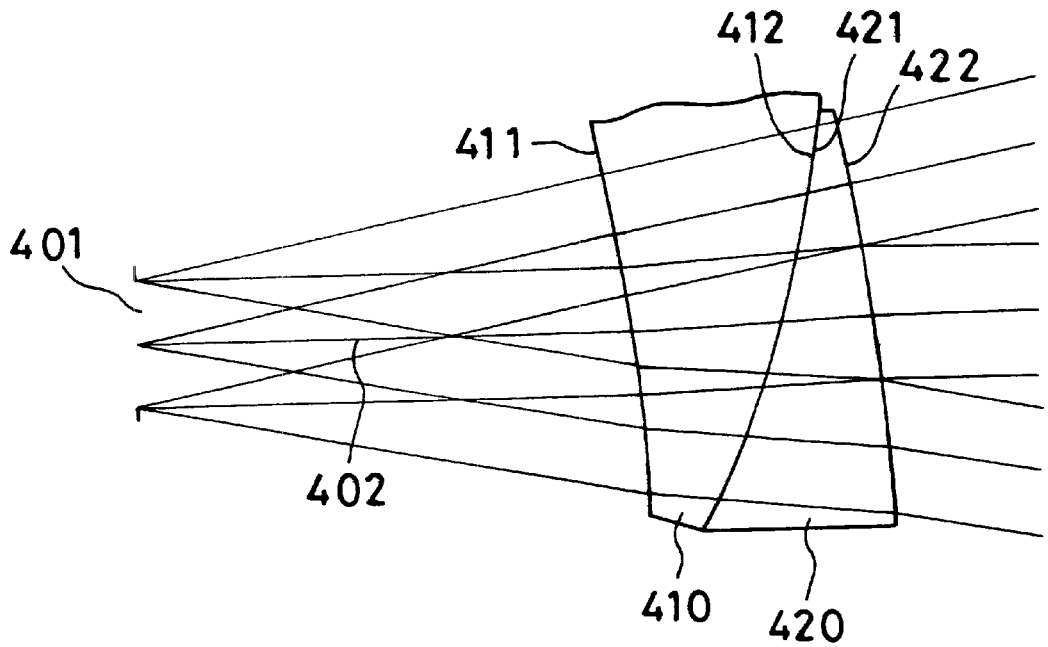
FIG. 45 is a sectional view of a see-through optical system portion of the viewing optical system according to Example 7 of the present invention.
Figure 46:
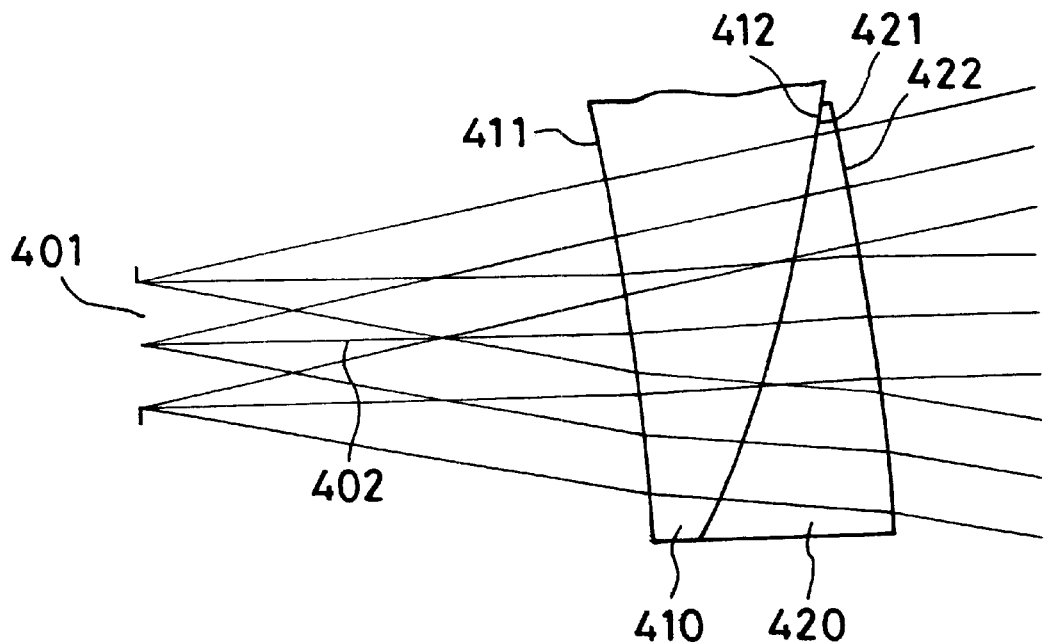
FIG. 46 is a sectional view of a see-through optical system portion of a viewing optical system according to Example 8 of the present invention.

FIG. 45 is a sectional view of a see-through optical system in Example 7 taken along the YZ-plane containing the optical axis. FIG. 46 is a sectional view of a see-through optical system in Example 8 taken along the YZ-plane containing the optical axis. In Examples 7 and 8, the prism optical systems 410 are identical to each other, but the see-through optical elements 420 are different in surface configuration from each other. Both the see-through optical elements 420 are disposed in close contact with the respective second surfaces 412 of the prism optical systems 410 and formed from transmission prism members each having a first surface 421 and a second surface 422 in backward ray tracing.

Example 7 is an example in which the combined optical power P of the see-through optical element 420 and the prism optical system 410 is approximately zero. Example 8 is an example in which the combined angular magnification β is approximately 1.

The constituent parameters of Examples 1 to 8 are as follows. In the tables showing Examples 1 to 4: "FFS" denotes a free-form surface; "ASS" denotes an aspherical surface; "DOE" denotes a diffraction surface; "PBS" denotes a polarization beam splitter surface; "FLS" denotes a Fresnel lens surface; "LCD" denotes the display surface of a reflection type liquid crystal display device; "RS" denotes a reflecting surface; and "HRP" denotes a hypothetic plane. In the tables showing the constituent parameters of the see-through optical systems in Examples 5 to 8 and also showing the constituent parameters of the viewing optical systems of image display devices placed in the image planes 203 and 403 common to these examples: "FFS" denotes a free-form surface; "ASS" denotes an aspherical surface; "DOE" denotes a diffraction surface; "LCD" denotes the display surface of an image display device; "RS" denotes a reflecting surface; and "HRP" denotes a hypothetic plane.

EXAMPLE 1

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Pupil) | | (1) | | |
| 2 | ASS① | | (2) | 1.5254 | 56.2 |
| 3 | FFS①(RS) | | (3) | 1.5254 | 56.2 |
| 4 | ASS①(RS) | | (2) | 1.5254 | 56.2 |
| 5 | FFS② | | (4) | | |
| 6 | ASS②(DOE) | | (5) | 1001.0682 | −3.5 |
| 7 | ∞ | | (5) | 1.4922 | 57.5 |
| 8 | ∞ | | (6) | 1.5163 | 64.1 |
| 9 | ∞ (PBS) | | (7) | 1.5163 | 64.1 |
| 10 | ∞ | | (8) | | |
| Image plane | ∞ (LCD) (RS) | | (9) | | |
| 12 | ∞ | | (8) | 1.5163 | 64.1 |
| 13 | ∞ (PBS) (RS) | | (7) | 1.5163 | 64.1 |
| 14 | ∞ (RS) | | (8) | 1.5163 | 64.1 |
| 15 | ∞ | | (10) | | |
| 16 | ASS③(FLS) | | (11) | 1.4922 | 57.5 |
| 17 | ∞ | | (12) | | |
| Light | ∞ | | (13) | | |

-continued

| source | | | | | | |
|---|---|---|---|---|---|---|
| ASS① | | | | | | |
| R | −162.42 | | | | | |
| K | $-2.6327 \times 10^{+2}$ | | | | | |
| A | $-4.6353 \times 10^{-6}$ | | | | | |
| B | $5.3343 \times 10^{-9}$ | | | | | |
| C | $-1.4026e\text{-}012$ | | | | | |
| ASS② | | | | | | |
| R | 459974.36 | | | | | |
| K | −1.0000 | | | | | |
| A | $1.9948 \times 10^{-8}$ | | | | | |
| B | $-1.3816 \times 10^{-10}$ | | | | | |
| ASS③ | | | | | | |
| R | −5.01 | | | | | |
| K | $-3.5319 \times 10^{-1}$ | | | | | |
| A | $4.0969 \times 10^{-4}$ | | | | | |
| FFS① | | | | | | |
| $C_4$ | $-7.2345 \times 10^{-3}$ | $C_6$ | $-6.9125 \times 10^{-3}$ | $C_8$ | $4.4026 \times 10^{-5}$ |
| $C_{10}$ | $6.4432 \times 10^{-5}$ | $C_{11}$ | $1.4416 \times 10^{-6}$ | $C_{13}$ | $1.8224 \times 10^{-6}$ |
| $C_{15}$ | $4.1031 \times 10^{-6}$ | $C_{17}$ | $-7.0792 \times 10^{-8}$ | $C_{19}$ | $9.9564 \times 10^{-8}$ |
| $C_{21}$ | $1.4815 \times 10^{-7}$ | | | | |
| FFS② | | | | | | |
| $C_4$ | $-1.9459 \times 10^{-2}$ | $C_6$ | $-2.5266 \times 10^{-2}$ | $C_8$ | $3.3469 \times 10^{-4}$ |
| $C_{10}$ | $3.6981 \times 10^{-4}$ | $C_{11}$ | $-1.3936 \times 10^{-5}$ | $C_{13}$ | $4.0624 \times 10^{-5}$ |
| $C_{15}$ | $-4.6353 \times 10^{-6}$ | $C_{17}$ | $1.8299 \times 10^{-6}$ | $C_{19}$ | $-6.3031 \times 10^{-7}$ |
| $C_{21}$ | $1.6919 \times 10^{-6}$ | | | | |
| Displacement and tilt(1) | | | | | | |
| X | 0.00 | Y | 0.00 | Z | 0.00 |
| α | 0.00 | β | 0.00 | γ | 0.00 |
| Displacement and tilt(2) | | | | | | |
| X | 0.00 | Y | −2.98 | Z | 30.33 |
| α | 5.72 | β | 0.00 | γ | 0.00 |
| Displacement and tilt(3) | | | | | | |
| X | 0.00 | Y | 2.28 | Z | 40.11 |
| α | −15.25 | β | 0.00 | γ | 0.00 |
| Displacement and tilt(4) | | | | | | |
| X | 0.00 | Y | 18.69 | Z | 35.95 |
| α | 66.23 | β | 0.00 | γ | 0.00 |
| Displacement and tilt(5) | | | | | | |
| X | 0.00 | Y | 20.15 | Z | 37.39 |
| α | 49.42 | β | 0.00 | γ | 0.00 |
| Displacement and tilt(6) | | | | | | |
| X | 0.00 | Y | 20.91 | Z | 38.04 |
| α | 49.42 | β | 0.00 | γ | 0.00 |
| Displacement and tilt(7) | | | | | | |
| X | 0.00 | Y | 24.20 | Z | 40.86 |
| α | 49.42 | β | −30.00 | γ | 0.00 |
| Displacement and tilt(8) | | | | | | |
| X | 0.00 | Y | 27.08 | Z | 43.33 |
| α | 49.42 | β | 0.00 | γ | 0.00 |
| Displacement and tilt(9) | | | | | | |
| X | 0.00 | Y | 28.22 | Z | 44.31 |
| α | 49.42 | β | 0.00 | γ | 0.00 |
| Displacement and tilt(10) | | | | | | |
| X | 15.00 | Y | 23.29 | Z | 40.08 |
| α | 49.42 | β | 60.00 | γ | 0.00 |
| Displacement and tilt(11) | | | | | | |
| X | 15.87 | Y | 22.91 | Z | 39.75 |
| α | 49.42 | β | 60.00 | γ | 0.00 |
| Displacement and tilt(12) | | | | | | |
| X | 16.73 | Y | 22.53 | Z | 39.43 |

-continued

|  |  |  |  |  |  |
|---|---|---|---|---|---|
| α | 49.42 | β | 60.00 | γ | 0.00 |
| Displacement and tilt(13) | | | | | |
| X | 21.06 | Y | 20.63 | Z | 37.80 |
| α | 49.42 | β | 60.00 | γ | 0.00 |

EXAMPLE 2

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Pupil) | | | | |
| 2 | ASS① | | (1) | 1.5254 | 56.2 |
| 3 | FFS①(RS) | | (2) | 1.5254 | 56.2 |
| 4 | ASS①(RS) | | (1) | 1.5254 | 56.2 |
| 5 | FFS② (RS) | | (3) | | |
| 6 | ∞ (HRP) | 1.50 | (4) | | |
| 7 | ∞ | 1.40 | | 1.5254 | 56.2 |
| 8 | ∞ | 0.00 | | 1001.0682 | −3.5 |
| 9 | −209750.722 (DOE) | 0.50 | | | |
| 10 | ∞ | 3.50 | | 1.5163 | 64.1 |
| 11 | FFS③ | 0.13 | (5) | 1.5163 | 64.1 |
| 12 | FFS③(PBS) | 3.50 | (5) | 1.5163 | 64.1 |
| 13 | ∞ | 1.56 | | | |
| 14 | ∞ | 0.16 | | 1.5860 | 34.5 |
| 15 | ∞ | 1.10 | | 1.5230 | 59.4 |
| Image plane | ∞ (LCD) (RS) | −1.10 | | 1.5230 | 59.4 |
| 17 | ∞ | −0.16 | | 1.5860 | 34.5 |
| 18 | ∞ | −1.56 | | | |
| 19 | ∞ | −3.50 | | 1.5163 | 64.1 |
| 20 | FFS③(PBS) (RS) | 3.50 | (5) | 1.5163 | 64.1 |
| 21 | (RS) | | | 1.5163 | 64.1 |
| 22 | 7.21 | −3.00 | (6) | | |
| Light source | ∞ | | | | |

ASS①

| R | −176.22 |
| K | −3.7387 × 10¹ |
| A | −1.6692 × 10⁻⁶ |
| B | 2.9814 × 10⁻⁹ |
| C | −2.0018 × 10⁻¹² |

FFS①

| $C_4$ | −6.8800 × 10⁻³ | $C_6$ | −6.3619 × 10⁻³ | $C_8$ | 4.1553 × 10⁻⁵ |
| $C_{10}$ | 6.8837 × 10⁻⁵ | $C_{11}$ | 1.2241 × 10⁻⁶ | $C_{13}$ | 3.3302 × 10⁻⁶ |
| $C_{15}$ | 2.5098 × 10⁻⁶ | $C_{17}$ | 3.8987 × 10⁻⁸ | $C_{19}$ | 1.2588 × 10⁻⁷ |
| $C_{21}$ | 5.2527 × 10⁻⁸ | | | | |

FFS②

| $C_4$ | −2.3155 × 10⁻² | $C_6$ | −3.0035 × 10⁻² | $C_8$ | 4.7893 × 10⁻⁴ |
| $C_{10}$ | 5.9168 × 10⁻⁴ | $C_{11}$ | 7.4760 × 10⁻⁶ | $C_{13}$ | 4.6108 × 10⁻⁵ |
| $C_{15}$ | 1.6986 × 10⁻⁵ | $C_{17}$ | −7.6840 × 10⁻⁷ | $C_{19}$ | −3.8926 × 10⁻⁶ |
| $C_{21}$ | −2.0872 × 10⁻⁶ | | | | |

FFS③

| $C_4$ | 5.4934 × 10⁻³ | $C_6$ | 6.3953 × 10⁻³ | $C_7$ | 1.0601 × 10⁻⁵ |
| $C_9$ | 9.1337 × 10⁻⁵ | $C_{11}$ | −9.3191 × 10⁻⁵ | $C_{13}$ | −5.8444 × 10⁻⁵ |
| $C_{15}$ | −6.3873 × 10⁻⁵ | | | | |

Displacement and tilt(1)

| X | 0.00 | Y | −2.61 | Z | 32.27 |
| α | 5.50 | β | 0.00 | γ | 0.00 |

Displacement and tilt(2)

| X | 0.00 | Y | 3.08 | Z | 42.45 |

-continued

| α | −14.95 | β | 0.00 | γ | 0.00 |
| Displacement and tilt(3) | | | | | |
| X | 0.00 | Y | 18.35 | Z | 39.28 |
| α | 60.78 | β | 0.00 | γ | 0.00 |
| Displacement and tilt(4) | | | | | |
| X | 0.00 | Y | 18.86 | Z | 38.29 |
| α | 49.61 | β | 0.00 | γ | 0.00 |
| Displacement and tilt(5) | | | | | |
| X | 0.00 | Y | 0.00 | Z | 0.00 |
| α | 0.00 | β | −27.00 | γ | 0.00 |
| Displacement and tilt(6) | | | | | |
| X | 9.72 | Y | 0.00 | Z | −3.56 |
| α | 0.00 | β | 54.00 | γ | 0.00 |

EXAMPLE 3

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Pupil) | | | | |
| 2 | ASS① | | (1) | 1.4922 | 57.5 |
| 3 | FFS①(RS) | | (2) | 1.4922 | 57.5 |
| 4 | ASS①(RS) | | (1) | 1.4922 | 57.5 |
| 5 | FFS② | | (3) | | |
| 6 | ∞ | | (4) | 1.5163 | 64.1 |
| 7 | ∞ | | (5) | | |
| Image plane | ∞ (LCD) (RS) | | (6) | | |
| 9 | ∞ | | (5) | 1.5163 | 64.1 |
| 10 | ∞ (RS) | | (4) | 1.5163 | 64.1 |
| 11 | ∞ (RS) | | (5) | 1.5163 | 64.1 |
| 12 | ∞ | | (7) | | |
| 13 | −30.06 (FLS) | | (8) | 1.4922 | 57.5 |
| 14 | 12.35 (FLS) | | (9) | | |
| Light source | ∞ | | (10) | | |

ASS①

| R | −123.45 |
| K | 2.4441 × 10¹ |
| A | −2.7160 × 10⁻⁶ |
| B | −1.6340 × 10⁻⁸ |

FFS①

| $C_4$ | −9.5216 × 10⁻³ | $C_6$ | −9.5181 × 10⁻³ | $C_8$ | −4.5578 × 10⁻⁵ |
| $C_{10}$ | −3.7547 × 10⁻⁵ | $C_{11}$ | 9.5818 × 10⁻⁷ | $C_{13}$ | −8.0328 × 10⁻⁶ |
| $C_{15}$ | −4.4319 × 10⁻⁶ | | | | |

FFS②

| $C_4$ | −4.3543 × 10⁻⁴ | $C_6$ | −8.9975 × 10⁻³ | $C_8$ | −5.4549 × 10⁻⁴ |
| $C_{10}$ | −2.5114 × 10⁻³ | $C_{11}$ | −2.6896 × 10⁻⁴ | $C_{13}$ | −3.1730 × 10⁻⁵ |
| $C_{15}$ | −2.4193 × 10⁻⁴ | | | | |

Displacement and tilt(1)

| X | 0.00 | Y | 1.13 | Z | 29.92 |
| α | 4.34 | β | 0.00 | γ | 0.00 |

Displacement and tilt(2)

| X | 0.00 | Y | 1.88 | Z | 38.79 |
| α | −17.70 | β | 0.00 | γ | 0.00 |

Displacement and tilt(3)

| X | 0.00 | Y | 16.33 | Z | 35.91 |
| α | 36.94 | β | 0.00 | γ | 0.00 |

-continued

| | | | | | | |
|---|---|---|---|---|---|---|
| Displacement and tilt(4) | | | | | | |
| X | 0.00 | Y | 18.19 | Z | 35.83 | |
| α | 52.78 | β | 0.00 | γ | 0.00 | |
| Displacement and tilt(5) | | | | | | |
| X | 0.00 | Y | 22.31 | Z | 37.69 | |
| α | 82.86 | β | 0.00 | γ | 0.00 | |
| Displacement and tilt(6) | | | | | | |
| X | 0.00 | Y | 24.94 | Z | 40.37 | |
| α | 53.05 | β | 0.00 | γ | 0.00 | |
| Displacement and tilt(7) | | | | | | |
| X | 0.00 | Y | 16.21 | Z | 45.33 | |
| α | 125.46 | β | 0.00 | γ | 0.00 | |
| Displacement and tilt(8) | | | | | | |
| X | 0.00 | Y | 15.40 | Z | 45.91 | |
| α | 125.46 | β | 0.00 | γ | 0.00 | |
| Displacement and tilt(9) | | | | | | |
| X | 0.00 | Y | 14.58 | Z | 46.49 | |
| α | 125.46 | β | 0.00 | γ | 0.00 | |
| Displacement and tilt(10) | | | | | | |
| X | 0.00 | Y | 6.47 | Z | 52.27 | |
| α | 125.46 | β | 0.00 | γ | 0.00 | |

EXAMPLE 4

| Surface No. | Radius of curvature | Surface separation | Displacement and tilt | Refractive indeX | Abbe's No. |
|---|---|---|---|---|---|
| Object plane | ∞ | −1000.00 | | | |
| 1 | ∞ (Pupil) | | | | |
| 2 | ASS① | | (1) | 1.4922 | 57.5 |
| 3 | FFS① (RS) | | (2) | 1.4922 | 57.5 |
| 4 | ASS① (RS) | | (1) | 1.4922 | 57.5 |
| 5 | FFS② | | (3) | | |
| 6 | 118.41 | | (4) | 1.5163 | 64.1 |
| 7 | ∞ | | (5) | | |
| Image plane | ∞ (LCD) (RS) | | (6) | | |
| 9 | ∞ | | (5) | 1.5163 | 64.1 |
| 10 | 118.41 (RS) | | (4) | 1.5163 | 64.1 |
| 11 | (RS) | | (5) | 1.5163 | 64.1 |
| 12 | ∞ | | (7) | | |
| 13 | 30.06 (FLS) | | (8) | 1.4922 | 57.5 |
| 14 | 12.35 (FLS) | | (9) | | |
| Light source | ∞ | | (10) | | |

ASS①

| R | −120.91 |
|---|---|
| K | $1.5416 \times 10^{1}$ |
| A | $-1.8088 \times 10^{-6}$ |
| B | $-1.0868 \times 10^{-8}$ |

FFS①

| $C_4$ | $-9.5691 \times 10^{-3}$ | $C_6$ | $-9.6261 \times 10^{-3}$ | $C_8$ | $-2.0834 \times 10^{-5}$ |
|---|---|---|---|---|---|
| $C_{10}$ | $-1.0268 \times 10^{-5}$ | $C_{11}$ | $-1.4779 \times 10^{-6}$ | $C_{13}$ | $-5.9133 \times 10^{-6}$ |
| $C_{15}$ | $-2.3277 \times 10^{-6}$ | | | | |

FFS②

| $C_4$ | $1.3701 \times 10^{-3}$ | $C_6$ | $-1.0273 \times 10^{-3}$ | $C_8$ | $-1.6989 \times 10^{-4}$ |
|---|---|---|---|---|---|
| $C_{10}$ | $-2.1410 \times 10^{-3}$ | $C_{11}$ | $-1.0113 \times 10^{-4}$ | $C_{13}$ | $-2.2842 \times 10^{-5}$ |
| $C_{15}$ | $-2.5071 \times 10^{-4}$ | | | | |

Displacement and tilt(1)

| X | 0.00 | Y | 1.16 | Z | 29.92 |
|---|---|---|---|---|---|
| α | 4.31 | β | 0.00 | γ | 0.00 |

Displacement and tilt(2)

| X | 0.00 | Y | 1.82 | Z | 38.76 |
|---|---|---|---|---|---|
| α | −17.65 | β | 0.00 | γ | 0.00 |

Displacement and tilt(3)

| X | 0.00 | Y | 17.37 | Z | 35.09 |
|---|---|---|---|---|---|
| α | 39.15 | β | 0.00 | γ | 0.00 |

Displacement and tilt(4)

| X | 0.00 | Y | 17.84 | Z | 35.85 |
|---|---|---|---|---|---|
| α | 50.44 | β | 0.00 | γ | 0.00 |

Displacement and tilt(5)

| X | 0.00 | Y | 21.90 | Z | 37.79 |
|---|---|---|---|---|---|
| α | 80.65 | β | 0.00 | γ | 0.00 |

Displacement and tilt(6)

| X | 0.00 | Y | 24.45 | Z | 40.57 |
|---|---|---|---|---|---|
| α | 51.94 | β | 0.00 | γ | 0.00 |

Displacement and tilt(7)

| X | 0.00 | Y | 16.23 | Z | 45.31 |
|---|---|---|---|---|---|
| α | 124.23 | β | 0.00 | γ | 0.00 |

Displacement and tilt(8)

| X | 0.00 | Y | 15.41 | Z | 45.87 |
|---|---|---|---|---|---|
| α | 124.23 | β | 0.00 | γ | 0.00 |

Displacement and tilt(9)

| X | 0.00 | Y | 14.58 | Z | 46.44 |
|---|---|---|---|---|---|
| α | 124.23 | β | 0.00 | γ | 0.00 |

Displacement and tilt(10)

| X | 0.00 | Y | 8.33 | Z | 50.69 |
|---|---|---|---|---|---|
| α | 124.23 | β | 0.00 | γ | 0.00 |

EXAMPLE 5

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Pupil) | | | | |
| 2 | ASS① | | (1) | 1.5254 | 56.2 |
| 3 | FFS① | | (2) | | |
| 4 | FFS② | | (3) | 1.5254 | 56.2 |
| 5 | ASS② | | (4) | | |
| | ASS① | | | | |

| R | −176.22 |
|---|---|
| K | $-3.7387 \times 10^{+1}$ |
| A | $-1.6692 \times 10^{-6}$ |
| B | $2.9814 \times 10^{-9}$ |
| C | $-2.0018 \times 10^{-12}$ |

ASS②

| R | −1062.55 |
|---|---|
| K | $5.4556 \times 10^{+2}$ |
| A | $3.6429 \times 10^{-6}$ |
| B | $5.0316 \times 10^{-9}$ |
| C | $-1.1192 \times 10^{-12}$ |

FFS②

| $C_4$ | $-6.8800 \times 10^{-3}$ | $C_6$ | $-6.3619 \times 10^{-3}$ | $C_8$ | $4.1553 \times 10^{-5}$ |
|---|---|---|---|---|---|

-continued

| Surface No. | Radius of curvature | Surface separation | Displacement and tilt | Refractive index | Abbe's No. |
|---|---|---|---|---|---|
| $C_{10}$ | $6.8837 \times 10^{-5}$ | $C_{11}$ | $1.2241 \times 10^{-6}$ | $C_{13}$ | $3.3302 \times 10^{-6}$ |
| $C_{15}$ | $2.5098 \times 10^{-6}$ | $C_{17}$ | $3.8987 \times 10^{-8}$ | $C_{19}$ | $1.2588 \times 10^{-7}$ |
| $C_{21}$ | $5.2527 \times 10^{-8}$ | | | | |
| | FFS②  | | | | |
| $C_4$ | $-4.4160 \times 10^{-3}$ | $C_6$ | $-2.4845 \times 10^{-3}$ | $C_8$ | $2.2623 \times 10^{-4}$ |
| $C_{10}$ | $2.3442 \times 10^{-4}$ | $C_{11}$ | $8.6043 \times 10^{-6}$ | $C_{13}$ | $1.7297 \times 10^{-5}$ |
| $C_{15}$ | $9.4774 \times 10^{-6}$ | $C_{17}$ | $8.8375 \times 10^{-8}$ | $C_{19}$ | $2.5550 \times 10^{-7}$ |
| $C_{21}$ | $1.6464 \times 10^{-7}$ | | | | |
| | | | Displacement and tilt (1) | | |
| X | 0.00 | Y | −2.61 | Z | 32.27 |
| α | 5.50 | β | 0.00 | γ | 0.00 |
| | | | Displacement and tilt (2) | | |
| X | 0.00 | Y | 3.08 | Z | 42.45 |
| α | −14.95 | β | 0.00 | γ | 0.00 |
| | | | Displacement and tilt (3) | | |
| X | 0.00 | Y | 3.08 | Z | 42.95 |
| α | −14.95 | β | 0.00 | γ | 0.00 |
| | | | Displacement and tilt (4) | | |
| X | 0.00 | Y | −6.46 | Z | 48.00 |
| α | 7.60 | β | 0.00 | γ | 0.00 |

EXAMPLE 6

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Pupil) | | | | |
| 2 | ASS① | | (1) | 1.5254 | 56.2 |
| 3 | FFS① | | (2) | | |
| 4 | FFS② | | (3) | 1.5254 | 56.2 |
| 5 | ASS③ | | (4) | | |
| | ASS① | | | | |
| R | −176.22 | | | | |
| K | $-3.7387 \times 10^{+1}$ | | | | |
| A | $-1.6692 \times 10^{-6}$ | | | | |
| B | $2.9814 \times 10^{-9}$ | | | | |
| C | $-2.0018 \times 10^{-12}$ | | | | |
| | FFS① | | | | |
| $C_4$ | $-6.8800 \times 10^{-3}$ | $C_6$ | $-6.3619 \times 10^{-3}$ | $C_8$ | $4.1553 \times 10^{-5}$ |
| $C_{10}$ | $6.8837 \times 10^{-5}$ | $C_{11}$ | $1.2241 \times 10^{-6}$ | $C_{13}$ | $3.3302 \times 10^{-6}$ |
| $C_{15}$ | $2.5098 \times 10^{-6}$ | $C_{17}$ | $3.8987 \times 10^{-8}$ | $C_{19}$ | $1.2588 \times 10^{-7}$ |
| $C_{21}$ | $5.2527 \times 10^{-8}$ | | | | |
| | FFS② | | | | |
| $C_4$ | $-5.3827 \times 10^{-3}$ | $C_6$ | $-3.9107 \times 10^{-3}$ | $C_8$ | $2.0464 \times 10^{-5}$ |

-continued

| Surface No. | Radius of curvature | Surface separation | Displacement and tilt | Refractive index | Abbe's No. |
|---|---|---|---|---|---|
| $C_{10}$ | $2.0013 \times 10^{-4}$ | $C_{11}$ | $-3.0583 \times 10^{-6}$ | $C_{13}$ | $2.9474 \times 10^{-6}$ |
| $C_{15}$ | $5.4444 \times 10^{-6}$ | $C_{17}$ | $-1.1451 \times 10^{-7}$ | $C_{19}$ | $1.3958 \times 10^{-7}$ |
| $C_{21}$ | $3.3195 \times 10^{-7}$ | | | | |
| | FFS③ | | | | |
| $C_4$ | $-3.9314 \times 10^{-4}$ | $C_6$ | $4.9360 \times 10^{-4}$ | $C_8$ | $-9.7487 \times 10^{-6}$ |
| $C_{10}$ | $1.6818 \times 10^{-4}$ | $C_{11}$ | $-5.3888 \times 10^{-6}$ | $C_{13}$ | $-2.1876 \times 10^{-6}$ |
| $C_{15}$ | $5.8586 \times 10^{-6}$ | $C_{17}$ | $-7.0891 \times 10^{-8}$ | $C_{19}$ | $-4.0581 \times 10^{-8}$ |
| $C_{21}$ | $3.4163 \times 10^{-7}$ | | | | |
| | | | Displacement and tilt (1) | | |
| X | 0.00 | Y | −2.61 | Z | 32.27 |
| α | 5.50 | β | 0.00 | γ | 0.00 |
| | | | Displacement and tilt (2) | | |
| X | 0.00 | Y | 3.08 | Z | 42.45 |
| α | −14.95 | β | 0.00 | γ | 0.00 |
| | | | Displacement and tilt (3) | | |
| X | 0.00 | Y | 1.38 | Z | 42.12 |
| α | −14.16 | β | 0.00 | γ | 0.00 |
| | | | Displacement and tilt (4) | | |
| X | 0.00 | Y | −1.25 | Z | 47.68 |
| α | 9.11 | β | 0.00 | γ | 0.00 |

EXAMPLE 7

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Pupil) | | | | |
| 2 | ASS① | | (1) | 1.5254 | 56.2 |
| 3 | FFS① | | (2) | | |
| 4 | ASS② | | (3) | 1.5254 | 56.2 |
| | ASS① | | | | |
| R | −176.22 | | | | |
| K | $-3.7387 \times 10^{+1}$ | | | | |
| A | $-1.6692 \times 10^{-6}$ | | | | |
| B | $2.9814 \times 10^{-9}$ | | | | |
| C | $-2.0018 \times 10^{-12}$ | | | | |
| | ASS② | | | | |
| R | −180.91 | | | | |
| K | $-1.7624 \times 10^{+1}$ | | | | |
| A | $-8.6096 \times 10^{-7}$ | | | | |
| B | $1.0983 \times 10^{-9}$ | | | | |
| C | $-6.2255 \times 10^{-13}$ | | | | |
| | FFS① | | | | |
| $C_4$ | $-6.8800 \times 10^{-3}$ | $C_6$ | $-6.3619 \times 10^{-3}$ | $C_8$ | $4.1553 \times 10^{-5}$ |

-continued

| Surface No. | Radius of curvature | Surface separation | Displacement and tilt | Refractive index | Abbe's No. |
|---|---|---|---|---|---|
| $C_{10}$ | $6.8837 \times 10^{-5}$ | $C_{11}$ | $1.2241 \times 10^{-6}$ | $C_{13}$ | $3.3302 \times 10^{-6}$ |
| $C_{15}$ | $2.5098 \times 10^{-6}$ | $C_{17}$ | $3.8987 \times 10^{-8}$ | $C_{19}$ | $1.2588 \times 10^{-7}$ |
| $C_{21}$ | $5.2527 \times 10^{-8}$ | | | | |
| | | Displacement and tilt (1) | | | |
| X | 0.00 | Y | −2.61 | Z | 32.27 |
| α | 5.50 | β | 0.00 | γ | 0.00 |
| | | Displacement and tilt (2) | | | |
| X | 0.00 | Y | 3.08 | Z | 42.45 |
| α | −14.95 | β | 0.00 | γ | 0.00 |
| | | Displacement and tilt (3) | | | |
| X | 0.00 | Y | −2.88 | Z | 48.00 |
| α | 5.24 | β | 0.00 | γ | 0.00 |

EXAMPLE 8

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Pupil) | | | | |
| 2 | ASS① | | (1) | 1.5254 | 56.2 |
| 3 | FFS① | | (2) | | |
| 4 | ASS② | | (3) | 1.5254 | 56.2 |
| | ASS① | | | | |
| R | −176.22 | | | | |
| K | $-3.7387 \times 10^{+1}$ | | | | |
| A | $-1.6692 \times 10^{-6}$ | | | | |
| B | $2.9814 \times 10^{-9}$ | | | | |
| C | $-2.0018 \times 10^{-12}$ | | | | |
| | ASS③ | | | | |
| R | −329.91 | | | | |
| K | $2.4830 \times 10^{+2}$ | | | | |
| A | $-8.3359 \times 10^{-6}$ | | | | |
| B | $3.1774 \times 10^{-8}$ | | | | |
| C | $-2.7221 \times 10^{-11}$ | | | | |
| | FFS① | | | | |
| $C_4$ | $-6.8800 \times 10^{3}$ | $C_6$ | $-6.3619 \times 10^{-3}$ | $C_8$ | $4.1553 \times 10^{-5}$ |
| $C_{10}$ | $6.8837 \times 10^{5}$ | $C_{11}$ | $1.2241 \times 10^{-6}$ | $C_{13}$ | $3.3302 \times 10^{-6}$ |
| $C_{15}$ | $2.5098 \times 10^{6}$ | $C_{17}$ | $3.8987 \times 10^{-8}$ | $C_{19}$ | $1.2588 \times 10^{-7}$ |
| $C_{21}$ | $5.2527 \times 10^{8}$ | | | | |
| | | Displacement and tilt (1) | | | |
| X | 0.00 | Y | −2.61 | Z | 32.27 |
| α | 5.50 | β | 0.00 | γ | 0.00 |
| | | Displacement and tilt (2) | | | |
| X | 0.00 | Y | 3.08 | Z | 42.45 |
| α | −14.95 | β | 0.00 | γ | 0.00 |

-continued

| Surface No. | Radius of curvature | Surface separation | Displacement and tilt | Refractive index | Abbe's No. |
|---|---|---|---|---|---|
| | | Displacement and tilt (3) | | | |
| X | 0.00 | Y | −5.97 | Z | 48.00 |
| α | 4.73 | β | 0.00 | γ | 0.00 |

(Viewing Optical System of Image Display Device of Example 5–8)

EXAMPLE 8

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Pupil) | | | | |
| 2 | ASS① | | (1) | 1.5254 | 56.2 |
| 3 | FFS① (RS) | | (2) | 1.5254 | 56.2 |
| 4 | ASS① (RS) | | (1) | 1.5254 | 56.2 |
| 5 | FFS② | | (3) | | |
| 6 | ∞ (HRP) | 1.50 | (4) | | |
| 7 | ∞ | 1.40 | | 1.5254 | 56.2 |
| 8 | ∞ | 0.00 | | 1001.0682 | −3.5 |
| 9 | −209750.722 (DOE) | 0.50 | | | |
| 10 | ∞ | 7.13 | | 1.5163 | 64.1 |
| 11 | ∞ | 1.56 | | | |
| 12 | ∞ | 0.16 | | 1.5860 | 34.5 |
| 13 | ∞ | 1.10 | | 1.5230 | 59.4 |
| Image plane | ∞ (LCD) | | | | |
| | ASS① | | | | |
| R | −176.22 | | | | |
| K | $-3.7387 \times 10^{+1}$ | | | | |
| A | $-1.6692 \times 10^{-6}$ | | | | |
| B | $2.9814 \times 10^{-9}$ | | | | |
| C | $-2.0018 \times 10^{-12}$ | | | | |
| | FFS① | | | | |
| $C_4$ | $-6.8800 \times 10^{-3}$ | $C_6$ | $-6.3619 \times 10^{-3}$ | $C_8$ | $4.1553 \times 10^{-5}$ |
| $C_{10}$ | $6.8837 \times 10^{-5}$ | $C_{11}$ | $1.2241 \times 10^{-6}$ | $C_{13}$ | $3.3302 \times 10^{-6}$ |
| $C_{15}$ | $2.5098 \times 10^{-6}$ | $C_{17}$ | $3.8987 \times 10^{-8}$ | $C_{19}$ | $1.2588 \times 10^{-7}$ |
| $C_{21}$ | $5.2527 \times 10^{-8}$ | | | | |
| | FFS② | | | | |
| $C_4$ | $-2.3155 \times 10^{-2}$ | $C_6$ | $-3.0035 \times 10^{-2}$ | $C_8$ | $4.7893 \times 10^{-4}$ |
| $C_{10}$ | $5.9168 \times 10^{-4}$ | $C_{11}$ | $7.4760 \times 10^{-6}$ | $C_{13}$ | $4.6108 \times 10^{-5}$ |
| $C_{15}$ | $1.6986 \times 10^{-5}$ | $C_{17}$ | $-7.6840 \times 10^{-7}$ | $C_{19}$ | $-3.8926 \times 10^{-6}$ |
| $C_{21}$ | $-2.0872 \times 10^{-6}$ | | | | |
| | | Displacement and tilt (1) | | | |
| X | 0.00 | Y | −2.61 | Z | 32.27 |
| α | 5.50 | β | 0.00 | γ | 0.00 |

-continued

| Surface No. | Radius of curvature | Surface separation | Displacement and tilt | Refractive index | Abbe's No. |
|---|---|---|---|---|---|
| | | | Displacement and tilt (2) | | |
| X | 0.00 | Y | 3.08 | Z | 42.45 |
| α | −14.95 | β | 0.00 | γ | 0.00 |
| | | | Displacement and tilt (3) | | |
| X | 0.00 | Y | 18.35 | Z | 39.28 |
| α | 60.78 | β | 0.00 | γ | 0.00 |
| | | | Displacement and tilt (4) | | |
| X | 0.00 | Y | 18.86 | Z | 38.29 |
| α | 49.61 | β | 0.00 | γ | 0.00 |

FIGS. 6 to 9 are aberrational diagrams showing lateral aberrations in the above-described Examples 1 to 4, respectively. In these aberrational diagrams, the numerals in the parentheses denote (horizontal field angle, vertical field angle), and lateral aberrations at the field angles are shown.

Figure 29:
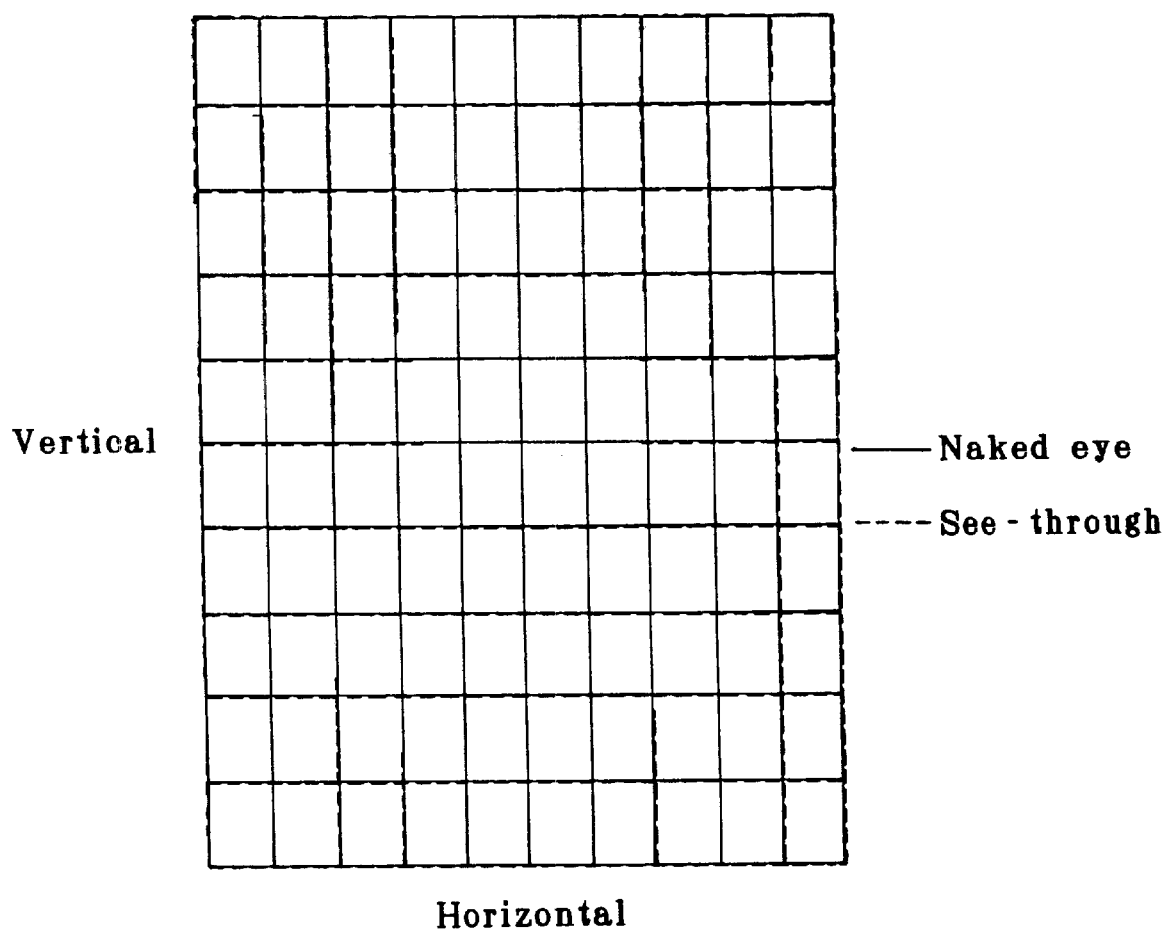
FIG. 29 is a diagram showing a lattice image viewed through the see-through optical system in Example 5 and a lattice image seen with the naked eye, the two images being superimposed on one another.
Figure 30:
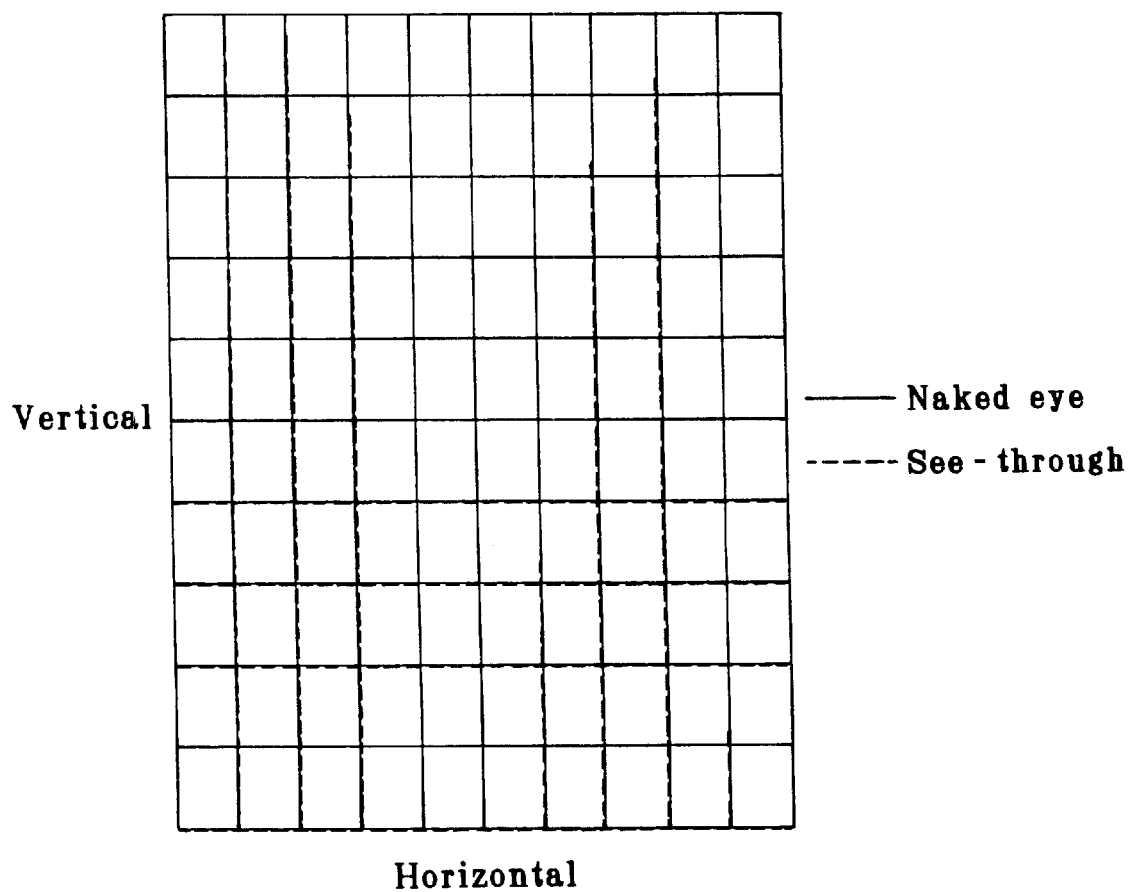
FIG. 30 is a diagram showing a lattice image viewed through the see-through optical system in Example 6 and a lattice image seen with the naked eye, the two images being superimposed on one another.

FIGS. 29 and 30 are diagrams each showing a lattice image viewed through the see-through optical system in each of Examples 5 and 6 and a lattice image viewed with the naked eye, the two images being superimposed on one another. It will be clear from these figures that in a case where the viewing optical system according to each example is used in a head-mounted viewing optical apparatus designed for a single eye, when the observer views the outside world with both eyes, two outside world images seen with the right and left eyes can be readily fused into a single image.

Figure 47:
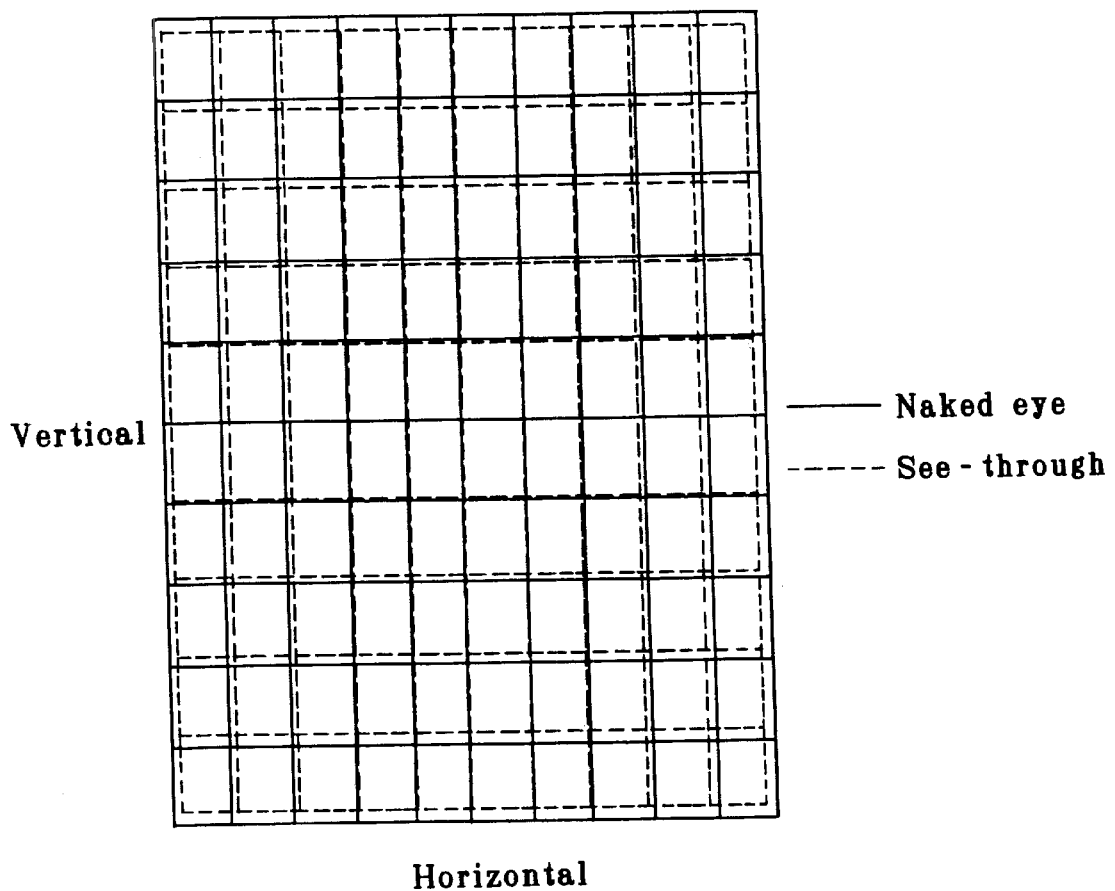
FIG. 47 is a diagram showing a lattice image viewed through the see-through optical system in Example 7 and a lattice image seen with the naked eye, the two images being superimposed on one another.
Figure 48:
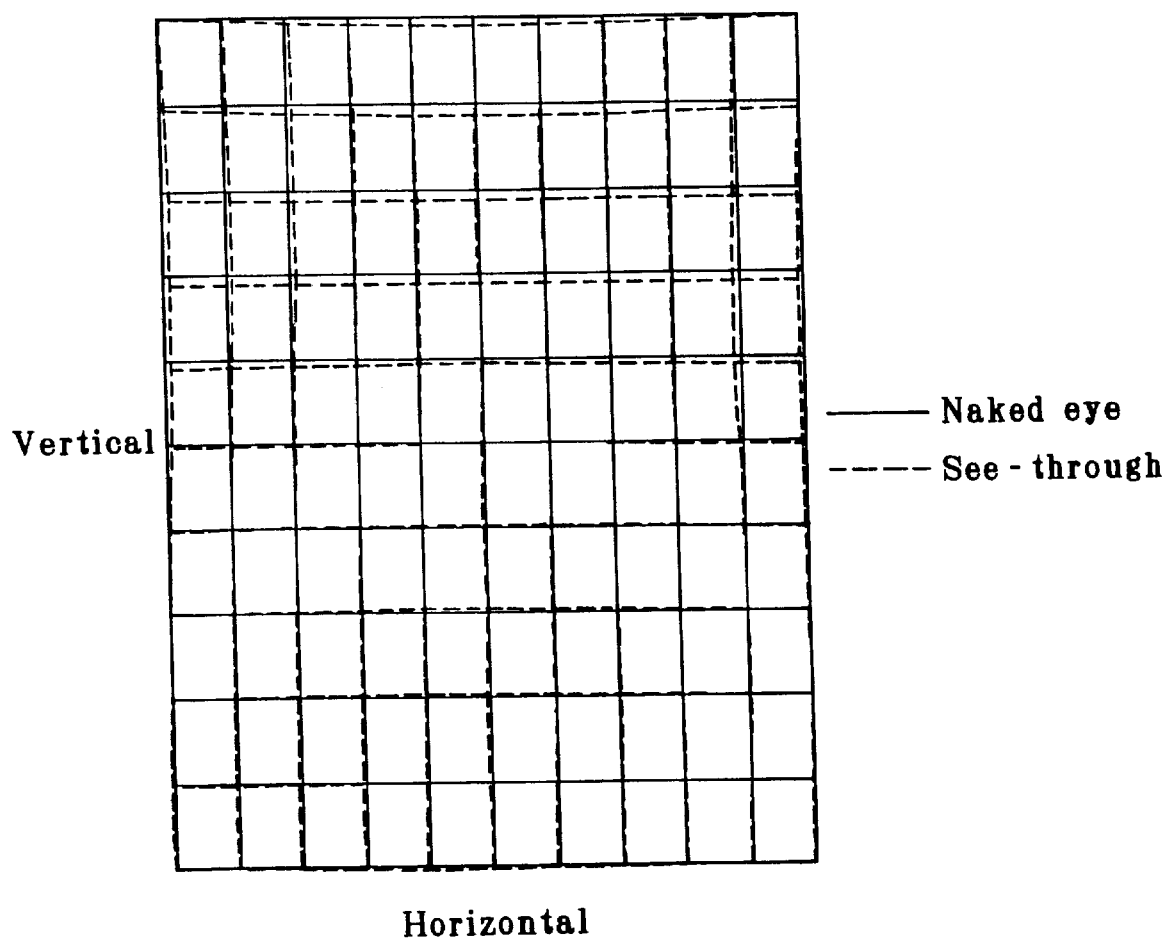
FIG. 48 is a diagram showing a lattice image viewed through the see-through optical system in Example 8 and a lattice image seen with the naked eye, the two images being superimposed on one another.

FIGS. 47 and 48 are diagrams each showing a lattice image viewed through the see-through optical system in each of Examples 7 and 8 and a lattice image seen with the naked eye, the two images being superimposed on one another.

The values of Px, Py, βx, βy, Cx3/Cx2 and Cy3/Cy2 concerning the conditions (6) to (11) in the above-described Examples 5 and 6 are as follows:

| | Px | Py | βx | βy | Cx3/Cx2 | Cy3/Cy2 |
|---|---|---|---|---|---|---|
| Ex. 5 | 0.00050 | 0.00000 | 0.99920 | 0.99850 | 0.69950 | 0.56645 |
| Ex. 6 | 0.00060 | −0.00010 | 0.99691 | 1.00130 | 0.83012 | 0.62687 |

The values of Px, Py, βx and βy concerning the conditions (14) to (17) in the above-described Examples 7 and 8 are as follows:

| | Px | Py | βx | βy |
|---|---|---|---|---|
| Ex. 7 | 0.00000 | 0.00000 | 1.03210 | 1.03252 |
| Ex. 8 | 0.00070 | −0.00040 | 1.00929 | 1.05285 |

Figure 31:
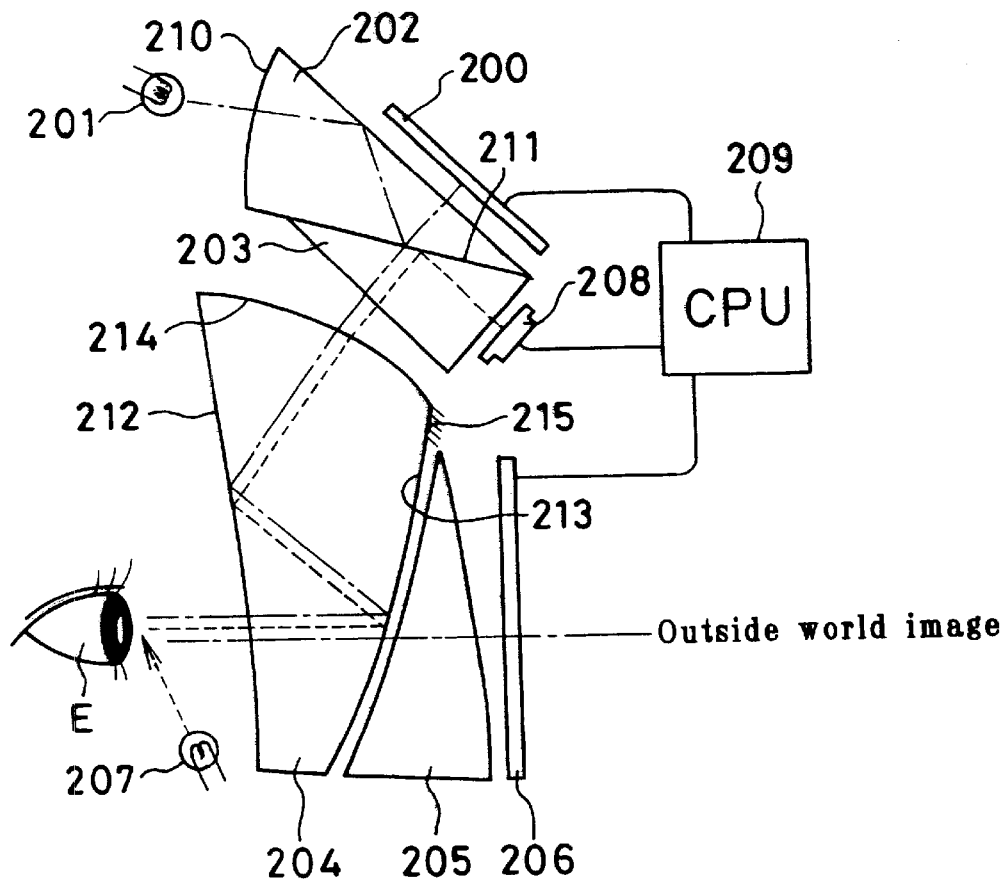
FIG. 31 is a diagram showing the arrangement of another embodiment of the viewing optical system according to the present invention arranged in the form of a second viewing optical system of the present invention.

FIG. 31 shows the arrangement of another embodiment of the viewing optical system according to the present invention arranged in the form of the second viewing optical system of the present invention. The viewing optical system according to this embodiment includes a first-image forming member having a reflection type LCD (liquid crystal display device) 200, an illuminating light source 201, and optical elements 202 and 203 for illumination. The viewing optical system further includes an ocular optical system 204 for leading the first image displayed on the reflection type LCD 200 to an observer's eyeball E. In addition, a see-through optical element 205 is placed on the second-image side of the ocular optical system 204 to lead an outside world image (second image), and a light-blocking member 206 is placed on the second-image side of the see-through optical element 205. The light-blocking member 206 is capable of switching between transmission and cutoff of a light beam or switching between transmission and dimming of a light beam. Further, the viewing optical system has a line-of-sight detecting device for detecting an observer's line of sight. The line-of-sight detecting device includes a light source 207 for pupil illumination, a light-receiving element 208 for receiving the pupil image, and a CPU 209 for analyzing the pupil image received with the light-receiving element 208 and controlling other members on the basis of information obtained by the analysis.

The illuminating light source 201 is an LED, a lamp, etc., which may be a white light source or a light source of RGB set. The optical element 202 for illumination has a convex surface 210 of positive power on the side thereof closer to the light source 201. The convex surface 210 has the function of a field lens. From the viewpoint of harmonizing the demand for aberration correction with the demand for achieving a cost reduction by an improvement in productivity, it is desirable to change the configuration of the convex surface 210 according to circumstances. If the demand for aberration correction is strong, it is desirable to change the convex surface 210 from the spherical surface to a rotationally symmetric aspherical surface, an anamorphic surface or a free-form surface so that the design degree is increased. If the demand for a cost reduction is strong, it is desirable to change the convex surface 210 to a spherical or rotationally symmetric aspherical surface, which provide high productivity. A surface 211 between the optical elements 202 and 203 for illumination is formed with a half-mirror coating, a beam splitter coating, etc. so as to have both light-transmitting and -reflecting actions. Even if light emitted from the pupil-illuminating light source 207 for line-of-sight detection is infrared light or visible light, as long as the wavelength band width of the light is sufficiently narrow, it is possible to ignore the influence of the light on the observation of the first image from the LCD 200 even if the light is reflected from the surface 211. Therefore, the surface 211 between the optical elements 202 and 203 may be a surface with wavelength selectivity that reflects light from the light source 207 with high reflectivity.

The ocular optical system 204 is formed from a prism having three optical surfaces, i.e. a first surface 212, a second surface 213, and a third surface 214. Light entering through the third surface 214 is totally reflected by the first surface 212 and further reflected by the second surface 213. The reflected light passes through the first surface 212 and forms an exit pupil, thereby allowing the displayed image of the LCD 200 to be viewed when the observer places the pupil of his/her eyeball at the position of the exit pupil. Because the three surfaces 212 to 214 are decentered, it is desirable to form these surfaces by using anamorphic surfaces or free-form surfaces capable of correcting decentration aberrations (free-form surfaces whose one and only plane of symmetry is coincident with the section of FIG. 31 are particularly desirable). However, from the viewpoint of achieving harmony with the productivity, it is desirable that at least one of the first to third surfaces 212 to 214 should be a rotationally symmetric aspherical surface or a spherical surface. In view of the surface accuracy, it is desirable that the first surface 212, which has the widest surface area and acts on the light beam twice, i.e., when the light beam passes through and is reflected from the first surface 212, should be a spherical surface or a rotationally symmetric aspherical surface, which are capable of ensuring high manufacturing accuracy. In view of the aberration correcting performance, power, etc. of the air lens between the ocular optical system 204 and the see-through optical element 205, it is desirable that the second surface 213 should be a spherical surface or a rotationally symmetric aspherical surface.

The light-blocking member 206, which is capable of switching between transmission and cutoff of a light beam or switching between transmission and dimming of a light beam, may be a shutter (e.g. a mechanical aperture shutter, a liquid crystal shutter, or a blind shutter) capable of switching between transmission and blocking of light or a door mechanism in which a cover simply opens or closes. The light-blocking member 206 may also be a liquid crystal plate arranged so that the transmittance changes stepwisely or continuously. The light-blocking member 206 is controlled by the CPU 209, for example, such that when it is detected that the observer's pupil is opened to a degree more than a predetermined value by measuring the size of the pupil from the pupil image received with the light-receiving element 208, the outside world image becomes bright, whereas when the degree of opening of the pupil is smaller than a predetermined value, the outside world image becomes dark. The arrangement may be such that an illuminance difference between the outside world image and the displayed image of the LCD 200 is measured with a measuring device (not shown), and the transmittance of the light-blocking member 206 is controlled according to the measured value by the CPU 209.

It is also possible to scroll the image displayed on the LCD 200 or to provide the displayed image with the same function as that of a cursor displayed on a computer screen by using information obtained by the line-of-sight detection.

If the second surface 213 of the ocular optical system 204 and the see-through optical element 205 have the same size, assembly is facilitated. If the see-through optical element 205 is reduced in size to achieve a reduction in weight, it is desirable to provide a light-blocking coating 215, e.g. a light-blocking paint or coating, on an optical surface or a side surface for the purpose of preventing flare.

Figure 32:
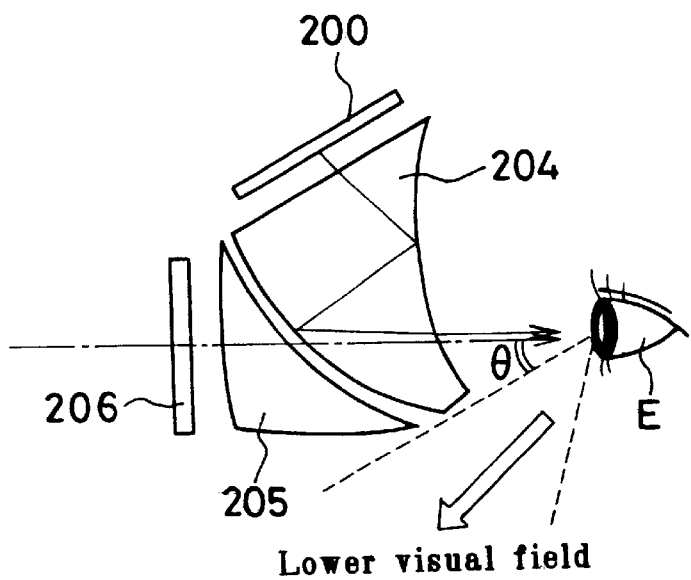
FIG. 32 is a diagram showing the arrangement of a modification of the embodiment shown in FIG. 31.

FIG. 32 shows an improvement in the embodiment shown in FIG. 31. FIG. 32 shows an arrangement that allows the user to see a lower outside world image directly in addition to the outside world image, which is viewed through the see-through optical element 205, so that when an image on a computer screen is displayed on the LCD 200 (either a transmission type LCD or a reflection type LCD), for example, it is easy for the user to confirm the keyboard operation by directing his/her line of sight downwardly. In order to ensure the lower visual field, it is desirable to increase the distance between the pupil and the ocular optical system 204 or to shorten the length of the lower part of the assembly of the ocular optical system 204 and the see-through optical element 205 so that the ocular optical system 204 and the see-through optical element 205 are within an angle θ not more than 60° (θ≦60°), where θ is an angle defined at the pupil center with respect to the visual axis. It should be noted, however, that when it is necessary to limit the angle θ in compliance with the demands concerning the vertical field angle and the optical design, the angle θ may be set at 45° or less (θ≦45°) from the viewpoint of harmonizing the demands with each other.

Figure 33:
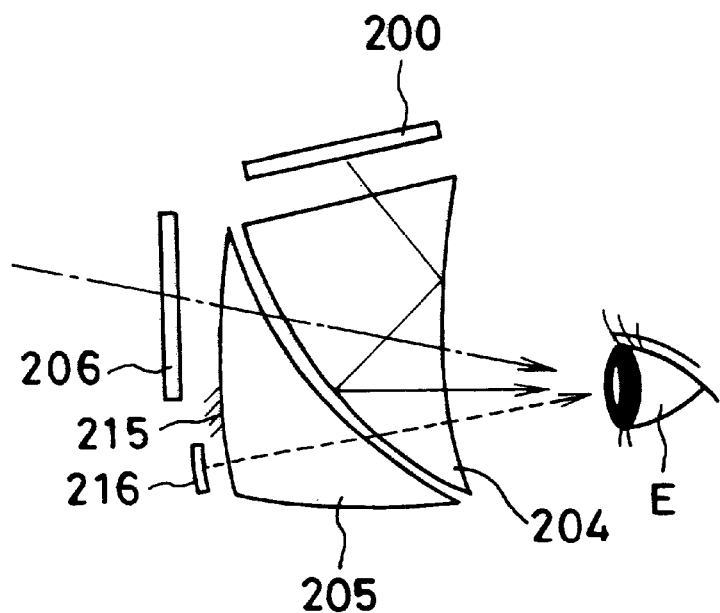
FIG. 33 is a diagram showing the arrangement of a viewing optical system according to still another embodiment.

FIG. 33 shows another embodiment of the viewing optical system, in which a third image that is different from the outside world image is led to a pupil E through the see-through optical element 205 and the ocular optical system 204. A small-sized display device 216 for displaying characters or the like is disposed on the outside world side of the see-through optical element 205. For example, the display device 216 may be an LCD, LED, or a display of a symbol by external light. To display the image of the display device 216 in the visual field of the outside world, the display device 216 is disposed between the light-blocking member 206 and the see-through optical element 205. To juxtapose the outside world image and the image of the display device 216, the display device 216 is positioned in a space provided by cutting a part of the light-blocking member 206, as shown in FIG. 33. In this case, it is desirable to provide a light-blocking coating 215 on a portion corresponding to the margin with a view to preventing entrance of flare light or the like while clarifying the boundary portion. The display device 216 can be used to indicate a warning, measured values of outside-air temperature and humidity sensors, an ultraviolet radiation dose measuring sensor, etc. (not shown) and to display support information, i.e. a period of use and a time.

Figure 34:
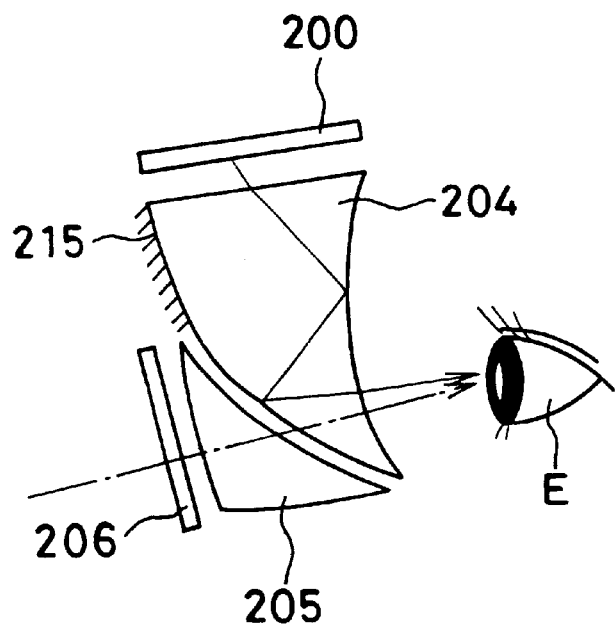
FIG. 34 is a diagram showing the arrangement of a viewing optical system according to a further embodiment.
Figure 35:
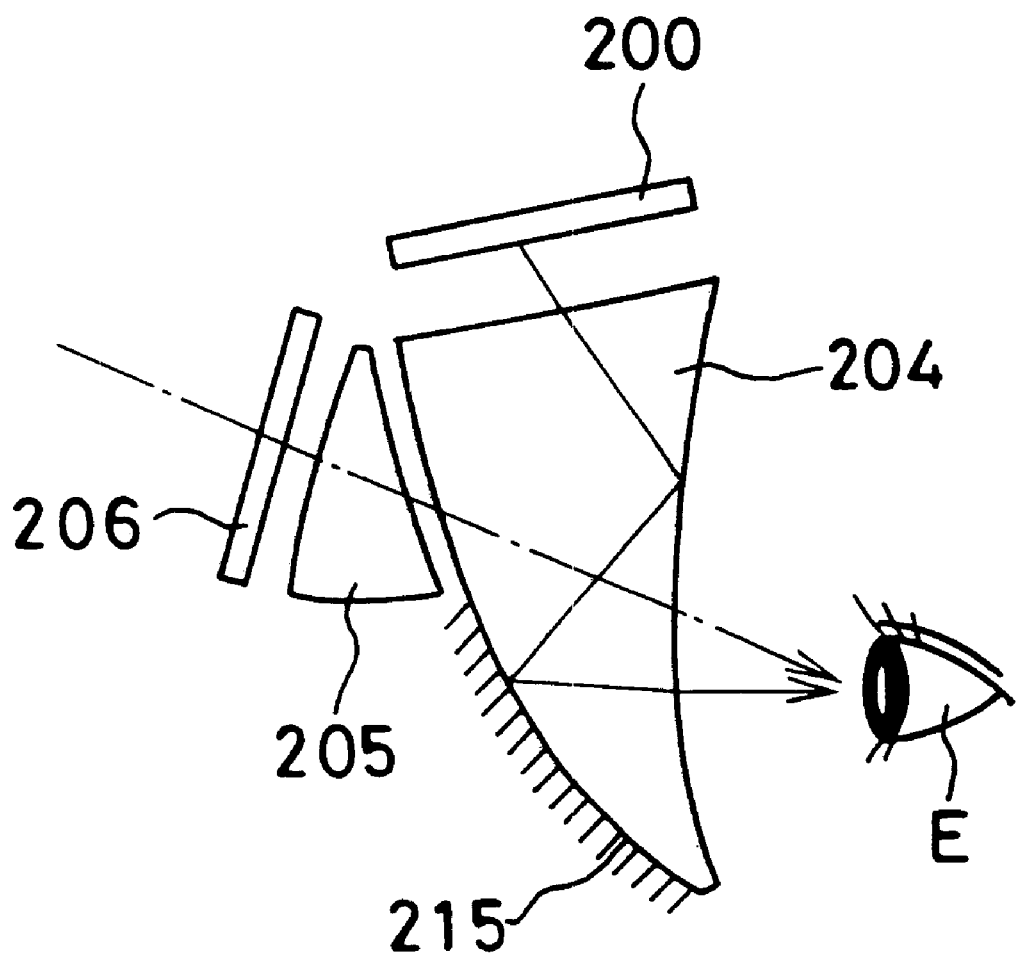
FIG. 35 is a diagram showing the arrangement of a viewing optical system according to a still further embodiment.

When the visual field of the outside world image need not be wide or there is a strong demand for reducing the overall size and weight of the apparatus, the see-through optical element 205 may be constructed in a compact form, as shown in FIGS. 34 and 35. In the case of FIG. 34, the see-through optical element 205 is disposed at a lower position, and the visual axis for observation of the image from the LCD 200 and the visual axis for observation of the image from the outside world are approximately coincident with each other. Therefore, the observer can view both the images without rolling his/her eyeball.

In the case of FIG. 35, the see-through optical element 205 is disposed at an upper position. Because the image from the LCD 200 and the outside world image overlap each other or can be juxtaposed completely. Therefore, it is possible to diminish the inconvenience of viewing a double image, and at the same time, it is possible to view both the image of the LCD 200 and the outside world image simultaneously.

It should be noted that although in FIGS. 34 and 35 the see-through optical element 205 is disposed at a lower position and at an upper position, respectively, it may be disposed on the right or left side. FIGS. 31 to 35 are all vertical sectional views, in which the LCD 200 is disposed on the upper side. However, the LCD 200 may be disposed on the lower side by rotating the arrangement shown in these figures through 180°. It is also possible to rotate the arrangement through 90° to construct a viewing optical system having a horizontally folded optical path.

Figure 49:
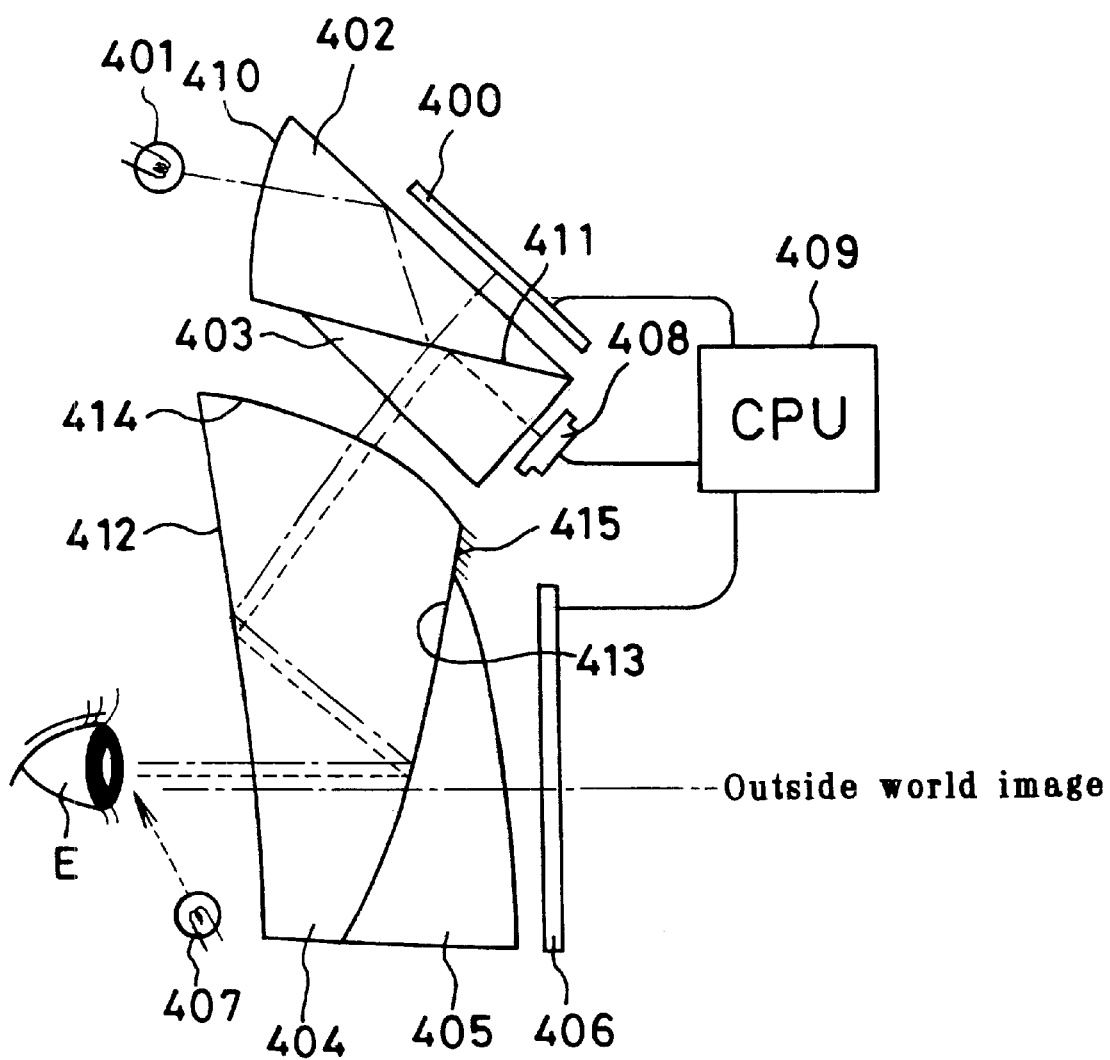
FIG. 49 is a diagram showing the arrangement of another embodiment of the viewing optical system according to the present invention arranged in the form of third and fourth viewing optical systems of the present invention.

FIG. 49 shows the arrangement of a viewing optical system according to another embodiment of the present invention arranged in the form of the third and fourth viewing optical systems of the present invention. The viewing optical system according to this embodiment includes a first-image forming member having a reflection type LCD (liquid crystal display device) 400, an illuminating light source 401, and optical elements 402 and 403 for illumination. The viewing optical system further includes an ocular optical system 404 for leading the first image displayed on the reflection type LCD 400 to an observer's eyeball E. In addition, a see-through optical element 405 is placed on the second-image side of the ocular optical system 404 to lead an outside world image (second image), and a light-blocking member 406 is placed on the second-image side of the see-through optical element 405. The light-blocking member 406 is capable of switching between transmission and cutoff of a light beam or switching between transmission and dimming of a light beam. Further, the viewing optical system has a line-of-sight detecting device for detecting an observer's line of sight. The line-of-sight detecting device includes a light source 407 for pupil illumination, a light-receiving element 408 for receiving the pupil image, and a CPU 409 for analyzing the pupil image received with the light-receiving element 408 and controlling other members on the basis of information obtained by the analysis.

The illuminating light source 401 is an LED, a lamp, etc., which may be a white light source or a light source of RGB set. The optical element 402 for illumination has a convex surface 410 of positive power on the side thereof closer to the light source 401. The convex surface 410 has the function of a field lens. From the viewpoint of harmonizing the demand for aberration correction with the demand for achieving a cost reduction by an improvement in productivity, it is desirable to change the configuration of the convex surface 410 according to circumstances. If the demand for aberration correction is strong, it is desirable to change the convex surface 410 from the spherical surface to a rotationally symmetric aspherical surface, an anamorphic surface or a free-form surface so that the design degree is increased. If the demand for a cost reduction is strong, it is desirable to change the convex surface 410 to a spherical or rotationally symmetric aspherical surface, which provide high productivity. A surface 411 between the optical elements 402 and 403 for illumination is formed with a half-mirror coating, a beam splitter coating, etc. so as to have both light-transmitting and -reflecting actions. Even if light emitted from the pupil-illuminating light source 407 for line-of-sight detection is infrared light or visible light, as long as the wavelength band width of the light is sufficiently narrow, it is possible to ignore the influence of the light on the observation of the first image from the LCD 400 even if the light is reflected from the surface 411. Therefore, the surface 411 between the optical elements 402 and 403 may be a surface with wavelength selectivity that reflects light from the light source 407 with high reflectivity.

The ocular optical system 404 is formed from a prism having three optical surfaces, i.e. a first surface 412, a second surface 413, and a third surface 414. Light entering through the third surface 414 is totally reflected by the first surface 412 and further reflected by the second surface 413. The reflected light passes through the first surface 412 and forms an exit pupil, thereby allowing the displayed image of the LCD 400 to be viewed when the observer places the pupil of his/her eyeball at the position of the exit pupil. Because the three surfaces 412 to 414 are decentered, it is desirable to form these surfaces by using anamorphic surfaces or free-form surfaces capable of correcting decentration aberrations (free-form surfaces whose one and only plane of symmetry is coincident with the section of FIG. 49 are particularly desirable). However, from the viewpoint of achieving harmony with the productivity, it is desirable that at least one of the first to third surfaces 412 to 414 should be a rotationally symmetric aspherical surface or a spherical surface. In view of the surface accuracy, it is desirable that the first surface 412, which has the widest surface area and acts on the light beam twice, i.e., when the light beam passes through and is reflected from the first surface 412, should be a spherical surface or a rotationally symmetric aspherical surface, which are capable of ensuring high manufacturing accuracy. In view of the aberration correcting performance, power, etc. of the air lens between the ocular optical system 404 and the see-through optical element 405, it is desirable that the second surface 413 should be a spherical surface or a rotationally symmetric aspherical surface.

The light-blocking member 406, which is capable of switching between transmission and cutoff of a light beam or switching between transmission and dimming of a light beam, may be a shutter (e.g. a mechanical aperture shutter, a liquid crystal shutter, or a blind shutter) capable of switching between transmission and blocking of light or a door mechanism in which a cover simply opens or closes. The light-blocking member 406 may also be a liquid crystal plate arranged so that the transmittance changes stepwisely or continuously. The light-blocking member 406 is controlled by the CPU 409, for example, such that when it is detected that the observer's pupil is opened to a degree more than a predetermined value by measuring the size of the pupil from the pupil image received with the light-receiving element 408, the outside world image becomes bright, whereas when the degree of opening of the pupil is smaller than a predetermined value, the outside world image becomes dark. The arrangement may be such that an illuminance difference between the outside world image and the displayed image of the LCD 400 is measured with a measuring device (not shown), and the transmittance of the light-blocking member 406 is controlled according to the measured value by the CPU 409.

It is also possible to scroll the image displayed on the LCD 400 or to provide the displayed image with the same function as that of a cursor displayed on a computer screen by using information obtained by the line-of-sight detection.

If the second surface 413 of the ocular optical system 404 and the see-through optical element 405 have the same size, assembly is facilitated. If the see-through optical element 405 is reduced in size to achieve a reduction in weight, it is desirable to provide a light-blocking coating 415, e.g. a light-blocking paint or coating, on an optical surface or a side surface for the purpose of preventing flare.

Figure 50:
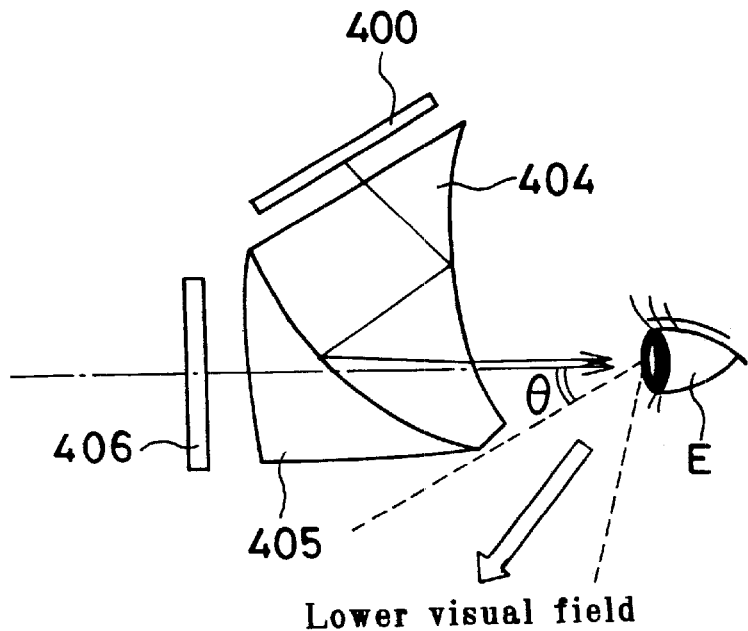
FIG. 50 is a diagram showing the arrangement of a modification of the embodiment shown in FIG. 49.

FIG. 50 shows an improvement in the embodiment shown in FIG. 49. FIG. 50 shows an arrangement that allows the user to see a lower outside world image directly in addition to the outside world image, which is viewed through the see-through optical element 405, so that when an image on a computer screen is displayed on the LCD 400 (either a transmission type LCD or a reflection type LCD), for example, it is easy for the user to confirm the keyboard operation by directing his/her line of sight downwardly. In order to ensure the lower visual field, it is desirable to increase the distance between the pupil and the ocular optical system 404 or to shorten the length of the lower part of the assembly of the ocular optical system 404 and the see-through optical element 405 so that the ocular optical system 404 and the see-through optical element 405 are within an angle θ not more than 60° (θ≦60°), where θ is an angle defined at the pupil center with respect to the visual axis. It should be noted, however, that when it is necessary to limit the angle θ in compliance with the demands concerning the vertical field angle and the optical design, the angle θ may be set at 45° or less (θ≦45°) from the viewpoint of harmonizing the demands with each other.

Figure 51:
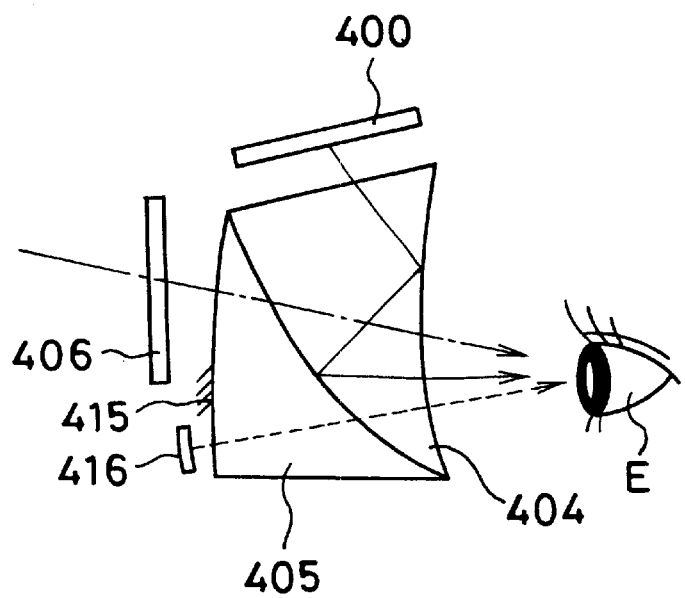
FIG. 51 is a diagram showing the arrangement of a viewing optical system according to still another embodiment.

FIG. 51 shows another embodiment of the viewing optical system, in which a third image that is different from the outside world image is led to a pupil E through the see-through optical element 405 and the ocular optical system 404. A small-sized display device 416 for displaying characters or the like is disposed on the outside world side of the see-through optical element 405. For example, the display device 416 may be an LCD, LED, or a display of a symbol by external light. To display the image of the display device 416 in the visual field of the outside world, the display device 416 is disposed between the light-blocking member 406 and the see-through optical element 405. To juxtapose the outside world image and the image of the display device 416, the display device 416 is positioned in a space provided by cutting a part of the light-blocking member 406, as shown in FIG. 51. In this case, it is desirable to provide a light-blocking coating 415 on a portion corresponding to the margin with a view to preventing entrance of flare light or the like while clarifying the boundary portion. The display device 416 can be used to indicate a warning, measured values of outside-air temperature and humidity sensors, an ultraviolet radiation dose measuring sensor, etc. (not shown) and to display support information, i.e. a period of use and a time.

Figure 52:
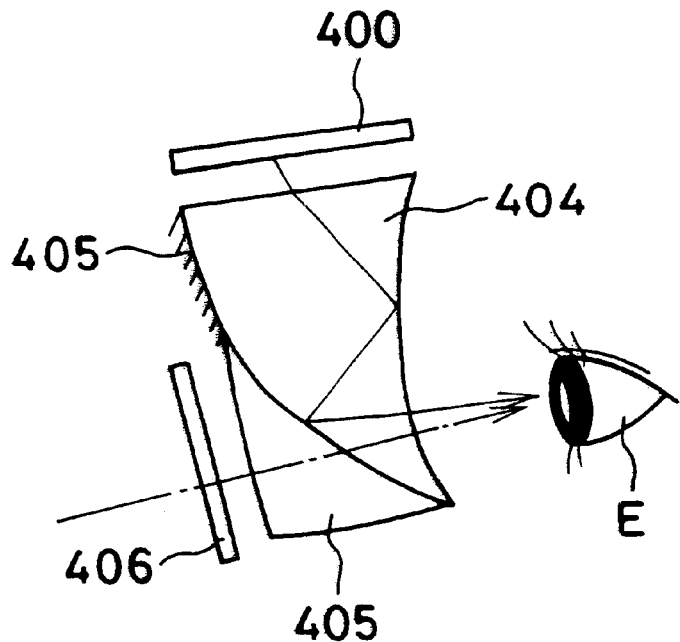
FIG. 52 is a diagram showing the arrangement of a viewing optical system according to a further embodiment.
Figure 53:
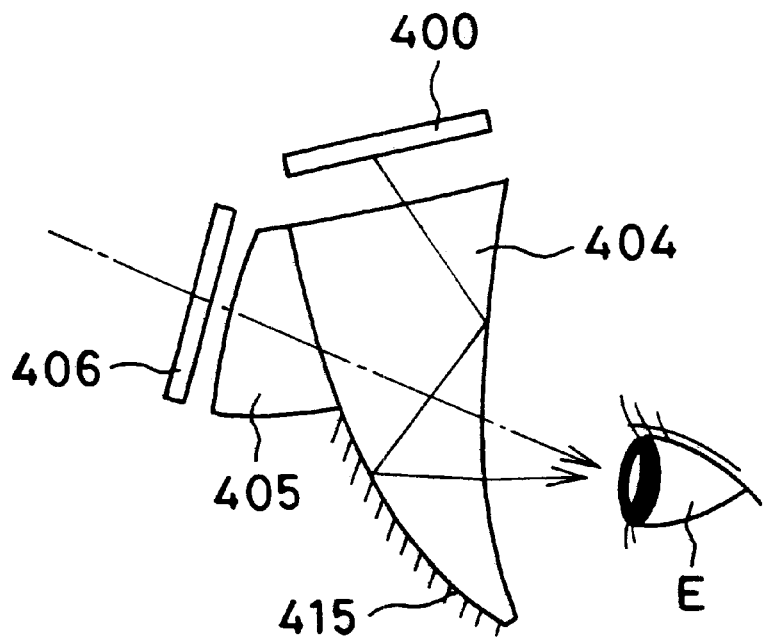
FIG. 53 is a diagram showing the arrangement of a viewing optical system according to a still further embodiment.

When the visual field of the outside world image need not be wide or there is a strong demand for reducing the overall size and weight of the apparatus, the see-through optical element 405 may be constructed in a compact form, as shown in FIGS. 52 and 53. In the case of FIG. 52, the see-through optical element 405 is disposed at a lower position, and the visual axis for observation of the image from the LCD 400 and the visual axis for observation of the image from the outside world are approximately coincident with each other. Therefore, the observer can view both the images without rolling his/her eyeball.

In the case of FIG. 53, the see-through optical element 405 is disposed at an upper position. Because the image from the LCD 400 and the outside world image overlap each other or can be juxtaposed completely. Therefore, it is possible to diminish the inconvenience of viewing a double image, and at the same time, it is possible to view both the image of the LCD 400 and the outside world image simultaneously.

It should be noted that although in FIGS. 52 and 53 the see-through optical element 405 is disposed at a lower position and at an upper position, respectively, it may be disposed on the right or left side. FIGS. 49 to 53 are all vertical sectional views, in which the LCD 400 is disposed on the upper side. However, the LCD 400 may be disposed on the lower side by rotating the arrangement shown in these figures through 180°. It is also possible to rotate the arrangement through 90° to construct a viewing optical system having a horizontally folded optical path.

In the above-described examples, the prism 10 that constitutes the viewing optical system according to the present invention is of the type in which there are two internal reflections and the first surface serves as both a refracting surface and a reflecting surface. It should be noted, however, that prisms usable as the prism 10 in the first viewing optical system according to the present invention are not necessarily limited to the described type. Some examples of prisms usable as the prism 10 in the viewing optical system according to the present invention will be described below with reference to FIGS. 10 to 18. The following description will be given on the basis of backward ray tracing.

Figure 10:
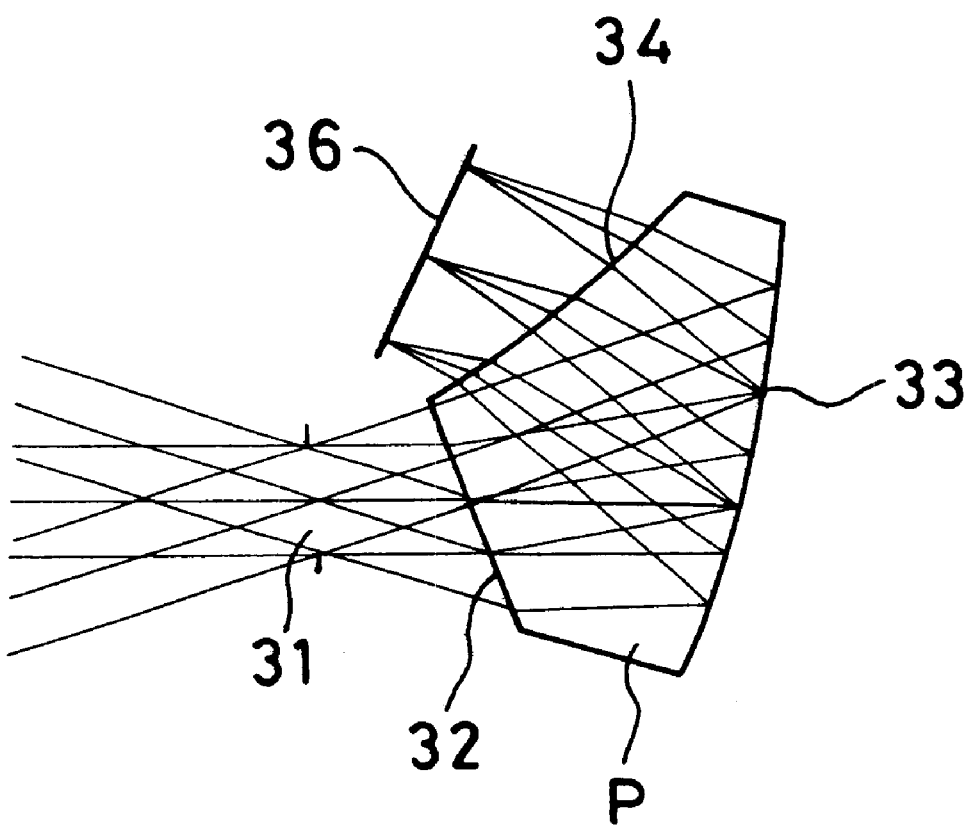
FIG. 10 is a diagram showing one example of decentered prisms applicable to the prism in the viewing optical system according to the present invention.

In the case of FIG. 10, a prism P has a first surface 32, a second surface 33, and a third surface 34. Incident light passing through a pupil 31 enters the prism P while being refracted through the first surface 32. The incident light is internally reflected by the second surface 33. The reflected light is refracted by the third surface 34 to form an image on an image plane 36.

Figure 11:
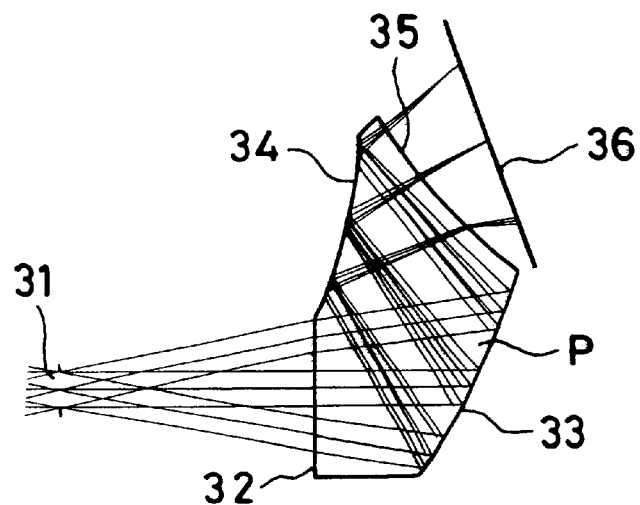
FIG. 11 is a diagram showing another example of decentered prisms applicable to the prism in the viewing optical system according to the present invention.

In the case of FIG. 11, a prism P has a first surface 32, a second surface 33, a third surface 34, and a fourth surface 35. Incident light passing through a pupil 31 enters the prism P while being refracted through the first surface 32. The incident light is internally reflected by the second surface 33 and further internally reflected by the third surface 34. The reflected light is refracted by the fourth surface 35 to form an image on an image plane 36.

Figure 12:
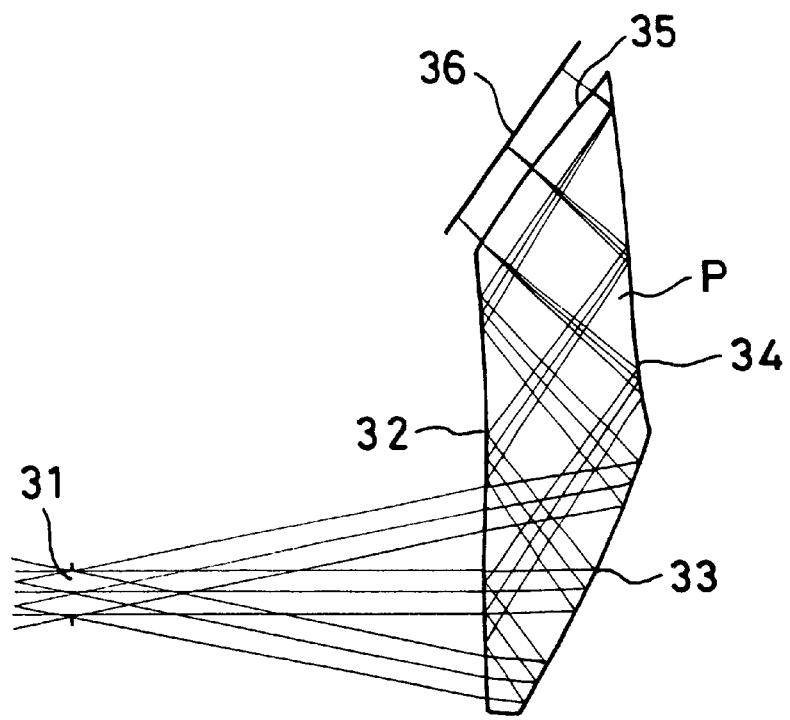
FIG. 12 is a diagram showing another example of decentered prisms applicable to the prism in the viewing optical system according to the present invention.

In the case of FIG. 12, a prism P has a first surface 32, a second surface 33, a third surface 34, and a fourth surface 35. Incident light passing through a pupil 31 enters the prism P while being refracted through the first surface 32. The incident light is internally reflected by the second surface 33 and then totally reflected by the first surface 32. The reflected light is internally reflected by the third surface 34 and then refracted by the fourth surface 35 to form an image on an image plane 36.

Figure 13:
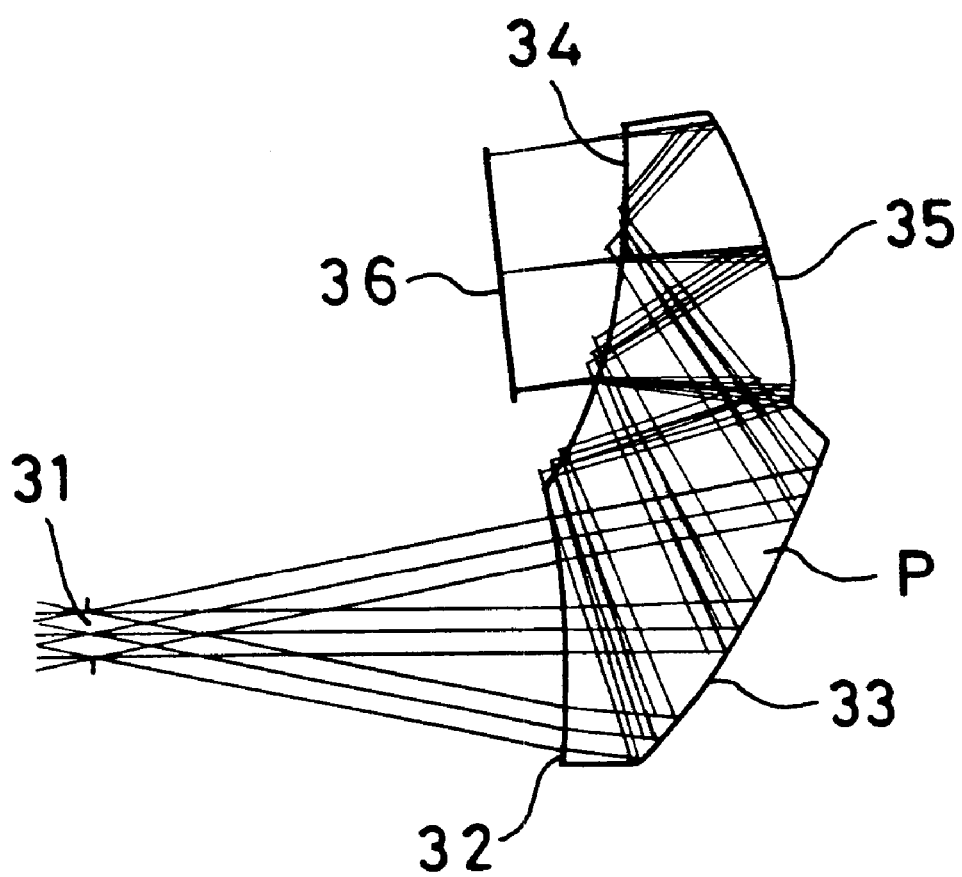
FIG. 13 is a diagram showing another example of decentered prisms applicable to the prism in the viewing optical system according to the present invention.

In the case of FIG. 13, a prism P has a first surface 32, a second surface 33, a third surface 34, and a fourth surface 35. Incident light passing through a pupil 31 enters the prism P while being refracted through the first surface 32. The incident light is internally reflected by the second surface 33 and then totally reflected by the third surface 34. The reflected light is internally reflected by the fourth surface 35 and then refracted by the third surface 34 to form an image on an image plane 36.

Figure 14:
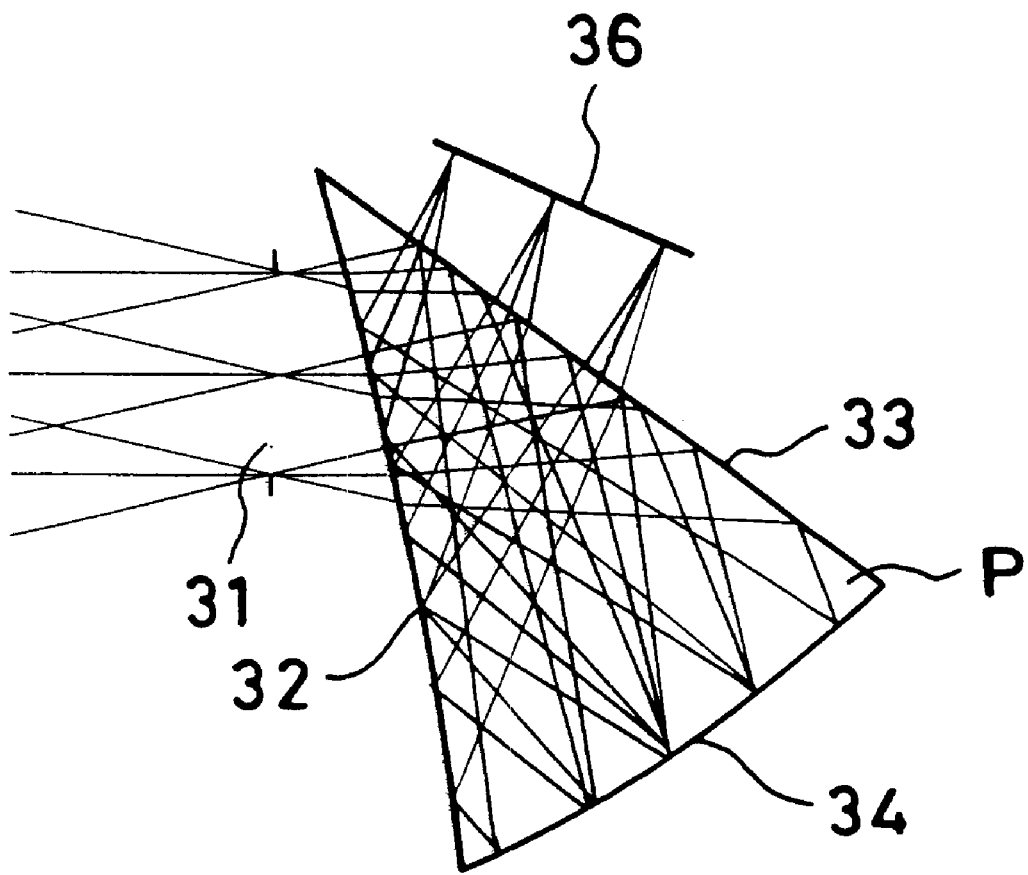
FIG. 14 is a diagram showing another example of decentered prisms applicable to the prism in the viewing optical system according to the present invention.

In the case of FIG. 14, a prism P has a first surface 32, a second surface 33, and a third surface 34. Incident light passing through a pupil 31 enters the prism P while being refracted through the first surface 32. The incident light is internally reflected by the second surface 33 and further internally reflected by the third surface 34. The reflected light is totally reflected by the first surface 32 and then refracted by the second surface 33 to form an image on an image plane 36.

Figure 15:
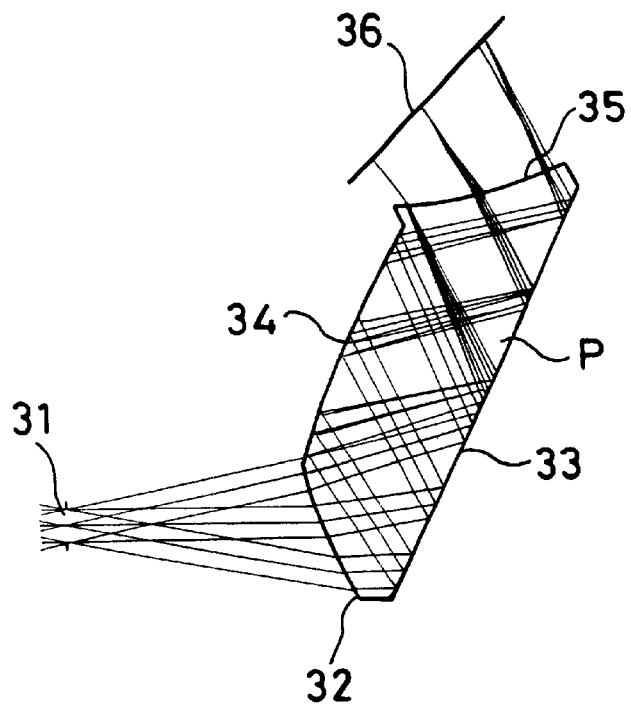
FIG. 15 is a diagram showing another example of decentered prisms applicable to the prism in the viewing optical system according to the present invention.

In the case of FIG. 15, a prism P has a first surface 32, a second surface 33, a third surface 34, and a fourth surface 35. Incident light passing through a pupil 31 enters the prism P while being refracted through the first surface 32. The incident light is internally reflected by the second surface 33 and further internally reflected by the third surface 34. The reflected light is further internally reflected by the second surface 33 and then refracted by the fourth surface 35 to form an image on an image plane 36.

Figure 16:
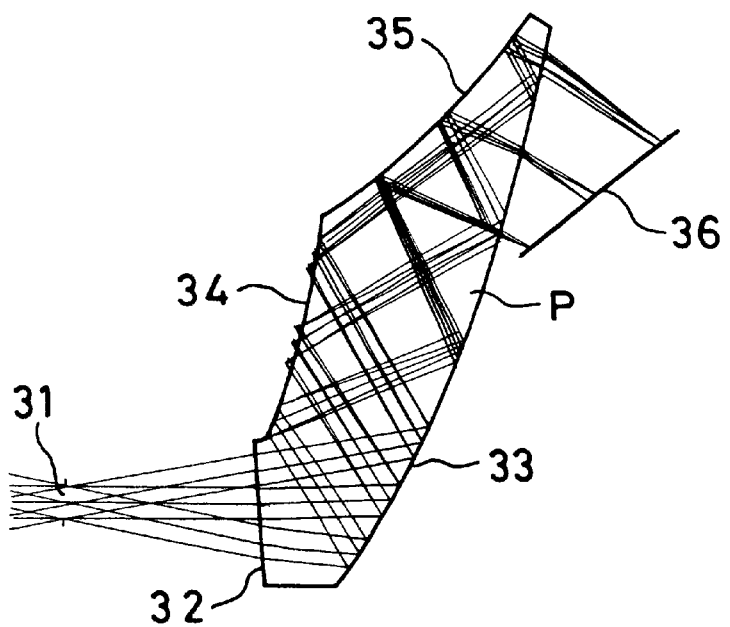
FIG. 16 is a diagram showing another example of decentered prisms applicable to the prism in the viewing optical system according to the present invention.

In the case of FIG. 16, a prism P has a first surface 32, a second surface 33, a third surface 34, and a fourth surface 35. Incident light passing through a pupil 31 enters the prism P while being refracted through the first surface 32. The incident light is internally reflected by the second surface 33 and further internally reflected by the third surface 34. The reflected light is further internally reflected by the second surface 33 and then internally reflected by the fourth surface 35. The reflected light is then refracted by the second surface 33 to form an image on an image plane 36.

Figure 17:
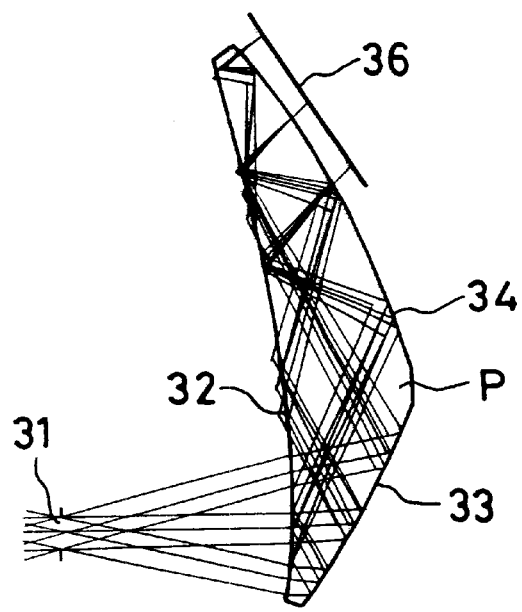
FIG. 17 is a diagram showing another example of decentered prisms applicable to the prism in the viewing optical system according to the present invention.

In the case of FIG. 17, a prism P has a first surface 32, a second surface 33, and a third surface 34. Incident light passing through a pupil 31 enters the prism P while being refracted through the first surface 32. The incident light is internally reflected by the second surface 33 and then totally reflected by the first surface 32. The reflected light is internally reflected by the third surface 34 and then totally reflected by the first surface 32. Then, the reflected light is refracted by the third surface 34 to form an image on an image plane 36.

Figure 18:
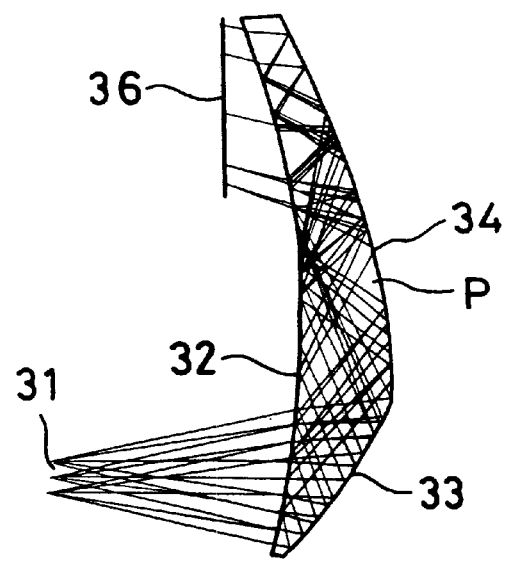
FIG. 18 is a diagram showing another example of decentered prisms applicable to the prism in the viewing optical system according to the present invention.
Figure 19:
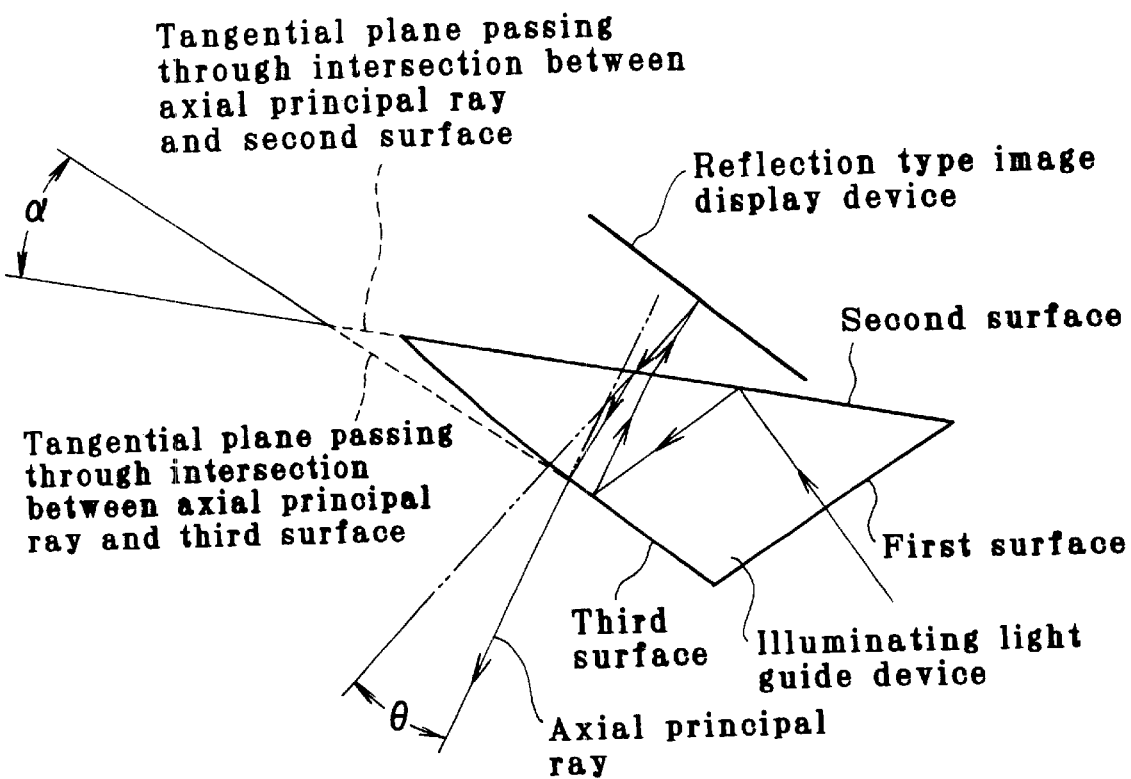
FIG. 19 is a ray path diagram showing an axial principal ray passing through an illuminating light guide optical device.

In the case of FIG. 18, a prism P has a first surface 32, a second surface 33, and a third surface 34. Incident light passing through a pupil 31 enters the prism P while being refracted through the first surface 32. The incident light is internally reflected by the second surface 33 and then totally reflected by the first surface 32. The reflected light is internally reflected by the third surface 34 and then totally reflected by the first surface 32. The reflected light is internally reflected by the third surface 34 and then refracted by the first surface 32 to form an image on an image plane 36.

Although the ocular optical systems 204 and 404 use prisms of the type which has three optical surfaces and in which there are two reflections, it is also possible to use different types of prisms as shown in FIGS. 36 to 42 and FIGS. 54 to 60. The see-through optical elements 205 and 405 are not necessarily limited to single optical elements but may be cemented optical elements or GRIN (gradient index) optical elements.

The following is a brief description of the ocular optical systems 204 and 404 shown in FIGS. 36 to 42 and FIGS. 54 to 60.

Figure 36:
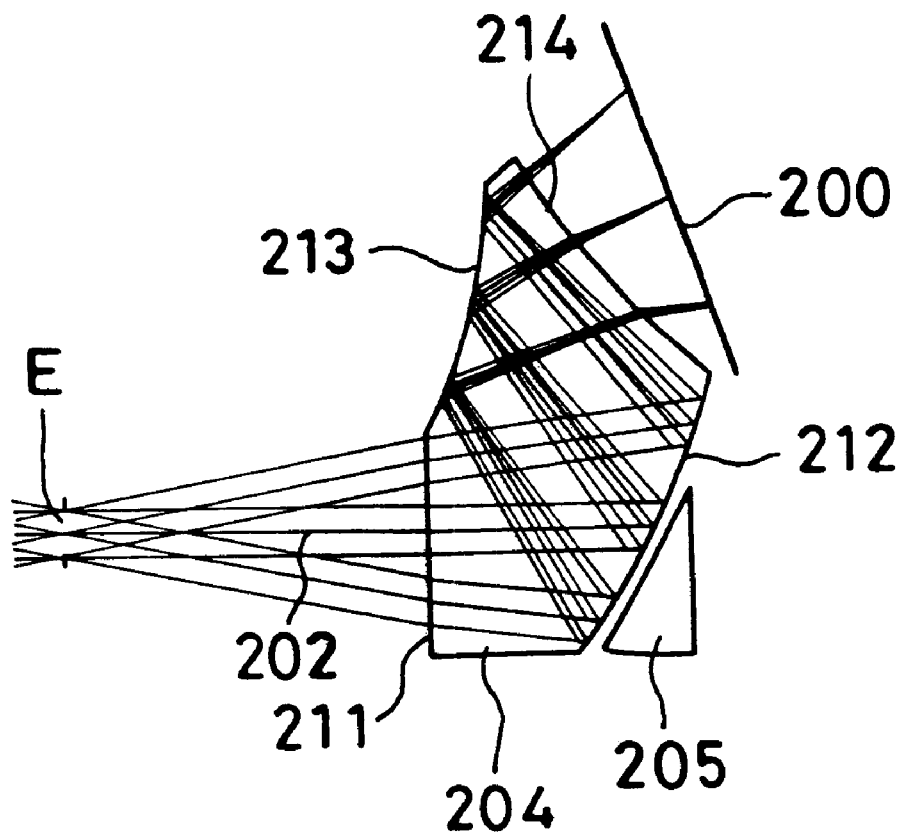
FIG. 36 is a diagram showing one example of decentered prisms applicable to an ocular optical system of the second viewing optical system according to the present invention.
Figure 54:
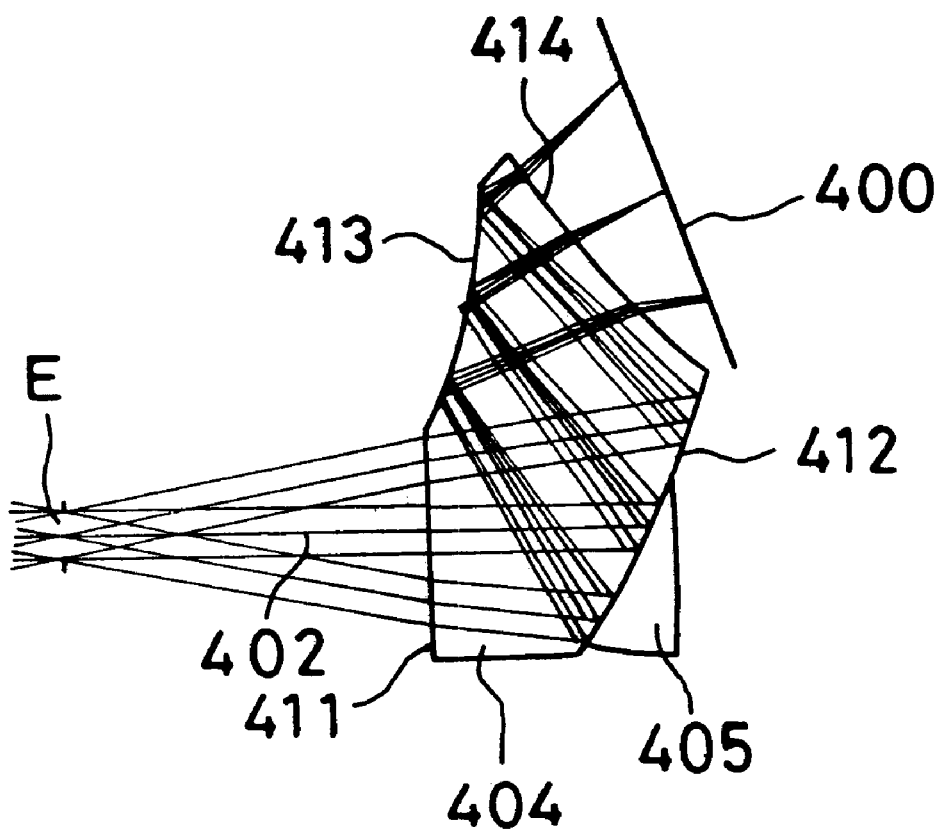
FIG. 54 is a diagram showing one example of decentered prisms applicable to ocular optical systems of the third and fourth viewing optical systems according to the present invention.

In the case of FIGS. 36 and 54, the ocular optical systems 204 and 404 each have a first surface 211 (411), a second surface 212 (412), a third surface 213 (413), and a fourth surface 214 (414). In the backward ray tracing, light passing through an exit pupil position E enters the prism while being refracted through the first surface 211 (411). The incident light is internally reflected by the second surface 212 (412) and further internally reflected by the third surface 213 (413). The reflected light is refracted by the fourth surface 214 (414) to form an image at the position of an LCD 200 (400). In the case of the ocular optical system 204, a see-through optical element 205 is disposed on the outside world image side of the second surface 212 at a distance from the second surface 212. In the case of the ocular optical system 404, a see-through optical element 405 is disposed on the outside world image side of the second surface 412 so as to be in close contact with the second surface 412.

Figure 37:
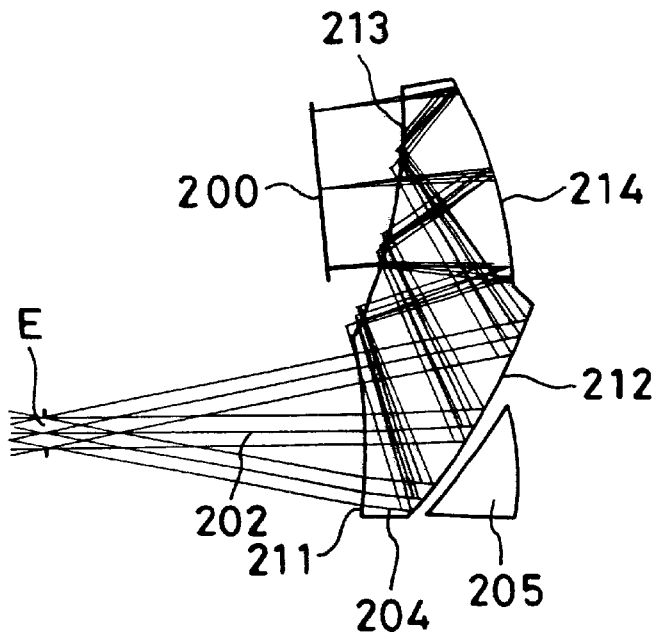
FIG. 37 is a diagram showing another example of decentered prisms applicable to the ocular optical system of the second viewing optical system according to the present invention.
Figure 55:
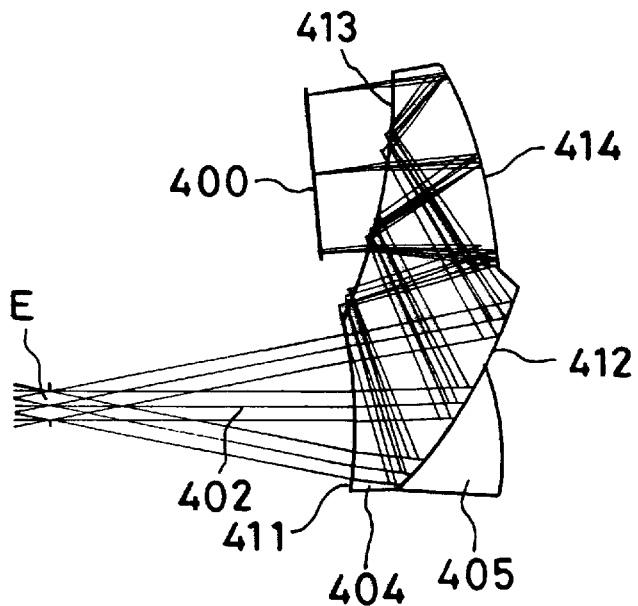
FIG. 55 is a diagram showing another example of decentered prisms applicable to the ocular optical systems of the third and fourth viewing optical systems according to the present invention.

In the case of FIGS. 37 and 55, the ocular optical systems 204 and 404 each have a first surface 211 (411), a second surface 212 (412), a third surface 213 (413), and a fourth surface 214 (414). In the backward ray tracing, light passing through an exit pupil position E enters the prism while being refracted through the first surface 211 (411). The incident light is internally reflected by the second surface 212 (412) and then totally reflected by the third surface 213 (413). The reflected light is internally reflected by the fourth surface 214 (414) and then refracted by the third surface 213 (413) to form an image at the position of an LCD 200 (400). In the case of the ocular optical system 204, a see-through optical element 205 is disposed on the outside world image side of the second surface 212 at a distance from the second surface 212. In the case of the ocular optical system 404, a see-through optical element 405 is disposed on the outside world image side of the second surface 412 so as to be in close contact with the second surface 412.

Figure 38:
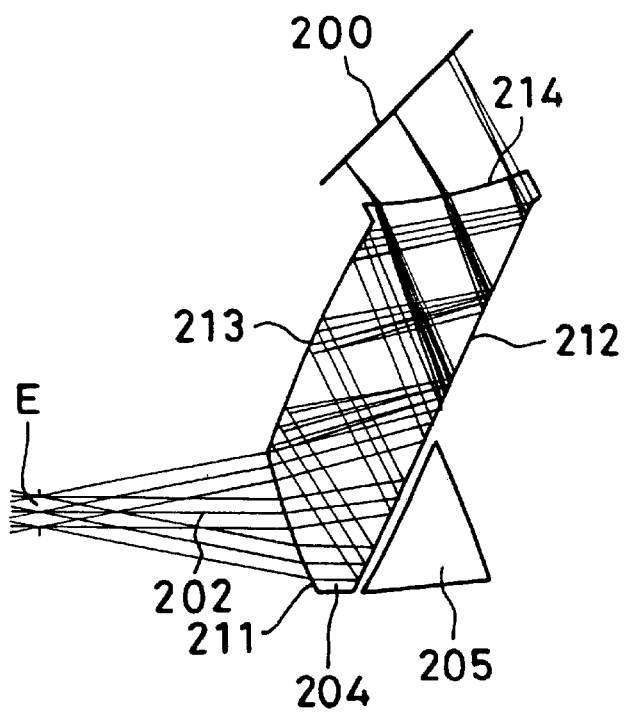
FIG. 38 is a diagram showing another example of decentered prisms applicable to the ocular optical system of the second viewing optical system according to the present invention.
Figure 56:
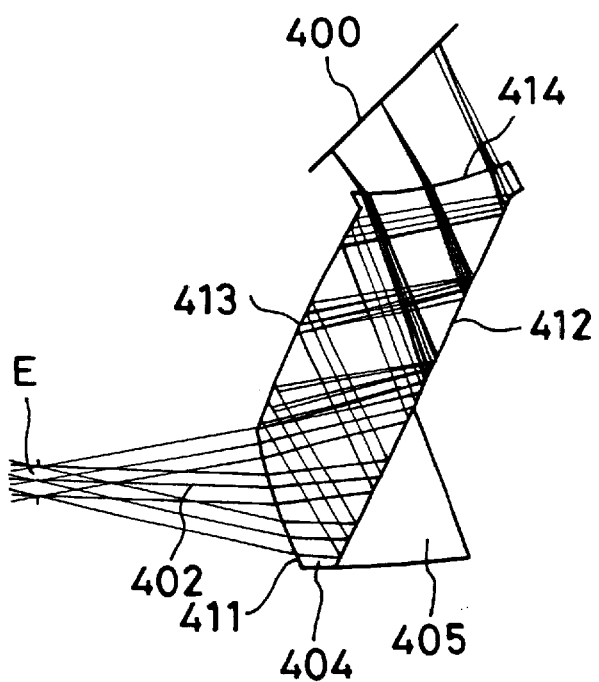
FIG. 56 is a diagram showing another example of decentered prisms applicable to the ocular optical systems of the third and fourth viewing optical systems according to the present invention.

In the case of FIGS. 38 and 56, the ocular optical systems 204 and 404 each have a first surface 211 (411), a second surface 212 (412), a third surface 213 (413), and a fourth surface 214 (414). In the backward ray tracing, light passing through an exit pupil position E enters the prism while being refracted through the first surface 211 (411). The incident light is internally reflected by the second surface 212 (412) and further internally reflected by the third surface 213 (413). The reflected light is internally reflected by the second surface 212 (412) and then refracted by the fourth surface 214 (414) to form an image at the position of an LCD 200 (400). In the case of the ocular optical system 204, a see-through optical element 205 is disposed on the outside world image side of the second surface 212 at a distance from the second surface 212. In the case of the ocular optical system 404, a see-through optical element 405 is disposed on the outside world image side of the second surface 412 so as to be in close contact with the second surface 412.

Figure 39:
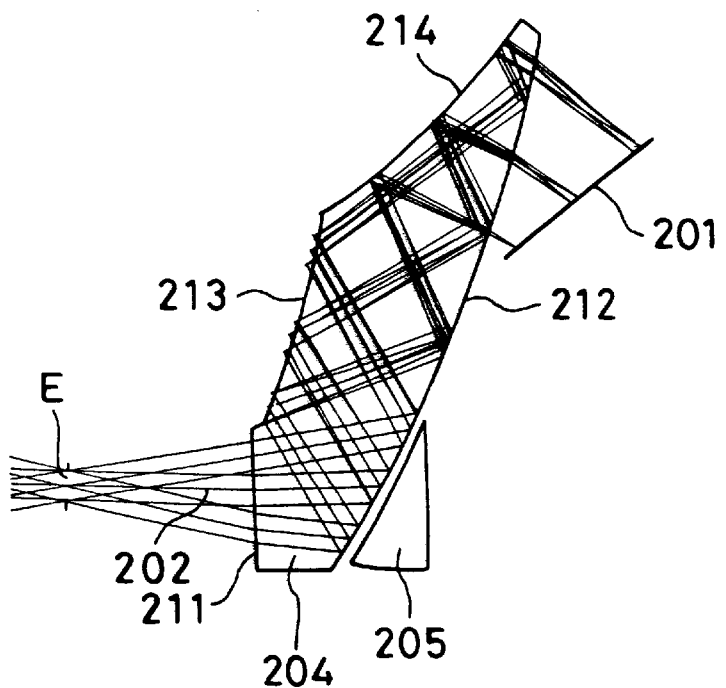
FIG. 39 is a diagram showing another example of decentered prisms applicable to the ocular optical system of the second viewing optical system according to the present invention.
Figure 57:
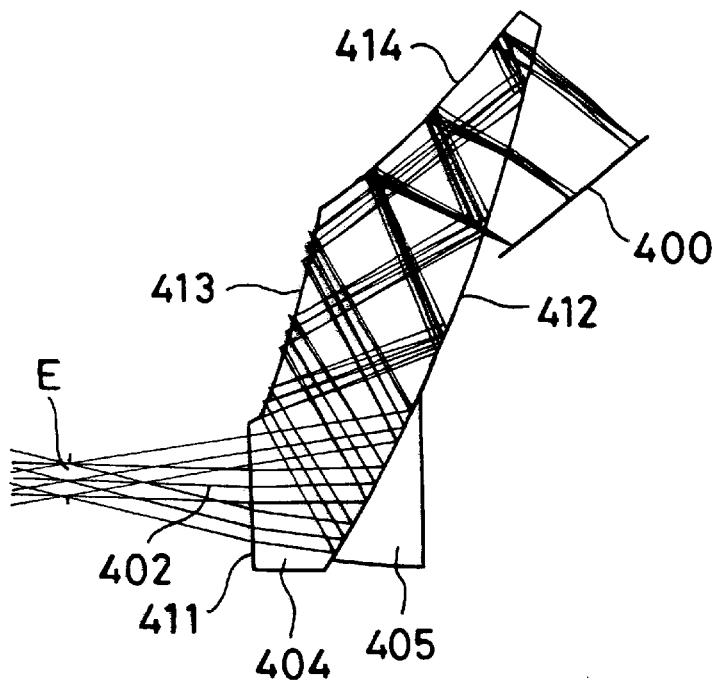
FIG. 57 is a diagram showing another example of decentered prisms applicable to the ocular optical systems of the third and fourth viewing optical systems according to the present invention.

In the case of FIGS. 39 and 57, the ocular optical systems 204 and 404 each have a first surface 211 (411), a second surface 212 (412), a third surface 213 (413), and a fourth surface 214 (414). In the backward ray tracing, light passing through an exit pupil position E enters the prism while being refracted through the first surface 211 (411). The incident light is internally reflected by the second surface 212 (412) and further internally reflected by the third surface 213 (413). The reflected light is internally reflected by the second surface 212 (412) again and further reflected by the fourth surface 214 (414). The reflected light is refracted by the second surface 212 (412) to form an image at the position of an LCD 200 (400). In the case of the ocular optical system 204, a see-through optical element 205 is disposed on the outside world image side of the second surface 212 at a distance from the second surface 212. In the case of the ocular optical system 404, a see-through optical element 405 is disposed on the outside world image side of the second surface 412 so as to be in close contact with the second surface 412.

Figure 40:
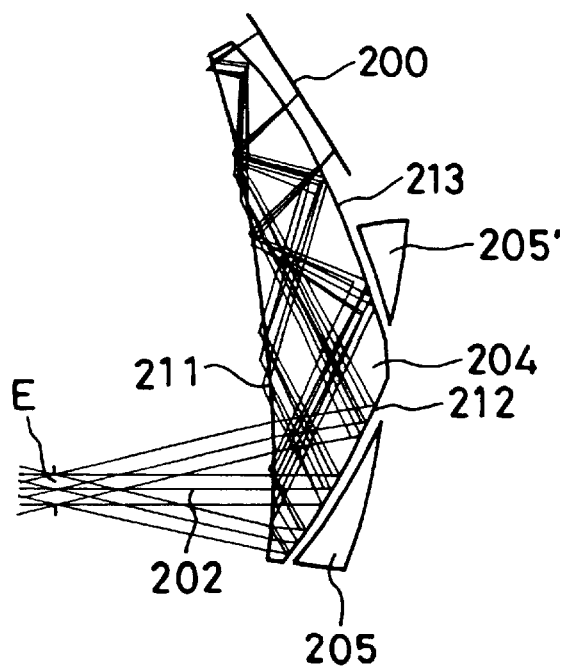
FIG. 40 is a diagram showing another example of decentered prisms applicable to the ocular optical system of the second viewing optical system according to the present invention.
Figure 58:
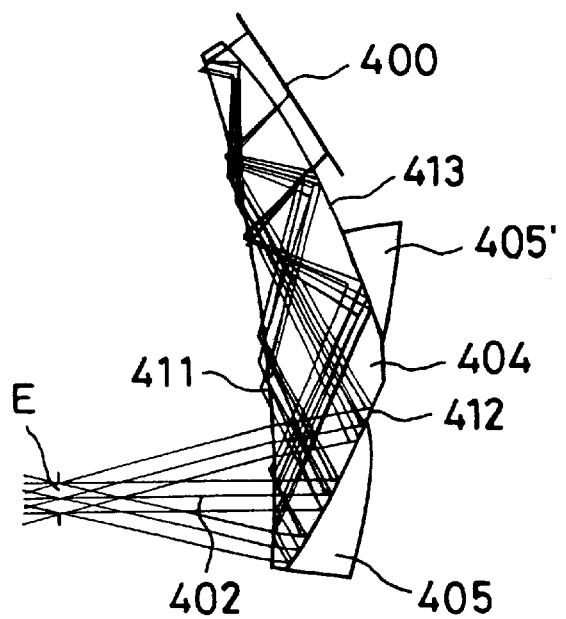
FIG. 58 is a diagram showing another example of decentered prisms applicable to the ocular optical systems of the third and fourth viewing optical systems according to the present invention.

In the case of FIGS. 40 and 58, the ocular optical systems 204 and 404 each have a first surface 211 (411), a second surface 212 (412), and a third surface 213 (413). In the backward ray tracing, light passing through an exit pupil position E enters the prism while being refracted through the first surface 211 (411). The incident light is internally reflected by the second surface 212 (412) and then totally reflected by the first surface 211 (411). The reflected light is internally reflected by the third surface 213 (413) and then totally reflected by the first surface 211 (411) again. The reflected light is refracted by the third surface 213 (413) to form an image at the position of an LCD 200 (400). In the case of the ocular optical system 204, a see-through optical element 205 is disposed on the outside world image side of the second surface 212 at a distance from the second surface 212. In the case of the ocular optical system 404, a see-through optical element 405 is disposed on the outside world image side of the second surface 412 so as to be in close contact with the second surface 412. In the case of the ocular optical system 204, in place of or in addition to the see-through optical element 205, another see-through optical element 205' may be placed on the outside world image side of the third surface 213 at a distance from the third surface 213. In the case of the ocular optical system 404, in place of or in addition to the see-through optical element 405, another see-through optical element 405' may be placed on the outside world image side of the third surface 413 so as to be in close contact with the third surface 413.

Figure 41:
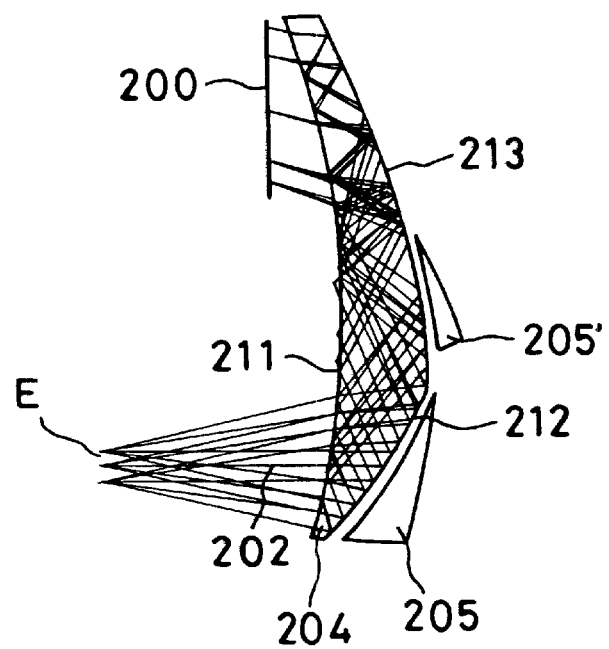
FIG. 41 is a diagram showing another example of decentered prisms applicable to the ocular optical system of the second viewing optical system according to the present invention.
Figure 59:
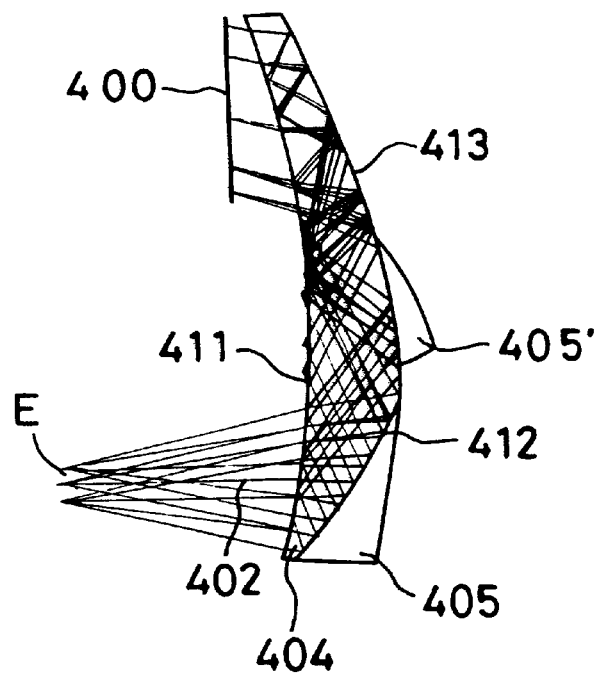
FIG. 59 is a diagram showing another example of decentered prisms applicable to the ocular optical systems of the third and fourth viewing optical systems according to the present invention.

In the case of FIGS. 41 and 59, the ocular optical systems 204 and 404 each have a first surface 211 (411), a second surface 212 (412), and a third surface 213 (413). In the backward ray tracing, light passing through an exit pupil position E enters the prism while being refracted through the first surface 211 (411). The incident light is internally reflected by the second surface 212 (412) and then totally reflected by the first surface 211 (411). The reflected light is internally reflected by the third surface 213 (413) and then totally reflected by the first surface 211 (411) again. The reflected light is internally reflected by the third surface 213 (413) again and then refracted by the first surface 211 (411)

to form an image at the position of an LCD 200 (400). In the case of the ocular optical system 204, a see-through optical element 205 is disposed on the outside world image side of the second surface 212 at a distance from the second surface 212. In the case of the ocular optical system 404, a see-through optical element 405 is disposed on the outside world image side of the second surface 412 so as to be in close contact with the second surface 412. In the case of the ocular optical system 204, in place of or in addition to the see-through optical element 205, another see-through optical element 205' may be placed on the outside world image side of the third surface 213 at a distance from the third surface 213. In the case of the ocular optical system 404, in place of or in addition to the see-through optical element 405, another see-through optical element 405' may be placed on the outside world image side of the third surface 413 so as to be in close contact with the third surface 413.

Figure 42:
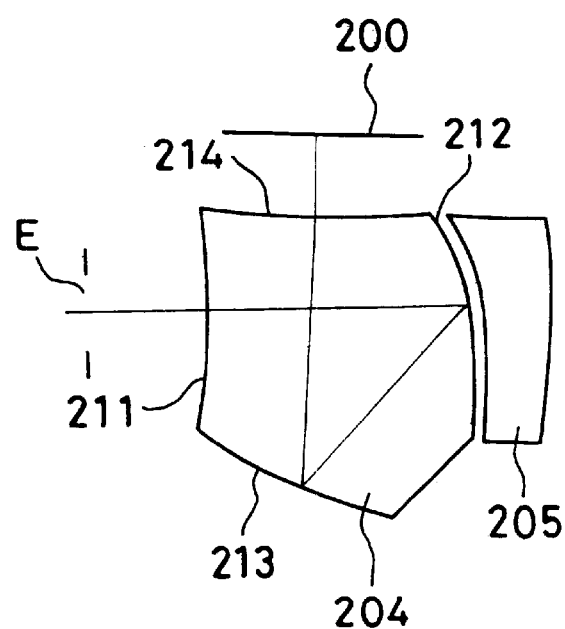
FIG. 42 is a diagram showing another example of decentered prisms applicable to the ocular optical system of the second viewing optical system according to the present invention.
Figure 60:
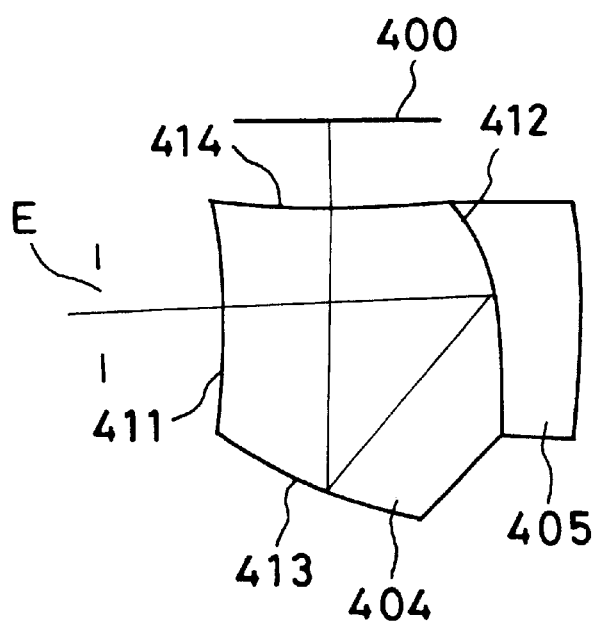
FIG. 60 is a diagram showing another example of decentered prisms applicable to the ocular optical systems of the third and fourth viewing optical systems according to the present invention.

In the case of FIGS. 42 and 60, the ocular optical systems 204 and 404 each have a first surface 211 (411), a second surface 212 (412), a third surface 213 (413), and a fourth surface 214 (414). In the backward ray tracing, light passing through an exit pupil position E enters the prism while being refracted through the first surface 211 (411). The incident light is internally reflected by the second surface 212 (412) and further reflected by the third surface 213 (413). The reflected light is refracted by the fourth surface 214 (414) to form an image at the position of an LCD 200 (400). In the case of the ocular optical system 204, a see-through optical element 205 is disposed on the outside world image side of the second surface 212 at a distance from the second surface 212. In the case of the ocular optical system 404, a see-through optical element 405 is disposed on the outside world image side of the second surface 412 so as to be in close contact with the second surface 412.

The above-described viewing optical system according to the present invention can be used as an optical system of a head-mounted image display apparatus, for example. Examples of such image display apparatus will be described below.

Figure 20:
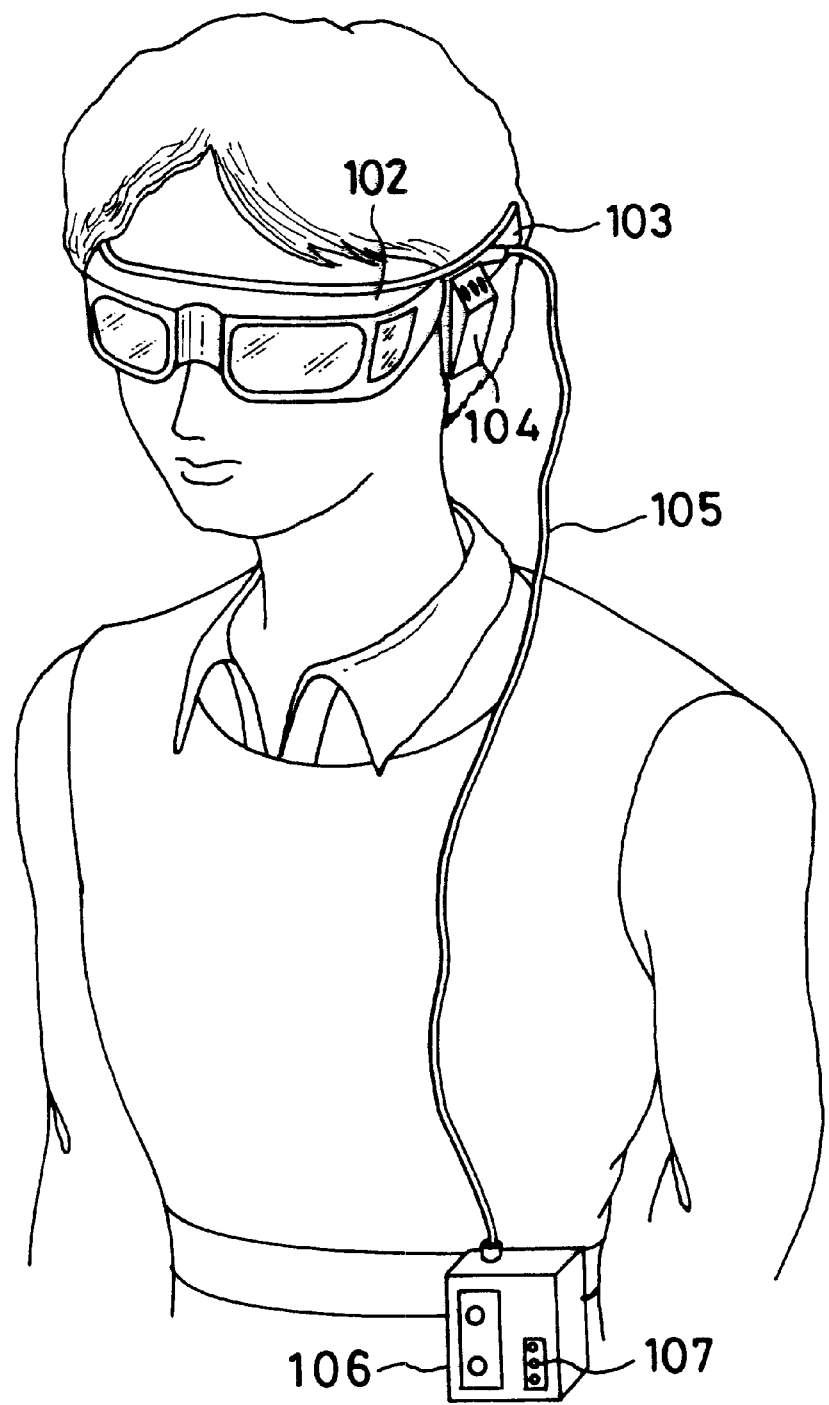
FIG. 20 is a diagram showing a head-mounted image display apparatus for both eyes using the viewing optical system according to the present invention in a state where it is fitted on an observer's head.
Figure 21:
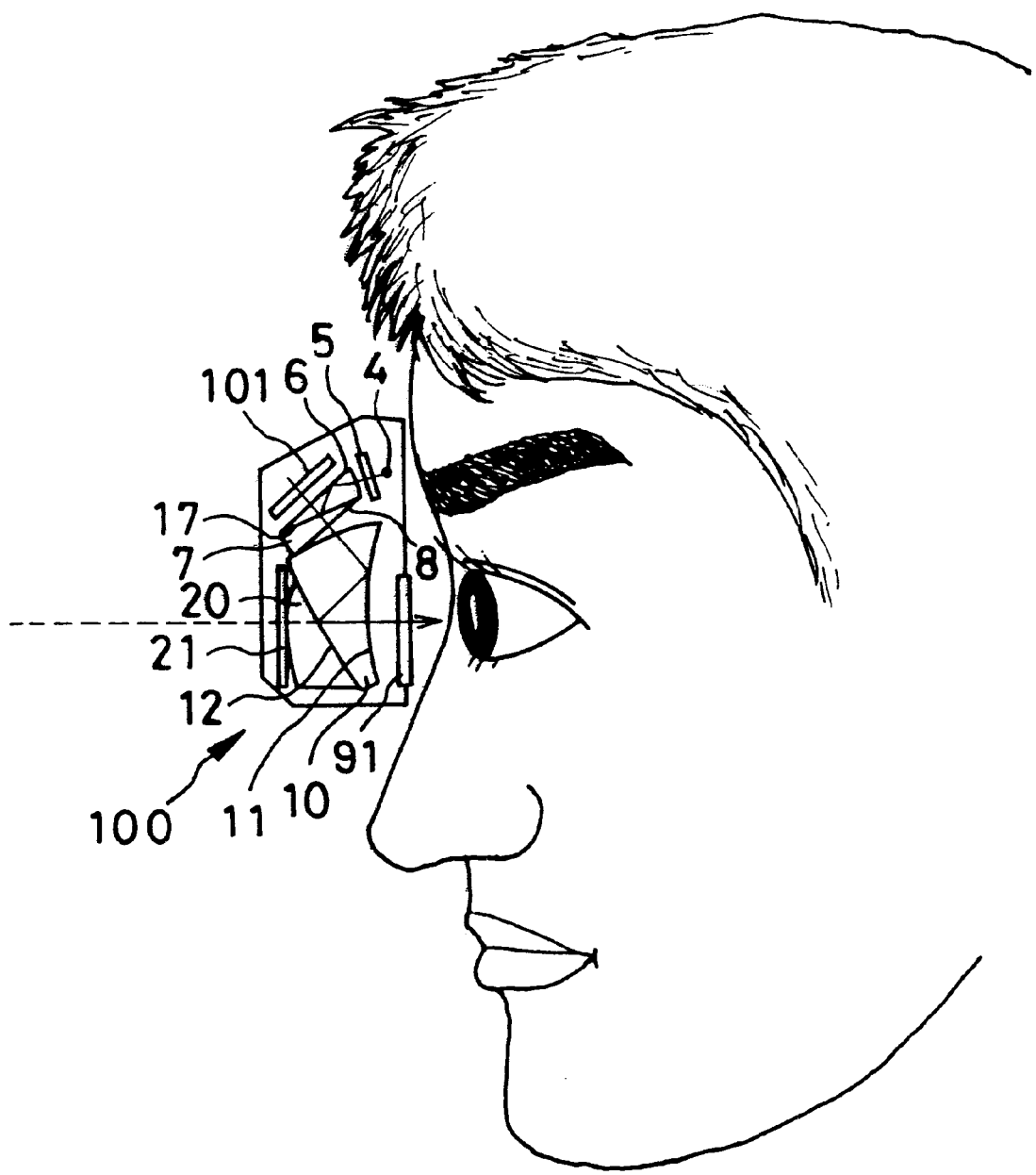
FIG. 21 is a sectional view of the head-mounted image display apparatus shown in FIG. 20.

FIG. 20 shows a head-mounted image display apparatus arranged for two eyes in a state where the image display apparatus is fitted on an observer's head. FIG. 21 is a sectional view of the image display apparatus. As shown in FIG. 21, the first viewing optical system according to the present invention is used as an ocular optical system 100 of the image display apparatus. A pair of combinations of an ocular optical system 100 and a reflection type image display device 101 are prepared for the left and right eyes and supported apart from each other by the interpupillary distance, i.e. the distance between the two eyes, thereby forming a stationary or portable image display apparatus 102, such as a head-mounted image display apparatus, which enables the observer to see with both eyes.

More specifically, the display apparatus body unit 102 is equipped with a pair of ocular optical systems 100 (left and right). The above-described viewing optical system is used as each ocular optical system 100. Reflection type image display devices 101, which are reflection type liquid-crystal display devices, are disposed in the respective image planes of the two ocular optical systems 100. As shown in FIG. 20, the display apparatus body unit 102 is provided with temporal frames 103 that are contiguous with the left and right ends thereof so that the display apparatus body unit 102 can be held in front of the observer's eyes. As shown in FIG. 21, to protect the first surface 11 (see FIG. 1) of the prism 10 in the ocular optical system 100 of each image display apparatus 102, a cover member 91 is placed between the exit pupil of the ocular optical system 100 and the first surface 11. As the cover member 91, any of a plane-parallel plate, a positive lens and a negative lens can be used.

Further, a speaker 104 is provided on each temporal frame 103 to enable the user to enjoy listening to stereophonic sound in addition to image observation. The display apparatus body unit 102 having the speakers 104 is connected with a replaying unit 106, e.g. a portable video cassette unit, through an image and sound transmitting cord 105. Therefore, the user can enjoy not only observing an image but also listening to sound with the replaying unit 106 retained on a desired position, e.g. a belt, as illustrated in FIG. 20. Reference numeral 107 in FIG. 20 denotes a switch and volume control part of the replaying unit 106. It should be noted that the display apparatus body unit 102 contains electronic parts such as image and sound processing circuits.

The cord 105 may have a jack and plug arrangement attached to the distal end thereof so that the cord 105 can be detachably connected to an existing video deck. The cord 105 may also be connected to a TV signal receiving tuner so as to enable the user to enjoy watching TV. Alternatively, the cord 105 may be connected to a computer to receive computer graphic images or message images or the like from the computer. To eliminate the bothersome cord, the image display apparatus may be arranged to receive external radio signals through an antenna connected thereto.

Figure 22:
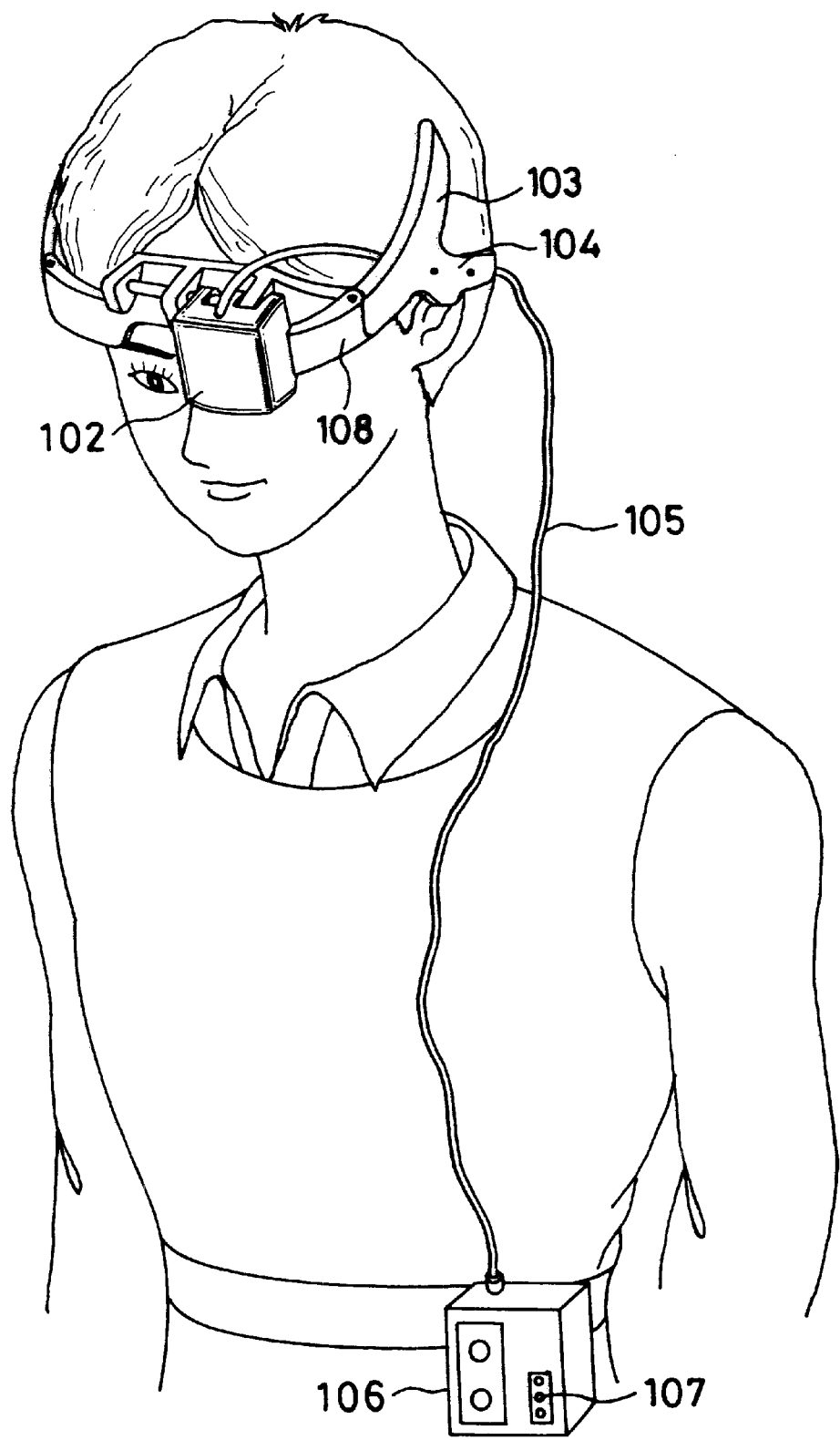
FIG. 22 is a diagram showing a head-mounted image display apparatus for a single eye using the viewing optical system according to the present invention in a state where it is fitted on an observer's head.
Figure 23:
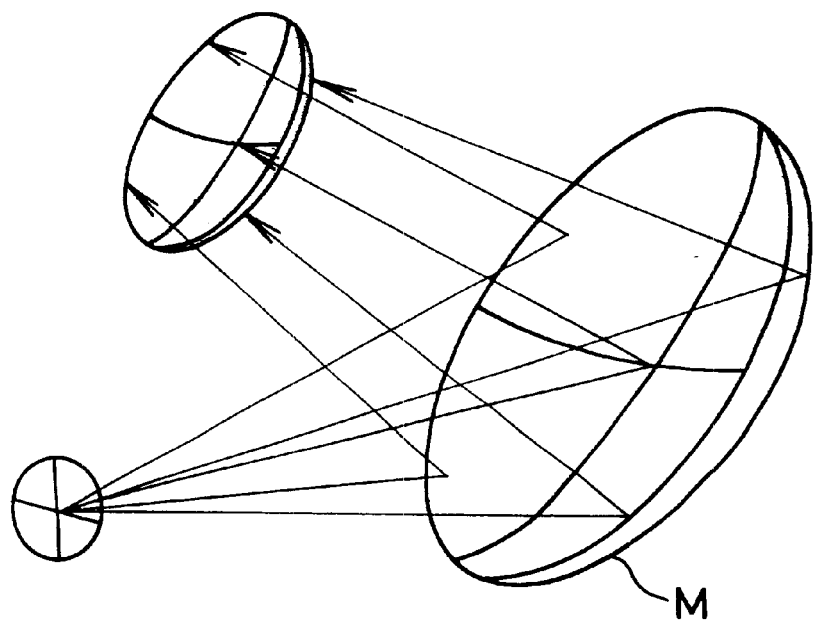
FIG. 23 is a conceptual view for describing curvature of field produced by a decentered reflecting surface.
Figure 24:
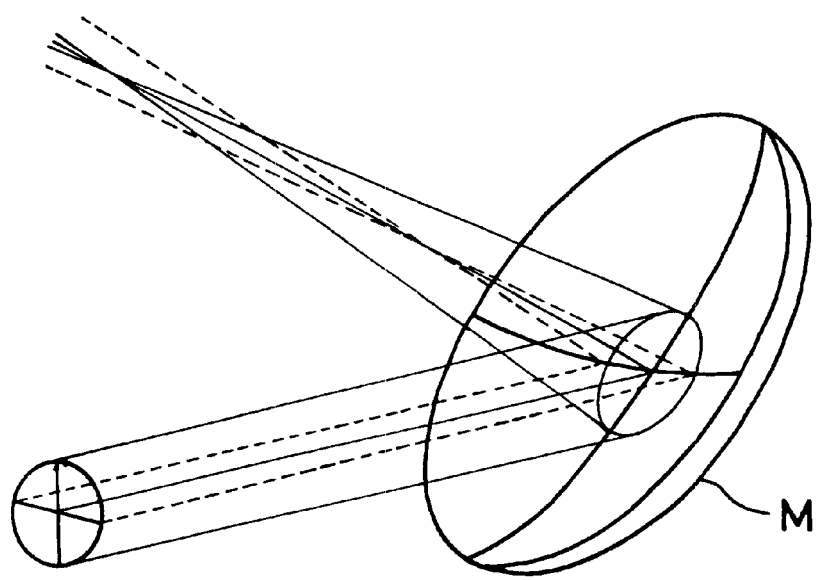
FIG. 24 is a conceptual view for describing astigmatism produced by a decentered reflecting surface.
Figure 25:
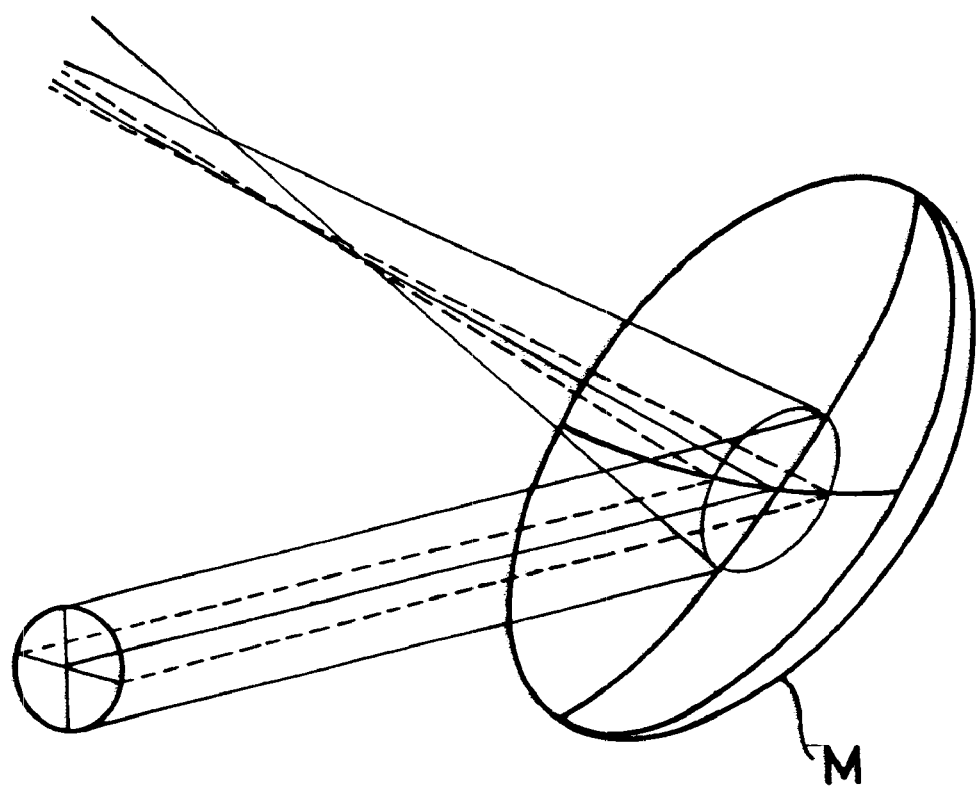
FIG. 25 is a conceptual view for describing coma produced by a decentered reflecting surface.

The viewing optical system according to the present invention may also be used in a head-mounted image display apparatus for a single eye by placing the ocular optical system in front of either of the left and right eyes. FIG. 22 shows the head-mounted image display apparatus for a single eye in a state where it is fitted on an observer's head (in this case, the apparatus is fitted for the left eye). In the illustrated arrangement, a display apparatus body unit 102 includes a single combination of an ocular optical system 100 and a reflection type image display device 101. The display apparatus body unit 102 is mounted on a front frame 108 so as to lie in front of the associated eye of the observer. As shown in FIG. 22, the front frame 108 is provided with temporal frames 103 that are contiguous with the left and right ends thereof so that the display apparatus body unit 102 can be held in front of one eye of the observer. The arrangement of the rest of the apparatus is the same as in the case of FIG. 20. Therefore, a description thereof is omitted.

Incidentally, to allow the outside world image and the displayed image to be viewed simultaneously or selectively in the above-described head-mounted image display apparatus for both eyes or a single eye using the viewing optical system according to the present invention, it is desirable that, as shown in FIG. 21, a semi-transparent reflecting surface should be used as the reflecting surface 12, which faces the exit pupil, of the decentered prism 10 constituting the ocular optical system 100, and another decentered prism 20 for compensating for an angle of deviation or power produced by the decentered prism 10 should be placed in contact with or at a slight distance from the semitransparent reflecting surface 12, thereby allowing the outside world to be viewed through the two decentered prisms 10 and 20. In this case, it is desirable that a shutter 21 such as a liquid crystal shutter that selectively cuts off or passes outside world light shown by the dashed line should be placed on the entrance side of the decentered prism 20 (i.e. on the side of the prism 20 remote from the observer's eye). In this case, when the shutter 21 is opened, the outside world image can be viewed (in a see-through manner), or a superimposed image of the outside world image and the displayed image can be viewed. When the shutter 21 is closed, the displayed image of the display device 101 can be viewed.

Figure 43:
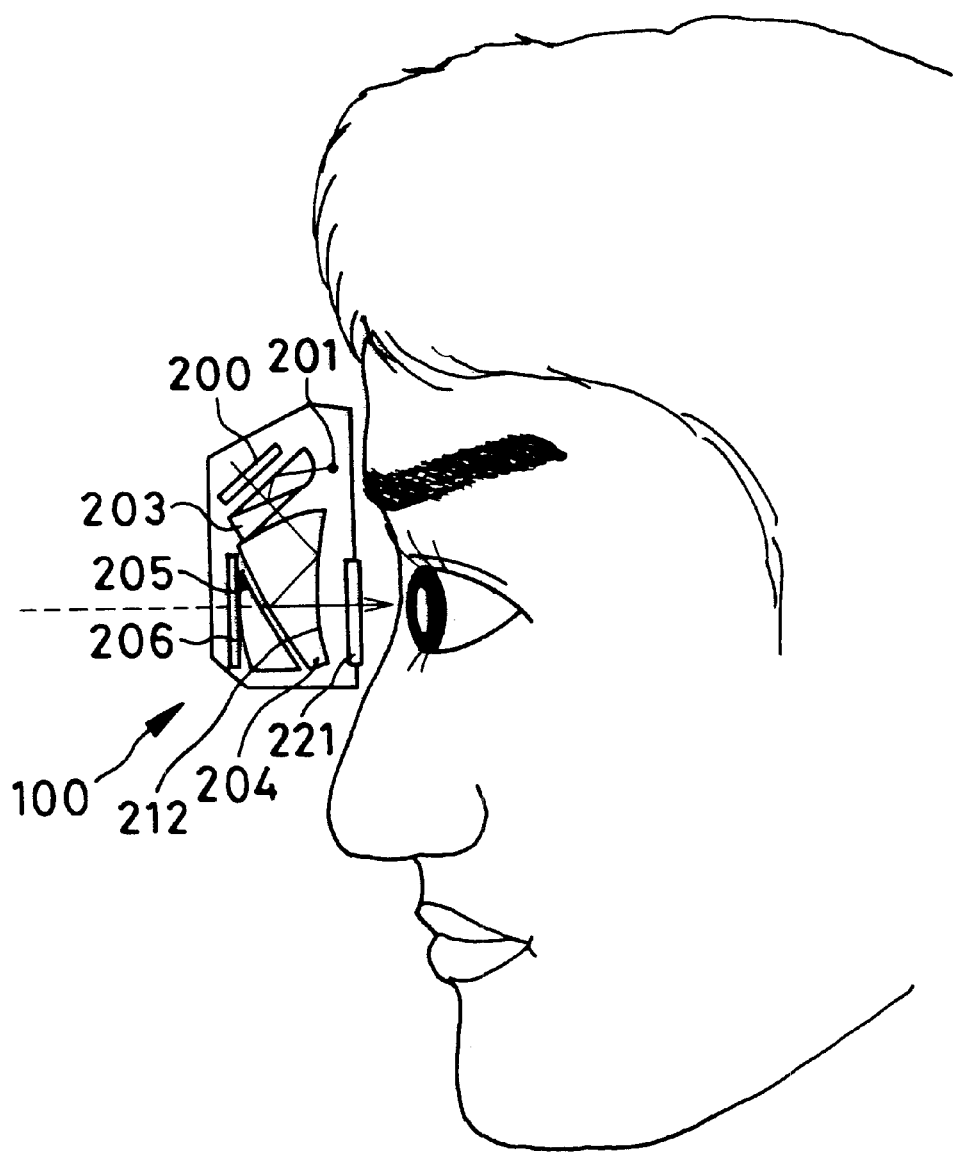
FIG. 43 is a sectional view of an image display apparatus using the second viewing optical system according to the present invention.

FIG. 43 is a sectional view similar to FIG. 21. In FIG. 43, a viewing optical system arranged in the form of the second viewing optical system of the present invention as shown for example in FIG. 31 is used as an ocular optical system 100. In this case, a display apparatus body unit 100 comprising a single combination of the viewing optical system and a reflection type image display device 200 is mounted on the front frame 108 so as to lie in front of the associated eye (the left eye in this case), as shown in FIG. 22, thereby forming a stationary or portable image display apparatus, such as a head-mounted image display apparatus, which enables the observer to see with a single eye.

More specifically, the display apparatus body unit 100 uses the above-described viewing optical system, and a reflection type image display device 200, which is a reflection type liquid-crystal display device, is disposed in the image plane of the viewing optical system. In this case, to protect the first surface 212 of the ocular optical system 204 constituting the viewing optical system of the image display apparatus 100, a cover member 221 is placed between the exit pupil of the ocular optical system 204 and the first surface 212. As the cover member 221, any of a plane-parallel plate, a positive lens and a negative lens can be used.

Figure 61:
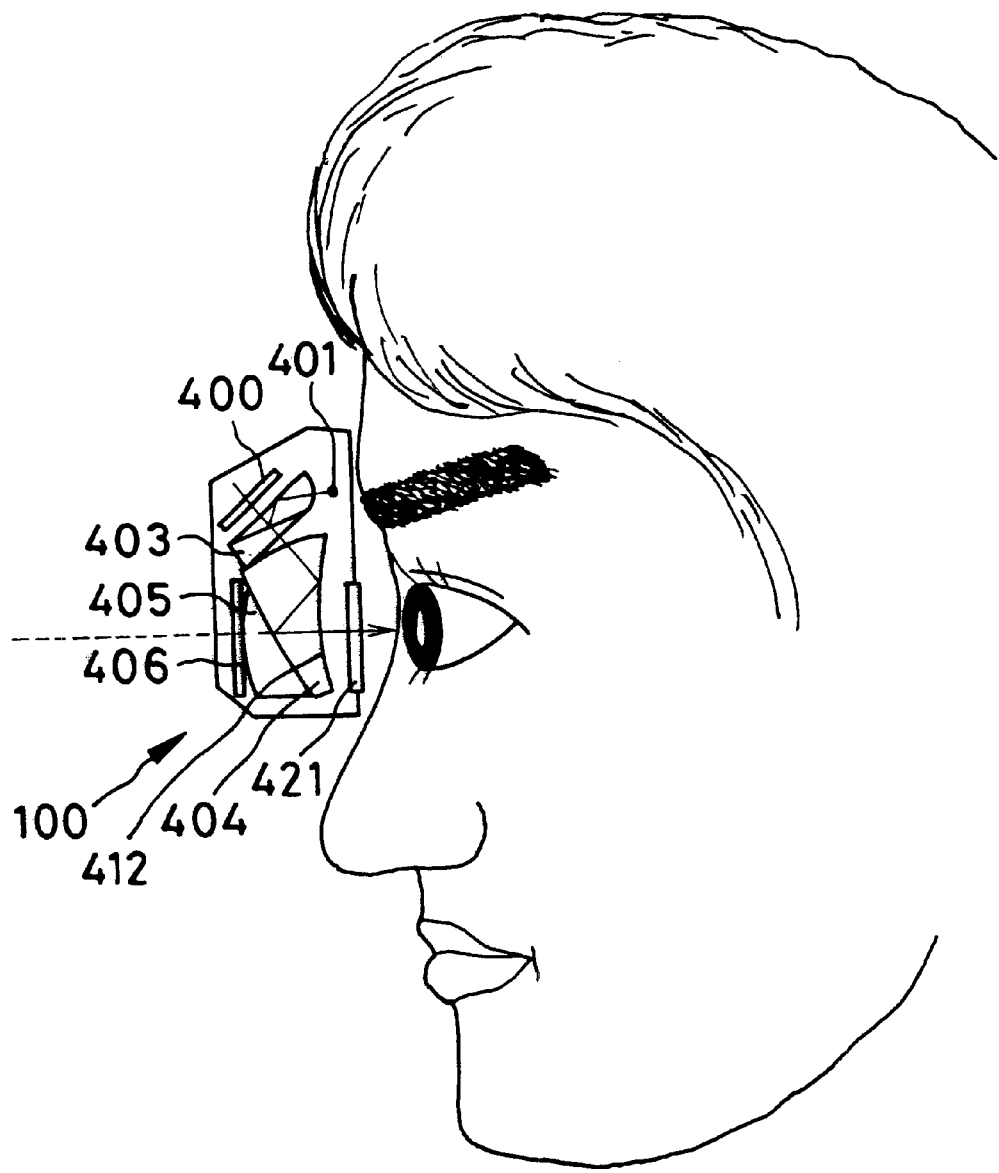
FIG. 61 is a sectional view of an image display apparatus using the third or fourth viewing optical system according to the present invention.

FIG. 61 is a sectional view similar to FIG. 21. In FIG. 61, a viewing optical system arranged in the form of the third or fourth viewing optical system of the present invention as shown for example in FIG. 49 is used as an ocular optical system 100. In this case, a display apparatus body unit 100 comprising a single combination of the viewing optical system and a reflection type image display device 400 is mounted on the front frame 108 so as to lie in front of the associated eye (the left eye in this case), as shown in FIG. 22, thereby forming a stationary or portable image display apparatus, such as a head-mounted image display apparatus, which enables the observer to see with a single eye.

More specifically, the display apparatus body unit 100 uses the above-described viewing optical system, and a reflection type image display device 400, which is a reflection type liquid-crystal display device, is disposed in the image plane of the viewing optical system. In this case, to protect the first surface 412 of the ocular optical system 404 constituting the viewing optical system of the image display apparatus 100, a cover member 421 is placed between the exit pupil of the ocular optical system 404 and the first surface 412. As the cover member 421, any of a plane-parallel plate, a positive lens and a negative lens can be used.

The second to fourth viewing optical systems according to the present invention may also be used in a head-mounted image display apparatus arranged for two eyes. The way in which the image display apparatus for two eyes is fitted on an observer's head is the same as that shown in FIG. 20. A pair of image display apparatuses 100 each comprising a combination of a viewing optical system and a reflection type image display device 200 (400) as shown in FIG. 43 (61) are prepared for the left and right eyes and supported apart from each other by the interpupillary distance, i.e. the distance between the two eyes, thereby forming a stationary or portable image display apparatus, such as a head-mounted image display apparatus, which enables the observer to see with both eyes. The arrangement of the rest of the apparatus is the same as that of the apparatus for a single eye. Therefore, a description thereof is omitted.

As will be clear from the foregoing description, it is possible according to the present invention to provide a compact, bright and high-performance viewing optical system using an ocular optical system, which is formed from a decentered prism, and a reflection type image display device, and also provide an image display apparatus using the viewing optical system.

In addition, a see-through optical system is formed from a see-through optical element and an ocular optical system, which constitute the viewing optical system, so that the optical power P of the see-through optical system is approximately zero and the angular magnification $\beta$ is approximately 1. Consequently, the image viewed through the see-through optical system appears to be the same as the image seen with the naked eye. Accordingly, the image seen with the naked eye and the image viewed through the see-through optical system are readily fused into a single image. For example, when a head-mounted image display apparatus designed for a single eye is used, it is easy to view the outside world image with both eyes.

When the optical power P of the see-through optical system, which is formed from the see-through optical element and the ocular optical system, is approximately zero as stated above, the outside world image viewed through the see-through optical system and the outside world image viewed with the naked eye are seen at the same position. Therefore, it becomes easy to see the see-through image. Consequently, when a head-mounted image display apparatus designed for a single eye is used, for example, it is easy to view the outside world image, particularly the axial portion of the outside world image, with both eyes. When the angular magnification $\beta$ of the see-through optical system, which is formed from the see-through optical element and the ocular optical system, is approximately 1, the outside world image viewed through the see-through optical system and the outside world image seen with the naked eye are of the same magnification. Therefore, when a head-mounted image display apparatus designed for a single eye is used, for example, it is easy to fuse two images seen with the right and left eyes.

What we claim is:

1. A viewing optical system comprising:

reflection type image display constructed and arranged to display an image by reflecting an illuminating light beam incident from a front side of a display surface for forming an image for observation; and an ocular optical system for leading said image to a pupil position where an observer's eyeball is to be placed, wherein said image display comprises:

an illuminator; and an illuminating light guide optical system constructed and arranged to guide a light beam emitted from said illuminator so that said light beam can be applied to said display surface from a front side thereof; and wherein said ocular optical system includes a prism member, said prism member comprising:

an entrance surface through which a display light beam reflected from said reflection type image display enters said prism member after passing through said illuminating light guide optical system;

at least one reflecting surface reflecting the light beam in said prism member; and an exit surface through which the light beam exits from said prism member, wherein said at least one reflecting surface of said prism member is decentered with respect to an optical axis and has a rotationally asymmetric curved surface configuration that corrects decentration aberrations due to decentration of said at least one reflecting surface and gives a power to the light beam, and wherein a spacing between the entrance surface of said prism member and the display surface of said reflection type image display satisfies the following condition to lead said image to said pupil position:

$$0.6 < L/H < 3.1$$

where L is a distance between an image center position where the display surface of said reflection type image display intersects the optical axis and a position where the entrance surface of said prism member intersects the optical axis, and H is an image height of said reflection type image display which is a diagonal length in a case where the display surface is quadrangular.

2. A viewing optical system according to claim 1, wherein said reflection type image display is a reflection type liquid crystal display device.

3. A viewing optical system according to claim 1 or 2, wherein a diffractive optical element is provided on an entrance surface side of said prism member.

4. A viewing optical system according to claim 1, wherein said prism member has at least one surface serving as both a refracting surface and a reflecting surface.

5. A viewing optical system according to claim 4, wherein said prism member comprises:

an entrance surface through which the display light beam reflected from said reflection type image display enters said prism member after passing through said illuminating light guide optical system;

a first reflecting surface that reflects the light beam entering through said entrance surface;

a second reflecting surface that reflects the light beam reflected from said first reflection surface; and an exit surface through which the light beam reflected from said second reflecting surface exits from said prism member, wherein said first reflecting surface and said exit surface are formed from a single surface serving as both a refracting surface and a reflecting surface.

6. A viewing optical system according to claim 4, wherein said prism member comprises:

an entrance surface through which the display light beam reflected from said reflection type image display enters said prism member after passing through said illuminating light guide optical system;

a first reflecting surface that reflects the light beam entering through said entrance surface;

a second reflecting surface that reflects the light beam reflected from said first reflecting surface;

a third reflecting surface that reflects the light beam reflected from said second reflecting surface; and an exit surface through which the light beam reflected from said third reflecting surface exits from said prism member, wherein said second reflecting surface and said exit surface are formed from a single surface serving as both a refracting surface and a reflecting surface.

7. A viewing optical system according to claim 1, wherein said illuminating light guide optical system is a transparent member, said transparent member comprising:

a first surface through which the light beam emitted from said illuminator enters said transparent member;

a second surface that totally reflects the light beam entering through said first surface; and a third surface that reflects the light beam totally reflected by said second surface, wherein said second surface transmits the light beam reflected from said third surface to illuminate the display surface of said reflection type image display from the front side thereof and also transmits the display light beam reflected from the display surface of said reflection type image display, and said third surface forms a beam splitter surface that transmits the display light beam passing through said second surface.

8. A viewing optical system according to claim 7, wherein a deviation angle compensating member is placed on a third surface side of said transparent member to compensate for an angle of deviation caused by said transparent member.

9. A viewing optical system according to claim 7, wherein no deviation angle compensating member is placed on a third surface side of said transparent member to compensate for an angle of deviation caused by said transparent member.

10. A viewing optical system according to claim 9, which satisfies the following condition:

$$\Delta\theta < 20° \qquad (3)$$

where $\Delta\theta$ is defined by $\theta - \theta_{min}$, where $\theta$ is an angle of deviation of an axial principal ray entering through the second surface of said illuminating light guide optical system and exiting from the third surface thereof, and $\theta_{min}$ is a minimum angle of deviation of a triangular prism having an apex angle defined by an angle $\alpha$ formed between a tangential plane passing through an intersection between said second surface and the axial principal ray and a tangential plane passing through an intersection between said third surface and the axial principal ray.

11. A viewing optical system according to claim 7, wherein said third surface of said transparent member is a polarization beam splitter surface.

12. A viewing optical system according to claim 7, wherein said third surface of said transparent member is decentered with respect to the optical axis and has a rotationally asymmetric curved surface configuration that corrects decentration aberrations due to decentration of said third surface.

13. A viewing optical system according to claim 7, wherein said illuminator is decentered in a direction different from a direction of decentration of said at least one reflecting surface of said prism member, and said third surface of said transparent member is decentered in a direction different from the direction of decentration of said at least one reflecting surface of said prism member.

14. A viewing optical system according to claim 13, wherein the direction of decentration of said illuminating means and the direction of decentration of said third surface of said transparent member are approximately perpendicular to the direction of decentration of said at least one reflecting surface of said prism member.

15. An image display apparatus comprising said viewing optical system according to claim 1, said viewing optical system being provided for one of a right eye and a left eye.

16. An image display apparatus comprising a pair of said viewing optical systems according to claim 1, said viewing optical systems being provided for a right eye and a left eye, respectively.

17. An image display apparatus according to claim 15 or 16, further comprising a support structure constructed and arranged to support said image display apparatus on a head of an observer so that said image display apparatus is positioned in front of a face of the observer.

18. A viewing optical system comprising:

an image forming member for forming a first image to be viewed by an observer;

an ocular optical system arranged to lead the image formed by said image forming member to an observer's eyeball; and a see-through optical element placed closer to a second image, which is different from said first image, than said ocular optical system so as to lead said second image to the observer's eyeball, wherein said ocular optical system has at least one reflecting surface with a curved surface configuration arranged to reflect a light beam from said first image and to lead it toward the observer's eyeball, said reflecting surface having a transmitting action to allow a light beam from said second image to enter said ocular optical system after passing through said see-through optical element, and said see-through optical element is placed closer to said second image than said reflecting surface at a distance from said reflecting surface, and wherein when the light beam from said second image passes through said see-through optical element and said ocular optical system, a combined optical power P of said see-through optical element and said ocular optical system is approximately zero, and a combined angular magnification β of said see-through optical element and said ocular optical system is approximately 1.

19. A viewing optical system according to claim 18, wherein the reflecting surface of said ocular optical system has a rotationally asymmetric curved surface configuration that corrects decentration aberrations, and said see-through optical system is arranged to cancel an optical power and angular magnification produced by said ocular optical system so that the combined optical power and angular magnification given to the light beam from said second image when it passes through said see-through optical element and said ocular optical system satisfy the following conditions:

$$-0.002 < Px < 0.002 \quad (3)$$

$$-0.002 < Py < 0.002 \quad (4)$$

$$0.97 < \beta x < 1.03 \quad (5)$$

$$0.95 < \beta y < 1.05 \quad (6)$$

where when a decentration direction of said viewing optical system is a Y-axis direction, and a plane parallel to an axial principal ray is defined as a YZ-plane, and further a direction perpendicularly intersecting the YZ-plane is defined as an X-axis direction, Px and Py are powers in the X- and Y-axis directions, respectively, of said viewing optical system optical system, and βx and βy are angular magnifications in the X- and Y-axis directions, respectively, of said viewing optical system.

20. A viewing optical system according to claim 18, wherein the reflecting surface of said ocular optical system has a rotationally asymmetric curved surface configuration that corrects decentration aberrations, said rotationally asymmetric curved surface configuration being one of an anamorphic surface and a plane-symmetry free-form surface having only one plane of symmetry.

21. A viewing optical system according to any one of claims 18 to 20, wherein said ocular optical system has at least a prism member filled with a medium having a refractive index larger than 1, said prism member including at least three optical surfaces having at least either one of a transmitting optical action and a reflecting optical action, said three optical surfaces including:

a third surface through which a light beam from said first image enters said prism member;

a second surface disposed to face said see-through optical element at a distance, said second surface having a transmitting action to allow a light beam from said second image to enter said prism member after passing through said see-through optical element, said second surface further having a reflecting action to reflect the light beam from said first image in said prism member, and said second surface having said at least one reflecting surface with a curved surface configuration; and a first surface through which the light beam from said first image exits from said prism member.

22. A viewing optical system according to claim 21, wherein said third surface has a rotationally asymmetric curved surface configuration that corrects decentration aberrations, said rotationally asymmetric curved surface configuration being one of an anamorphic surface and a plane-symmetry free-form surface having only one plane of symmetry.

23. A viewing optical system according to claim 21, wherein said first surface has a rotationally asymmetric curved surface configuration that corrects decentration aberrations, said rotationally asymmetric curved surface configuration being one of an anamorphic surface and a plane-symmetry free-form surface having only one plane of symmetry.

24. A viewing optical system according to claim 21, wherein said first surface serves as both a reflecting surface and a transmitting surface for reflecting and transmitting a light beam in said prism member.

25. A viewing optical system according to claim 24, wherein said first surface serving as both a reflecting surface and a transmitting surface is a totally reflecting surface arranged so that a reflected light beam is incident on said first surface at an angle exceeding a total reflection critical angle, and thereafter, the light beam reflected back from the reflecting surface is incident on said first surface at an angle not exceeding the total reflection critical angle to exit from said prism member.

26. A viewing optical system according to claim 21, wherein said ocular optical system and said see-through optical element are arranged so that a first image viewing field range determined by the light beam from said first image as it exits from said ocular optical system is formed within a second image viewing field range determined by the light beam from said second image as it passes through said see-through optical element and a part of said ocular optical system.

27. A viewing optical system according to claim 21, wherein an optical diameter of said see-through optical element is set smaller than the reflecting surface of said ocular optical system, which is placed to face said see-through optical element, and said see-through optical element is placed to face a region of said reflecting surface closer to said image forming member so that a light beam transmitting region of said reflecting surface that transmits the light beam entering through said see-through optical element shifts toward said image forming member with respect to a light beam reflecting region of said reflecting surface, and further a portion of said reflecting surface that does not directly face said see-through optical element is provided with a light-blocking coating to prevent entrance of flare rays from an outside world.

28. A viewing optical system according to claim 21, wherein a light-blocking member capable of switching between transmission and cutoff of a light beam from an outside world image or switching between transmission and dimming of said light beam is placed at at least either one of positions in front of and behind said see-through optical element so that said second image is the outside world image.

29. A viewing optical system according to claim 21, wherein a display device for forming an image different from said first image is placed on a side of said see-through optical element remote from said ocular optical system so that said second image is formed by said display device.

30. A viewing optical system according to claim 21, wherein a light-blocking member capable of switching between transmission and cutoff of a light beam from an outside world image or switching between transmission and dimming of said light beam is placed at at least either one of positions in front of and behind said see-through optical element so that said second image is the outside world image, and a display device for displaying a third image is provided between said outside world image and said see-through optical element.

31. A viewing optical system according to claim 21, further comprising a line-of-sight detector constructed and arranged to detect an observer's line-of-sight, said line-of-sight detector including:

a light source for pupil illumination; and a light-receiving element for receiving an image of said pupil, said light source for pupil illumination and said light-receiving element being disposed at respective positions out of an optical path in said ocular optical system for leading the light beam from said first image and an optical path in said see-through optical element for leading the light beam from said second image.

32. A viewing optical system according to claim 31, wherein said line-of-sight detector is arranged such that at least the image of said pupil is passed through the optical path in said ocular optical system and separated from an optical path between said ocular path between said ocular optical system and said first image so as to be led to said light-receiving element.

33. A viewing optical system according to claim 21, wherein said ocular optical system, said see-through optical element and said exit pupil are positioned so as to satisfy the following condition:

$$\theta \leq 60°$$

where when an optical axis of the light beam from said first image that exits from said ocular optical system is defined as a visual axis, θ is an angle defined at said exit pupil by said ocular optical system in a direction away from said image forming member with respect to said visual axis.

34. A head-mounted viewing optical apparatus comprising:

an apparatus body unit including said viewing optical system according to claim 21, wherein said ocular optical system, said see-through optical element, and said image forming member for forming said first image are retained with required spacings therebetween by a retainer; and a support structure constructed and arranged to support said apparatus body unit on a head of an observer.

35. A viewing optical system comprising:

an image forming member for forming a first image to be viewed by an observer;

an ocular optical system arranged to lead the image formed by said image forming member to an observer's eyeball; and a see-through optical element placed closer to a second image, which is different from said first image, than said ocular optical system so as to lead said second image to the observer's eyeball, wherein said ocular optical system has at least one reflecting surface with a curved surface configuration arranged to reflect a light beam from said first image and to lead it toward the observer's eyeball, said reflecting surface having a transmitting action to allow a light beam from said second image to enter said ocular optical system after passing through said see-through optical element; and said see-through optical element is placed closer to said second image than said reflecting surface in such a manner as to be in close contact with said reflecting surface, and wherein when the light beam from said second image passes through said see-through optical element and said ocular optical system, a combined optical power P of said see-through optical element and said ocular optical system is approximately zero.

36. A viewing optical system comprising:

an image forming member for forming a first image to be viewed by an observer;

an ocular optical system arranged to lead the image formed by said image forming member to an observer's eyeball; and a see-through optical element placed closer to a second image, which is different from said first image, than said ocular optical system so as to lead said second image to the observer's eyeball, wherein said ocular optical system has at least one reflecting surface with a curved surface configuration arranged to reflect a light beam from said first image and to lead it toward the observer's eyeball, said reflecting surface having a transmitting action to allow a light beam from said second image to enter said ocular optical system after passing through said see-through optical element, and said see-through optical element is placed closer to said second image than said reflecting surface in such a manner as to be in close contact with said reflecting surface, and wherein when the light beam from said second image passes through said see-through optical element and said ocular optical system, a combined angular magnification β of said see-through optical element and said ocular optical system is approximately 1.

37. A viewing optical system according to claim 35, wherein the reflecting surface of said ocular optical system has a rotationally asymmetric curved surface configuration that corrects decentration aberrations, and said see-through optical system is arranged to cancel an optical power produced by said ocular optical system so that the combined optical power given to the light beam from said second image when it passes through said see-through optical element and said ocular optical system satisfies the following conditions:

$$-0.002 < Px < 0.002 \qquad (3)$$

$$-0.002 < Py < 0.002 \qquad (4)$$

where when a decentration direction of said viewing optical system is a Y-axis direction, and a plane parallel to an axial principal ray is defined as a YZ-plane, and further a direction perpendicularly intersecting the YZ-plane is defined as an X-axis direction, Px and Py are powers in the X- and Y-axis directions, respectively, of said viewing optical system.

38. A viewing optical system according to claim 36, wherein the reflecting surface of said ocular optical system has a rotationally asymmetric curved surface configuration that corrects decentration aberrations, and said see-through optical system is arranged to cancel an angular magnification produced by said ocular optical system so that the combined angular magnification given to the light beam from said second image when it passes through said see-through optical element and said ocular optical system satisfies the following conditions:

$$0.97<\beta x<1.03 \quad (5)$$

$$0.95<\beta y<1.06 \quad (6)$$

where when a decentration direction of said viewing optical system is a Y-axis direction, and a plane parallel to an axial principal ray is defined as a YZ-plane, and further a direction perpendicularly intersecting the YZ-plane is defined as an X-axis direction, $\beta x$ and $\beta y$ are angular magnifications in the X- and Y-axis directions, respectively, of said viewing optical system.

39. A viewing optical system according to any one of claims 35 to 38, wherein the reflecting surface of said ocular optical system has a rotationally asymmetric curved surface configuration that corrects decentration aberrations, said rotationally asymmetric curved surface configuration being one of an anamorphic surface and a plane-symmetry free-form surface having only one plane of symmetry.

40. A viewing optical system according to any one of claims 35 to 38, wherein said ocular optical system has at least a prism member filled with a medium having a refractive index larger than 1, said prism member including at least three optical surfaces having at least either one of a transmitting optical action and a reflecting optical action, said three optical surfaces including:

a third surface through which a light beam from said first image enters said prism member;

a second surface disposed in close contact with said see-through optical element, said second surface having a transmitting action to allow a light beam from said second image to enter said prism member after passing through said see-through optical element, said second surface further having a reflecting action to reflect the light beam from said first image in said prism member, and said second surface having said at least one reflecting surface with a curved surface configuration; and a first surface through which the light beam from said first image exits from said prism member.

41. A viewing optical system according to any one of claims 35 to 38, wherein said third surface has a rotationally asymmetric curved surface configuration that corrects decentration aberrations, said rotationally asymmetric curved surface configuration being one of an anamorphic surface and a plane-symmetry free-form surface having only one plane of symmetry.

42. A viewing optical system according to any one of claims 35 to 38, wherein said first surface has a rotationally asymmetric curved surface configuration that corrects decentration aberrations, said rotationally asymmetric curved surface configuration being one of an anamorphic surface and a plane-symmetry free-form surface having only one plane of symmetry.

43. A viewing optical system according to claim 39, wherein said first surface serves as both a reflecting surface and a transmitting surface for reflecting and transmitting a light beam in said prism member.

44. A viewing optical system according to claim 43, wherein said first surface serving as both a reflecting surface and a transmitting surface is a totally reflecting surface arranged so that a reflected light beam is incident on said first surface at an angle exceeding a total reflection critical angle, and thereafter, the light beam reflected back from the reflecting surface is incident on said first surface at an angle not exceeding the total reflection critical angle to exit from said prism member.

45. A viewing optical system according to any one of claims 35 to 38, wherein said ocular optical system and said see-through optical element are arranged so that a first image viewing field range determined by the light beam from said first image as it exits from said ocular optical system is formed within a second image viewing field range determined by the light beam from said second image as it passes through said see-through optical element and a part of said ocular optical system.

46. A viewing optical system according to any one of claims 35 to 38, wherein an optical diameter of said see-through optical element is set smaller than the reflecting surface of said ocular optical system, which is placed to face said see-through optical element, and said see-through optical element is placed to face a region of said reflecting surface closer to said image forming member so that a light beam transmitting region of said reflecting surface that transmits the light beam entering through said see-through optical element shifts toward said image forming member with respect to a light beam reflecting region of said reflecting surface, and further a portion of said reflecting surface that does not directly face said see-through optical element is provided with a light-blocking coating to prevent entrance of flare rays from an outside world.

47. A viewing optical system according to any one of claims 35 to 38, wherein a light-blocking member capable of switching between transmission and cutoff of a light beam from an outside world image or switching between transmission and dimming of said light beam is placed in front of said see-through optical element so that said second image is the outside world image.

48. A viewing optical system according to any one of claims 35 to 38, wherein a display device for forming an image different from said first image is placed on a side of said see-through optical element remote from said ocular optical system so that said second image is formed by said display device.

49. A viewing optical system according to any one of claims 35 to 38, wherein a light-blocking member capable of switching between transmission and cutoff of a light beam from an outside world image or switching between transmission and dimming of said light beam is placed in front of said see-through optical element so that said second image is the outside world image, and a display device for displaying a third image is provided between said outside world image and said see-through optical element.

50. A viewing optical system according to any one of claims 35 to 38, further comprising a line-of-sight detector constructed and arranged to detect an observer's line-of-sight, said line-of-sight detector including:

a light source for pupil illumination; and a light-receiving element for receiving an image of said pupil;

said light source for pupil illumination and said light-receiving element being disposed at respective positions out of an optical path in said ocular optical system for leading the light beam from said first image and an optical path in said see-through optical element for leading the light beam from said second image.

51. A viewing optical system according to claim 50, wherein said line-of-sight detector is arranged such that at least the image of said pupil is passed through the optical path in said ocular optical system and separated from an optical path between said ocular optical system and said first image so as to be led to said light-receiving element.

52. A viewing optical system according to any one of claims 35 to 38, wherein said ocular optical system, said see-through optical element and said exit pupil are positioned so as to satisfy the following condition:

$$\theta \leq 60°$$

where when an optical axis of the light beam from said first image that exits from said ocular optical system is defined as a visual axis, $\theta$ is an angle defined at said exit pupil by said ocular optical system in a direction away from said image forming member with respect to said visual axis.

53. A head-mounted viewing optical apparatus comprising:

an apparatus body unit including said viewing optical system according to any one of claims 35 to 38, wherein said ocular optical system, said see-through optical element, and said image forming member for forming said first image are retained with required spacings therebetween by a retainer; and a support structure constructed and arranged to support said apparatus body unit on a head of an observer.

* * * * *